United States Patent [19]
Taniguchi et al.

[11] Patent Number: 5,947,221
[45] Date of Patent: Sep. 7, 1999

[54] VEHICULAR MOTION CONTROLLING SYSTEM

[75] Inventors: Masahiko Taniguchi, Anjo; Toshirou Nagata, Gifu; Mamoru Sawada, Yokkaichi, all of Japan

[73] Assignee: Denso Corporation, Kariya City, Japan

[21] Appl. No.: 08/899,677

[22] Filed: Jul. 24, 1997

[30] Foreign Application Priority Data

| | | | |
|---|---|---|---|
| Jul. 24, 1996 | [JP] | Japan | 8-194819 |
| Aug. 12, 1996 | [JP] | Japan | 8-212851 |
| Aug. 30, 1996 | [JP] | Japan | 8-230979 |
| Sep. 13, 1996 | [JP] | Japan | 8-243584 |
| Sep. 25, 1996 | [JP] | Japan | 8-253169 |

[51] Int. Cl.$^6$ .................................................. B60K 27/02
[52] U.S. Cl. ........................................ 180/197; 303/146
[58] Field of Search .................... 180/197, 370; 701/84, 86; 303/141, 142, 146

[56] References Cited

U.S. PATENT DOCUMENTS

| | | | |
|---|---|---|---|
| Re. 33,663 | 8/1991 | Kade et al. ............................ | 180/197 |
| 4,917,208 | 4/1990 | Komoda . | |
| 4,976,330 | 12/1990 | Matsumoto . | |
| 5,127,501 | 7/1992 | Arikawa . | |
| 5,408,411 | 4/1995 | Nakamura et al. . | |
| 5,474,369 | 12/1995 | Inagaki et al. ........................ | 303/146 |
| 5,555,499 | 9/1996 | Yamashita et al. . | |
| 5,657,829 | 8/1997 | May ...................................... | 180/197 |
| 5,752,752 | 5/1998 | Tozu et al. ............................ | 303/146 |

FOREIGN PATENT DOCUMENTS

| | | |
|---|---|---|
| 60-199739 | 10/1985 | Japan . |
| 62-153533 | 7/1987 | Japan . |
| 62-295762 | 12/1987 | Japan . |
| 63-13377 | 1/1988 | Japan . |
| 63-159149 | 7/1988 | Japan . |
| 63-167041 | 7/1988 | Japan . |
| 1-172050 | 7/1989 | Japan . |
| 1-178060 | 7/1989 | Japan . |
| 2-151531 | 6/1990 | Japan . |
| 2-191833 | 7/1990 | Japan . |
| 2-294533 | 12/1990 | Japan . |
| 4-193632 | 7/1992 | Japan . |
| 5-105048 | 4/1993 | Japan . |
| 5-231203 | 9/1993 | Japan . |
| 5-270382 | 10/1993 | Japan . |
| 7-001995 | 1/1995 | Japan . |
| 7-164924 | 6/1995 | Japan . |

*Primary Examiner*—Lanna Mai
*Assistant Examiner*—Faye M. Fleming
*Attorney, Agent, or Firm*—Pillsbury Madison & Sutro LLP

[57] ABSTRACT

In the present invention, when the wheel speeds of drive wheels are reduced by an engine brake, there are executed drive wheel control for adjusting the braking forces applied to the drive wheels by the engine brake, and driven wheel control for reducing the wheel speeds of driven wheels by an brake actuator. Drive wheel control raises lateral resistant force of the drive wheels by increasing an engine output torque, and driven wheel control brakes the driven wheels by the brake actuator such as a hydraulic brake. As a result, sufficient deceleration of a vehicle can be obtained while retaining the stability of the vehicle.

45 Claims, 32 Drawing Sheets

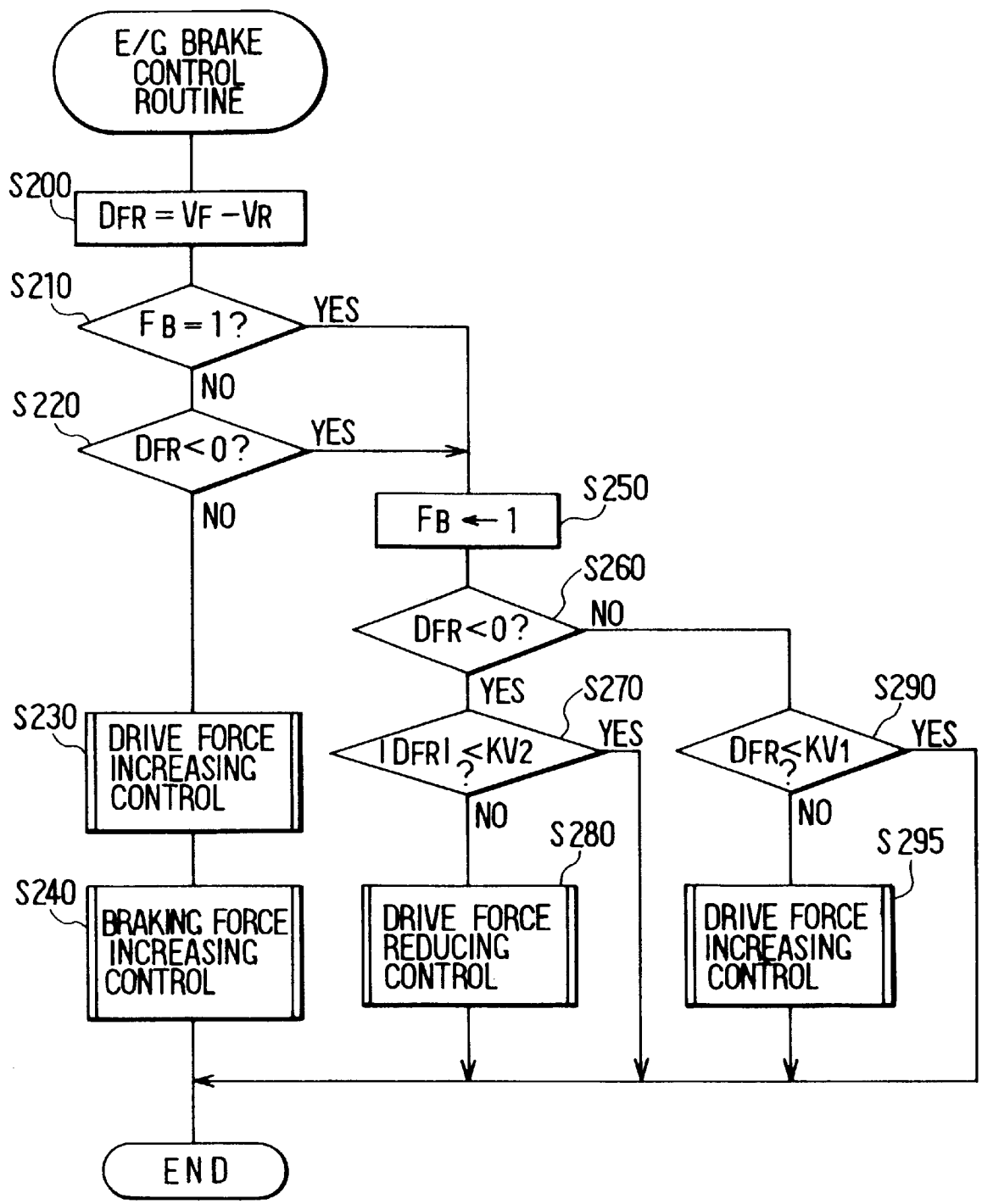

(map 1)

(map 2)

VEHICULAR MOTION CONTROLLING SYSTEM

CROSS REFERENCE TO RELATED APPLICATION

This application is based upon and claims the benefit of priority of the prior Japanese Patent Applications No. 8-194819 filed on Jul. 24, 1996, No. 8-212851 filed on Aug. 12, 1996, No. 8-230979 filed on Aug. 30, 1996, No. 8-243584 filed on Sep. 13, 1996, and No. 8-253169 filed on Sep. 25, 1996, the contents of which are incorporated herein by reference.

BACKGROUND OF THE INVENTION

1. Field of the Invention

The present invention relates to a system for controlling a vehicular motion and, more particularly, to a vehicular motion controlling system for controlling the vehicular motion when an engine brake is applied to a vehicle or when a vehicle is in a turning state.

2. Related Art

In the prior art, when the engine brake is applied by releasing the throttle valve on a low-friction road such as a frozen road, the rotational speed of the drive wheels drops with respect to the vehicular body speed, and as a result, the drive wheels may slip. When the drive wheels slip, there arises a phenomenon that the lateral resistant force of the drive wheels falls.

When the slip is increased by the engine brake at a time of turning state of the vehicle, for example, if the lateral resistant force of the drive wheels is reduced, as illustrated in FIG. 1A, a turning moment occurs in an FR car, and the vehicle may become unstable to cause the tuck-in or the spin. On the other hand, an FF car may become unsteerable although the vehicle will not spin.

In order to prevent this, there has been proposed a technique (as disclosed in Japanese Patent Laid-Open No. 62-153533), in which an engine output is raised on the basis of the output state of the engine and the lateral acceleration in order to reduce the engine braking force so that the slip ratio of the wheels may fall within a predetermine range.

In order to prevent the spin or the tuck-in at the time of engine braking, however, the engine output is raised in the above-specified control, and there arises another problem that the deceleration, as expected by the driver, cannot be realized.

In the aforementioned prior art, the engine output torque is not raised before the slip state appears in the drive wheels. Because of the delay due to the inertia of the mechanism in the engine and the delay due to the inertia of a drive system from the engine to the drive wheels, the timing for control to increase the rotational speed of the drive wheels actually may be delayed. As a result, the drive wheels are locked to raise a problem that the running stability is deteriorated.

As a technique for enhancing the steering stability at the time of a turning state of the vehicle, on the other hand, there is known yawing rate control.

In this yawing rate control, a target yawing rate is determined from the steering operation of the driver and the like to control the torque distribution ratio to the left and right drive wheels or to control the engine output for imparting the drive torque to the left and right drive wheels so that the real yawing rate of the vehicle approaches the target yawing rate. As disclosed in Japanese Patent Laid-Open No. 7-164924, for example, during an under-steering state in which the target yawing rate is higher than the rear yawing rate, the engine output is raised, and the distribution of transmitted torque to the outer wheel on a turning circle between the left and right drive wheels is increased to enlarge the torque difference between the left and right drive wheels. During an over-steering state in which the target yawing rate is lower than the real yawing rate, on the other hand, the engine output is lowered to bring the drive wheels into the engine braking state thereby to reduce the torque difference between the left and right drive wheels.

In this yawing rate control of the prior art, however, the real yawing rate is controlled to the target yawing rate merely by the torque difference of the left and right drive wheels, and as a result, the stability of the vehicle may fail to be retained.

In the rear wheel drive car, for example, when the driver steers sequentially leftward and rightward to change the lane or to run on an S-curve, the torque difference of the drive wheels is increased according to the aforementioned yawing rate control in response to the first (or leftward) steering operation, to establish the turning moment in the vehicle. Accordingly, the torque difference of the drive wheels is increased in the opposite direction in response to the next (rightward) steering operation. At the yawing rate control accompanying this second steering operation, however, the vehicle exhibits an extremely high under-steer tendency, whereby the torque difference of the drive wheels is enlarged extremely. As a result, when the steering is returned straight, even though the torque difference of the drive wheels is reduced to zero, but this reduction may not be effected in time to prevent the vehicle from spinning.

Especially when the vehicle runs on a low-$\mu$ road having a surface of low coefficient $\mu$ of friction, the reaction (i.e., the road surface reaction) for the wheels to receive from the road surface is so small that the yawing moment to be generated by the drive torque difference is reduced. Therefore, when the yawing moment for turning round the vehicle quickly is given during the run on the low-$\mu$ road in response to the steering operation of the driver, the yawing moment toward the opposite direction, as required by the steering operation in the opposite direction, cannot be generated. As a result, the vehicle comes into an extremely unstable state to become liable to spin.

In other words, yawing rate control of the prior art can enhance the steerability but not retain the stability of the vehicle.

SUMMARY OF THE INVENTION

The present invention has been made in view of the points thus far described and has a first object to provide a vehicular motion controlling system which can establish a sufficient deceleration of a vehicle even when an engine brake is applied to the vehicle while retaining the stability of the vehicle.

A second object of the present invention is to provide a vehicular motion controlling system which can prevent the wheels from locking, as might otherwise be caused by delay of control, to retain the running stability.

A third object of the present invention is to provide a vehicular motion controlling system which can retain both the steerability and stability of the vehicle in a turning state.

In order to achieve the first object, in the vehicular motion controlling system according to the present invention, under the situation of reducing the wheel speed of drive wheels by an engine brake, there are executed drive wheel control for adjusting the braking forces applied to the drive wheels by the engine brake, and driven wheel control for reducing the wheel speed of driven wheels by an brake actuator.

In order to generate the vehicle-body deceleration by braking the vehicle due to the engine brake during the turning state, what is done in the prior art is to provide which raises the engine output torque so as to prevent the instability of the vehicle such as the spin or the tuck-in. In the present invention, on the other hand, executed drive wheel control is provided to raise lateral resistant force for the drive wheels by increasing the engine output (or by reducing the slip of the drive wheels), and driven wheel control is provided to brake the driven wheels by the brake actuator such as a hydraulic brake.

This will be explained with reference to FIGS. 1A and 1B. In the (rear wheel drive) FR car, for example, in the situation where the vehicle is likely to become unstable such as in a turning state, at the time of running on a frozen road or the like, a large engine brake is not applied to the drive wheels as in the example of the prior art of FIG. 1A, drive wheel control is performed to raise the engine output (i.e., to reduce the magnitude of the engine brake), as illustrated in FIG. 1B. By this drive wheel control, the lateral resistant force of the drive wheels is increased to prevent the vehicle reliably from becoming unstable, thereby avoiding the spin or the tuck-in of the vehicle. At the same time, the driven wheels are braked by the brake actuator to provide a prominent effect that a safe and sufficient braking can be achieved without losing the body deceleration so much.

In drive wheel control, it is preferable to reduce the braking force of the engine brake by raising the engine output.

In other words, when the engine brake is excessively effective, the engine output is raised to reduce the braking force by the engine brake, as described above. As a result, the slip of the drive wheels is lowered, thereby increasing the lateral resistant force of the drive wheels to improve the stability of the vehicle body.

Moreover, the distribution of the braking force in drive wheel control and driven wheel control may be adjusted according to the slip state of the wheels and/or the road surface state.

For example, when the slip of the wheels is excessive or when the road surface $\mu$ is small (so that the slip ratio becomes excessive), the engine brake is thought to be excessive, so that the lateral resistant force of the drive wheels may be excessively reduced. In this case, the braking force due to the engine brake is lowered, and the braking force to the driven wheels due to the brake actuator is increased so that the vehicular stability and the body deceleration can be increased. When the wheels hardly slip even with the engine brake or when the road surface $\mu$ is high, on the contrary, it is considered that the lateral resistant force in the drive wheels is hardly reduced. By keeping (or increasing) the braking force due to the engine brake and by reducing the braking force to the driven wheels, the stability of the vehicle and the vehicle-body deceleration can be increased.

When wheel slip not less than a predetermined value is caused in the drive wheels by the engine brake, drive wheel control and driven wheel control may be executed.

As illustrated in FIG. 2, the friction coefficient of the wheels changes with the slip ratio of the wheels. On a dry road or an icy road more specifically, the longitudinal friction coefficient reaches its peak at a predetermined slip ratio, but the lateral friction coefficient becomes the smaller for the higher slip ratio. Therefore, the vehicle running state is divided into a stable range and an unstable range across the predetermined slip ratio.

Specifically, when wheel slip not less than a predetermined value is caused in the drive wheels by the engine brake, the lateral resistant force is at a low level to make the vehicle unstable. In this case, in order to avoid the unstable region, drive wheel control to lower the engine brake and driven wheel control according to the brake actuator are executed, as described above, so that the body deceleration can be increased in the stable running state of the vehicle.

The braking force during the engine brake is desirably distributed to the braking forces due to drive wheel control and due to driven wheel control within the vehicle stable range.

As illustrated by the braking force distribution diagram of FIG. 3A, for example, whether the FR car is stable or unstable is determined by the distribution of the braking force (i.e., the rear braking force) of the drive wheels and the braking force (i.e., the front braking force) of the driven wheels. By adjusting the distribution between the rear braking force and the front braking force, therefore, the vehicle can be held in the stable state. In the present invention, therefore, the braking force due to drive wheel control and driven wheel control is distributed for the so as to fall within the stable region.

In FIG. 3B; point A indicates the case where only the engine brake is applied; point B indicates the case where only control for reducing the engine braking is performed; and point C indicates the case in which there are executed drive wheel control for the engine output and driven wheel control by the hydraulic actuator.

The braking force between drive wheel control and driven wheel control is desirably distributed to achieve an ideal braking force distribution capable of establishing a deceleration corresponding to the engine brake.

This ideal braking force distribution is located at the boundary between the unstable region and the stable region of the vehicle, as indicated by point c in FIG. 3A. That is, as illustrated in FIG. 3B which is an enlarged view of an portion of FIG. 3A, the ideal braking force distribution is located at the hatched boundary (i.e., the region in which the front wheel speed and the rear wheel speed are substantially equal) between the unstable region, in which the rear wheel speed is lower than the front wheel speed, and the stable region in which the rear wheel speed is higher than the front wheel speed. According to the present invention, therefore, the highest braking force can be achieved while holding the stability of the vehicle.

As apparent from FIG. 3B, a portion $\Delta Br$ of the rear braking force is replaced by the front braking force $\Delta Bf$. In other words, according to the present invention, the reduction of the braking force by the engine brake is replaced by the increase of the braking force due to brake control of the driven wheels.

Here, the engine brake operation is executed according to the accelerator operation of the driver, and drive wheel control and driven wheel control are executed at the time of the engine brake operation.

During a turning state or when running on a frozen road or a low friction road, therefore, an effect can be achieved such that the deceleration, as expected by the driver, can be realized while keeping the stability of the vehicle when the driver reduces the vehicle speed by releasing the accelerator pedal.

Drive wheel control and driven wheel control may also be executed even when the engine brake is automatically applied, such as when the throttle is automatically returned to brake the vehicle as in the automatic brake system or when the throttle is automatically returned for reducing the engine output as in the automatic throttle control system thereby to apply the engine brake.

There can be attained an effect that a sufficient deceleration can be realized while keeping the stability of the vehicle when the engine brake is automatically applied during the turning state or when running on the frozen road or the low friction road.

In a vehicle using at least rear wheels as its drive wheels, when the drive wheels are in the engine brake state as the drive force to be applied to the drive wheels lowers, the wheel braking force by the brake-fluid pressure is preferably applied to the front side wheels in accordance with the load movement of the vehicle body by the engine brake.

In a rear drive or four-wheel drive car, more specifically, the braking force to be applied to the front wheels of the vehicle is raised to lower the lateral resistant force of the front wheels by applying the wheel braking force by the brake-fluid pressure to the front side wheels in accordance with the load movement in the vehicle body at the time of the engine brake.

As a result, even when the lateral resistant force of the rear wheels drops in accordance with the load movement at the time of the engine brake, the lateral resistant force of the front wheels can be accordingly lowered to balance the lateral resistant force between the front wheels and the rear wheels of the vehicle to improve the running stability of the vehicle.

Especially in the rear wheel drive car, when the drive wheels (or the rear wheels) are being braked by the engine, no braking force is applied to the front wheels so that the vehicular motion becomes more unstable and likely to spin than the four-wheel drive car. According to the present invention, however, the braking force is applied to the front wheels at the time of the engine brake so that the relation between the front wheel braking force and the rear wheel braking force can be controlled within the stable region of the ideal braking force distribution diagram, as illustrated in FIG. 17, to improve the running stability of the vehicle.

Here, the ideal braking force distribution diagram, as illustrated in FIG. 17, illustrates a relation between the rear wheel braking force and the front wheel braking force in which the vehicle can brake stably and quickly. In the region where the rear wheel braking force is higher than that according to the braking force distribution defined by the ideal braking force distribution diagram, the vehicle becomes unstable and likely to spin. Thus, the region where the front braking force is higher than that according to the braking force distribution indicates that the vehicle is stable.

Moreover, the vehicular motion controlling system retains the running stability of the vehicle by applying the braking force to the front wheels at the time of the engine brake. Thus, the vehicular deceleration (i.e., a negative acceleration) at the time of the engine brake can be raised, or the steerability of the vehicle can be improved when the vehicle downhills (runs on a downhill) while being braked by the engine brake, for example.

Here, in the vehicle including the rear wheels as its drive wheels and the front wheels as its driven wheels (i.e., the rear-wheel drive car), when the drive wheels is in the engine braking state as the drive force applied to the drive wheels lowers, the wheel braking force equal to or more than the wheel braking force to be applied to the drive wheels by the engine brake is desirably applied to the driven wheels by the brake-fluid pressure.

In the rear-wheel drive car, when the braking force is applied to the rear wheels (or the drive wheels) by the engine brake, the relation between the front wheel braking force and the rear wheel braking force can be controlled to fall within the ideal braking force distribution diagram of FIG. 17 by applying wheel braking force equal to or more than the braking force of the rear wheels to the front wheels (or the driven wheels).

When the drive wheels are being braked by the engine brake, moreover, the wheel braking force may be applied to the driven wheels by the brake fluid pressure so that the wheel braking force at the driven wheels may exceed the wheel braking force at the drive wheels.

More specifically, when the drive wheels are being braked by the engine brake, the braking force by the engine brake is applied to the drive wheels, but a braking force other than that by the engine brake may be applied to the drive wheels by the braking operation of the driver. At the time of the engine brake, therefore, a braking force equal to or more than all the braking forces applied to the drive wheels, including the braking force applied to the drive wheels by the engine brake, is applied to the driven wheels.

As a result, the relation between the front wheel braking force and the rear wheel braking force can be reliably controlled to fall in the stable region of the ideal braking force distribution diagram, as illustrated in FIG. 17, to improve the running stability of the vehicle.

Here, when the brake fluid pressure according to the load movement caused in the vehicle body by the engine brake is applied to front side wheel braking force generating devices, the magnitude of the load movement can be determined from the wheel speed difference between the front wheel speed and the rear wheel speed.

In short, when the load movement is caused in the vehicle body by the engine brake so that the road surface gripping force of the rear wheels drops, the rear wheel speed is made lower than the front wheel speed by the braking force applied to the rear wheels by the engine brake, no matter whether the vehicle is a rear-wheel drive or the four-wheel drive car.

Thus, the magnitude of the load movement by the engine brake can be determined from the wheel speed difference between the front wheels and the rear wheels. When the brake fluid pressure to be applied to the front wheels is controlled according to the wheel speed difference, the braking force to be applied to the front wheels by the brake fluid pressure can be controlled according to the braking force applied to the rear wheels. As a result, the lateral resistant force to be generated at the front wheel side of the vehicle can be controlled to a desired state in accordance with the lateral resistant generated at the rear wheel side, to improve the running stability of the vehicle.

Especially when the brake fluid pressure of the front wheels is thus controlled according to the wheel speed difference between the front wheels and the rear wheels, the braking force to be applied to the front wheels becomes excessively higher than that to be applied to the rear wheels, the rise in the brake fluid pressure may be inhibited when the front wheel speed is lower by a predetermined value or more than the rear wheel speed. This excessive rise in the braking force applied to the front wheels and the according instability of the vehicle can be prevented.

In order to achieve the aforementioned second object, on the other hand, in the vehicular motion controlling system according to the present invention, an adjusting state detecting device detects the state of a drive force adjusting device for adjusting the drive force generated in the engine. When it is determined on the basis of this detection result by a condition determining device that the condition for applying braking force due to the engine brake has been satisfied, control to raise the drive force by actuating the drive force adjusting device is executed by a drive force controlling device.

In other words, the drive force is not raised by increasing the engine output torque after it is detected that the slip state is caused in the drive wheels by the engine brake, control to raise the drive force before the slip state occurs is started when it is determined from the state of the throttle valve, for example, that the engine brake is active. As a result, the rotational wheel speed of the drive wheels can be raised before the drive wheels are locked, so that the locking state of the drive wheels can be prevented in advance. Thus, the sufficient running stability can also be retained even on a low-friction road such as a snow-covered road or a frozen road.

A throttle (e.g., a throttle valve) or an accelerator (e.g., an accelerator pedal) can be adopted as the aforementioned drive force adjusting device.

A throttle opening, the changing rate of the throttle opening, can be adopted as the state of the drive force adjusting device an accelerator opening or the changing rate of the accelerator opening.

It is, therefore, determined in the following cases that the condition for the engine brake is satisfied:

(1) the case in which the throttle opening lowers to a reference value or less;

(2) the case in which the changing rate of the throttle opening is negative (in the closing direction) and in which its absolute value is large, that is, in which the throttle valve is abruptly closed;

(3) the case in which the accelerator opening (e.g., the depression of the accelerator pedal) lowers to a reference value or less (e.g., in which the accelerator pedal is completely released); and (4) the case in which the changing rate of the accelerator opening is negative (in the closing direction) and in which its absolute value is large.

As the adjusting state detecting device, there can be adopted a device for indirectly detecting the state of the drive force adjusting device such as the throttle, such as a sensor sensing an intake pressure, the changing rate of the intake pressure, an intake air flow, or the changing rate of the intake air flow, or an idle switch.

It is, therefore, determined in the following cases that the condition for the engine braking is satisfied:

(1) the case in which the intake pressure is as low as a reference level or less;

(2) the case in which the changing rate of the intake pressure is at a value indicating the state that the throttle valve is closed;

(3) the case in which the intake air flow is as low as a reference value or less;

(4) the case in which the changing rate of the intake air flow indicates the state that the throttle valve is closed; and (5) the case in which the idle switch is in the ON state indicating the release of the accelerator pedal.

When it is detected that the engine brake is active, the engine output is raised by increasing the throttle opening to increase the intake air flow. As a result, the rotational wheel speed of the drive wheels can be raised to prevent the drive wheels from being locked even when braking force due to the engine brake is applied to the drive wheel.

When the throttle valve is fully closed, the drive force can be raised by opening the throttle valve to a predetermined extent. As a result, the drive wheels can be caused to rotate and prevented from being locked when the engine brake is activated.

In the case of control to increase the throttle opening, the initial value after the throttle opening is increased is preferably changed according to the state of the drive force adjusting device such as the changing rate of the throttle opening or the accelerator opening.

When the accelerator is abruptly returned, the timing for the engine brake to effect is advanced, and the engine output torque is greatly lowered and delayed in its recovery. By detecting the released state of the accelerator, for example, the initial value of the throttle opening is set to a large value when the accelerator releasing speed is high. As a result, a large drop of the engine output torque can be prevented to avoid the locking of the drive wheels.

Control to increase the throttle opening may be executed after a standby of a predetermined time period after the engine output torque comes to the throttle opening corresponding to "0".

Even when the accelerator is released to effect the engine brake, there is a delay caused by the inertia or the like of each mechanism until the reduced drive force is transmitted to the drive wheels after the drop in the engine output torque. When control to return the throttle valve is made excessively quickly, the engine output torque increases to fail to provide a sufficient deceleration before the engine brake becomes sufficiently effective. Therefore, when control to increase the throttle opening is made after the standby of the predetermined time period which corresponds to a time period until the engine brake is actually applied after the accelerator was released, it is possible to establish the sufficient deceleration and to prevent the locking of the drive wheels.

When the engine brake active state is detected, the fuel injected quantity can be increased to raise the engine output. As a result, the rotational wheel speed of the drive wheels can be increased to prevent the locking of the drive wheels when the engine brake is effective.

Control by the drive force control device may be executed according to a road surface state.

On a low-friction road such as a snow-covered road or a frozen road, wheel locking is likely to occur. Even if the engine brake is applied when it is determined that the vehicle runs on the low-friction road based on the rotating state of the wheels (that is, when the slip ratio is high with the ordinary accelerating operation or the braking operation), the locking of the drive wheels can be properly prevented even on the low-friction road by adjusting the timing for stating control to raise the drive force and the magnitude (e.g., the initial value) of the drive force in accordance with the road surface state. For the lower coefficient of friction of the road surfaces, for example, the timing for starting control to increase the drive force may be advanced, or the initial value of the throttle opening in drive force control may be heightened.

In order to achieve the aforementioned third object, in the vehicular motion controlling system according to the present invention, during a turning state of the vehicle, the magnitude of the drive force to be applied to the drive wheels is increased according to the turning degree of the vehicle, and the actual turning state of the vehicle and the target turning state according to the steering operation of the driver are compared, and brake fluid pressure from a brake fluid pressure source is applied to one of the braking force generating devices of the left and right driven wheels to establish the braking force in the one of the driven wheels so that the real turning state may be brought close to the target turning state.

Specifically, when the turning degree rises in a vehicular turning state, the lateral resistant force of the drive wheels lowers. The reduction in the lateral resistant force of the drive wheels can be prevented by increasing the drive force of the drive wheels in accordance with the turning degree of the vehicle, to suppress the side skid occurring in the drive wheels, thereby stabilizing the motion of the drive wheels.

Moreover, since the turning state of the vehicle cannot be controlled to the target turning state merely by stabilizing the motion of the drive wheels, the yawing moment necessary for controlling the vehicular turning state to the target turning state is generated by establishing the braking force in one of the driven wheels. As a result, the vehicular turning state can be controlled to the target turning state without deteriorating the stability of the vehicle, thereby to retain both the steerability and the stability.

Here, the real turning state and the target turning state to be used for controlling the brake fluid pressure can be exemplified by the yawing rate of the vehicle. For actual control to change the vehicular turning state to the target turning state, moreover, it is sufficient to execute at least one of under-steer control, in which the brake fluid pressure is applied during an under-steer state of the vehicle to the braking force generating device provided at an inner driven wheel of a turning circle, and over-steer control, in which the brake fluid pressure is applied during an over-steer state of the vehicle to the braking force generating device provided at an outer driven wheel of the turning circle.

Specifically, during the under-steer state in which the yawing rate of the vehicle is lower than the target yawing rate corresponding to the steering operation of the driver, the yawing rate can be raised by applying the braking force to the inner driven wheel of the vehicle. During the over-steer state in which the vehicular yawing rate is higher than the target yawing rate, the yawing rate can be lowered by applying the braking force to the outer driven wheel of the vehicle. By executing the aforementioned under-steer control or over-steer control, therefore, the yawing rate at the under-steer state or at the over-steer state can be brought close to the target yawing rate, as requested by the driver, to improve the steerability of the vehicle.

In this case, moreover, the vehicle can be prevented from approaching the spinning state by applying the brake fluid pressure to the braking force generating device provided at the outer driven wheel during the over-steer state, so that the safety can be more improved. When a yawing acceleration which is a differential value of the yawing rate is employed as a value indicating the real turning state or the target turning state, the responsibility of the above-described control can be more improved.

The construction in which the braking force is established not only in one of the driven wheels but also in one of the drive wheels by applying the brake fluid pressure from the brake fluid pressure source to one of the braking force generating devices at the left and right drive wheels, improves, the steerability and safety of the vehicle.

In other words, the drive force can be moved between the left and right drive wheels by the braking force applied to the one drive wheels. Thus, the yawing moment necessary for bringing the real turning state close to the target turning state can be established more quickly and reliably by the torque difference, as caused according to the movement of the drive force between the left and right drive wheels and the braking force which is established by one of the left and right driven wheels. As a result, the steerability and stability of the vehicle can be more improved.

Especially in this case, the yawing moment can be established in the vehicle by the torque difference between the left and right drive wheels, and the lateral resistant force for the driven wheels can be made lower than that for the drive wheels thereby to establish the anti-spin yawing moment. As a result, the stability of the vehicle can be improved better than that of the system of the prior art in which only the torque difference of the drive wheels is controlled.

When the yawing moment is to be controlled by the torque difference between the left and right drive wheels at the time of the vehicular turning state by applying the braking force to one of the drive wheels as well, the brake fluid pressure may be applied during the under-steer state to the braking force generating device provided at an inner drive wheel of a turning circle and during the over-steer state to the braking force generating device provided at an outer drive wheel of the turning circle.

In the present invention, as described above, the steerability and stability at the time of the vehicular turning state are improved by increasing the drive force of the drive wheels and by applying the braking force to one of the driven wheels or each one of the driven wheels and the drive wheels. In this case, the brake fluid pressure for establishing the braking force in the driven wheels or in both the driven wheels and the drive wheels is desirably determined to cancel the vehicular propelling force which is generated as the result that the drive force rises.

In other words, if the brake fluid pressure for generating the braking force in the driven wheels or in both the driven wheels and the drive wheels is determined to cancel the vehicular propelling force to be generated as the drive force of the drive wheels rises, the vehicular propelling force will not rise or fall to the contrary of the intention of the driver, so that the steerability and stability at the time of the vehicular turning state can be improved without giving the discomfort to the driver.

In order to improve the steerability and stability at the time of the vehicular turning state without fluctuating the vehicular propelling force, moreover, the requested yawing moment necessary for controlling the real turning state to the target turning state of the vehicle is calculated so that the increase in the drive force and the brake-fluid pressure to be applied to the braking force generating device may be individually determined on the basis of the requested yawing moment.

Here, the requested yawing moment can be determined either from the deviation between the real yawing rate and the target yawing rate or the deviation between the real yawing acceleration and the target yawing acceleration. When the requested yawing moment is determined from the deviation between the real yawing acceleration and the target yawing acceleration, the turning state of the vehicle can preferably be quickly controlled to the target turning state.

When the turning state of the vehicle is detected and the detected turning state exceeds a predetermined degree, the drive force to be transmitted from the power supply system of the vehicle to the drive wheels is preferably raised by a predetermined amount.

Here, the turning state means the turning degree at which the vehicle is turning. Moreover, the turning state can be detected in terms of at least one of data including the lateral acceleration of the vehicle, the left and right wheel speeds of the vehicle, and the steering angle of the vehicle (i.e., the steering angle of the steering wheel).

On the other hand, the power supply system of the vehicle is a portion composed of the engine and the transmission for transmitting the drive force to the drive wheels of the vehicle. The power supply system is enabled to raise the drive force to be transmitted to the drive wheels by changing the gear ratio of the transmission or by raising the output of the engine.

Thus, according to the vehicular motion controlling system, when the turning state of the vehicle exceeds a predetermined degree during vehicle braking, the drive force to be transmitted from the power supply system of the vehicle to the drive wheels is raised by a predetermined amount. As a result, as indicated by arrow J2 of FIG. 39, the force applied to the drive wheels in a direction of deceleration is reduced so that the lateral resistant force Fy of the drive wheels accordingly (as indicated at $\Delta Fy2$ in FIG. 39) rises. Thus, the vehicular motion at the turning and braking states can be stabilized.

On the other hand, when the turning state exceeds a predetermined degree even at the turning state in which no braking force is applied to the wheels, the drive force to be transmitted from the power supply system to the drive wheels is increased by a predetermined amount so that that the drive force of the wheels cannot be overcome by a rolling resistance Fx, as indicated by arrow J1 in FIG. 39, so that the lateral resistant force Fy falls. As a result, it is possible to stabilize the vehicular motion in the ordinary turning state.

Thus, according to the vehicular control system of the present invention, the motion of the vehicle in the turning state can be reliably stabilized.

Here, the aforementioned vehicular motion controlling system may preferably be further equipped with a brake detecting device for detecting whether or not the braking force is applied to the drive wheels of the vehicle. Moreover, the drive force to be transmitted from the power supply system to the drive wheels is increased by a predetermined amount when it is determined that the detected turning state exceeds a predetermined degree and that the braking force is applied to the drive wheels.

Here, the braking force to be applied to the drive wheels includes not only the braking force applied by the brake device when the brake pedal of the vehicle is depressed but also the force to decelerate the drive wheel, as applied to the drive wheels by the so-called "automatic brake" for activating the brake device automatically when the driver releases the accelerator pedal, or by the engine brake (i.e., the abrupt engine brake when the transmission has a large gear ratio) when the driver releases the accelerator pedal.

The aforementioned brake detecting device can detect whether or not the braking force is applied to the drive wheels, by detecting that the brake pedal of the vehicle is operated. Moreover, the brake detecting device can also detect that the braking force is applied to the drive wheels, if the engine rotational speed and the gear ratio of the transmission are no less than predetermined values when the accelerator pedal is abruptly released from its depressed state.

According to this vehicular motion controlling system, the drive force to be transmitted from the power supply system to the drive wheels is raised by a predetermined amount only when the turning state of the vehicle exceeds a predetermined degree and when the braking force is applied to the drive wheels, that is, only when the vehicle is in the turning and braking states.

As a result, the vehicular motion in the turning and braking states can be stabilized. In the turning state without braking force applied to the drive wheels, moreover, the drive force to the drive wheels is not raised contrary to the intention of the driver having a skilled driving technique when the driver turns the vehicle.

On the other hand, the aforementioned vehicular motion controlling system may be further equipped with a drive force determining device for determining whether or not the drive force transmitted from the power supply system to the drive wheels, is no more than a predetermined value. When the detected turning state exceeds a predetermined degree and when it is determined by the drive force determining device that the drive force transmitted from the power supply system to the drive wheels is no more than a predetermined value, the drive force to be transmitted from the power supply system to the drive wheels is raised by a predetermined amount.

According to this vehicular motion controlling system, the drive force to be transmitted from the power supply system to the drive wheels is raised by the predetermined value only when the turning state of the vehicle exceeds the predetermined degree and when the drive force transmitted from the power supply system to the drive wheels is no more than the predetermined value.

In the turning state without braking force applied to the drive wheels, therefore, when the driver is depressing the accelerator pedal by a predetermined stroke, that is, when there is no possibility that the drive force of the wheels is overcome by the rolling resistance Fx, as indicated by arrow J1 in FIG. 39, and the lateral resistant force Fy drops, the drive force to be transmitted to the drive wheels is not raised. In other words, the drive force to the drive wheels can be raised to increase the lateral resistant force Fy of the wheels only when the drive force being transmitted to the drive wheels is overcome by the rolling resistance Fx so that the lateral resistant force Fy lowers. As a result, the vehicular motion in the turning state can be reliably stabilized.

Here, there may be simultaneously provided a braking detecting device for detecting whether or not the braking force is applied to the drive wheels, and a drive force determining device for determining whether or not the drive force transmitted from the power supply system to the drive wheels is no more than a predetermined value.

In this case, when the detected turning state exceeds the predetermined degree, when it is detected that the braking force is not applied to the drive wheels, or when it is determined that the drive force transmitted from the power supply system to the drive wheels is no more than the predetermined value, the drive force to be transmitted from the power supply system to the drive wheels may preferably be raised by a first predetermined amount. When the detected turning state exceeds a predetermined degree and when it is detected that the braking force is applied to the drive wheels, the drive force to be transmitted from the power supply system to the drive wheels may preferably be raised by a second predetermined amount which is larger than the first predetermined amount.

In short, in view of the fact that the lateral resistant force Fy of the wheels lowers in the turning and braking state more than in the ordinary turning state without braking force applied to the drive wheels, the drive force increase (i.e., the aforementioned second predetermined amount increase) in the turning and braking states is made larger than the drive force increase (i.e., the aforementioned first predetermined amount increase) in the turning state without braking force being applied to the drive wheels and with the drive force transmitted from the power supply system to the drive wheels being no more than the predetermined value.

Thus, according to the vehicular motion controlling system, in addition to the aforementioned effects, it is possible to stabilize the vehicular motion in all the turning states including the turning and braking states and the turning state without any braking.

When the detected turning state exceeds the predetermined degree and when it is determined that the braking force is applied to the drive wheels, the drive force to be transmitted to the drive wheels may be raised more for the higher braking force, that is, in accordance with the braking force being applied to the drive wheels.

Specifically, since the lateral resistant force Fy of the wheels is the lower for the higher braking force (force acting in a direction of deceleration) to be applied to the wheels, as illustrated in FIG. 39, the lateral resistant force of the drive wheels can always be held at a high value by making the drive force to be transmitted to the drive wheels, higher for the higher braking force to be applied to the drive wheels. As a result, the vehicular motion at the turning and braking states can be more reliably stabilized.

Moreover, the drive force to be transmitted to the drive wheels may be made the higher for the steeper turning state, that is, in accordance with the detected turning state of the vehicle.

As illustrated in FIGS. 39 and 40, more specifically, the rolling resistance Fx of the wheels becomes higher for the steeper (at the larger slip angle α) turning state of the vehicle, so that the lateral resistant force Fy of the wheels becomes the lower. Therefore, the lateral resistant force Fy of the drive wheels can be held at the larger value by making the drive force to be transmitted to the drive wheels, higher for the steeper turning state of the vehicle. Here, the turning state can be detected from at least one of data including the lateral acceleration of the vehicle, the left and right wheel speeds of the vehicle and the steering angle of the vehicle.

When the turning state is detected on the basis of the lateral acceleration of the vehicle, the drive force to be transmitted to the drive wheels may be raised if the detected lateral acceleration exceeds a predetermined value. When the turning state is detected on the basis of the left and right wheel speeds, the drive force to be transmitted to the drive wheels may be raised if the difference between the detected left and right wheel speeds exceeds a predetermined value. When the turning state is detected on the basis of the steering angle of the vehicle, the drive force to be transmitted to the drive wheels may be raised if the detected steering angle exceeds a predetermined value.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 7 is a flow chart showing an engine brake control routine;

DESCRIPTION OF THE PREFERRED EMBODIMENTS

The present invention will be described in connection with its embodiments with reference to the accompanying drawings.

First of all, here will be described the entire construction of a vehicular motion controlling system according to a first embodiment.

Figure 4:
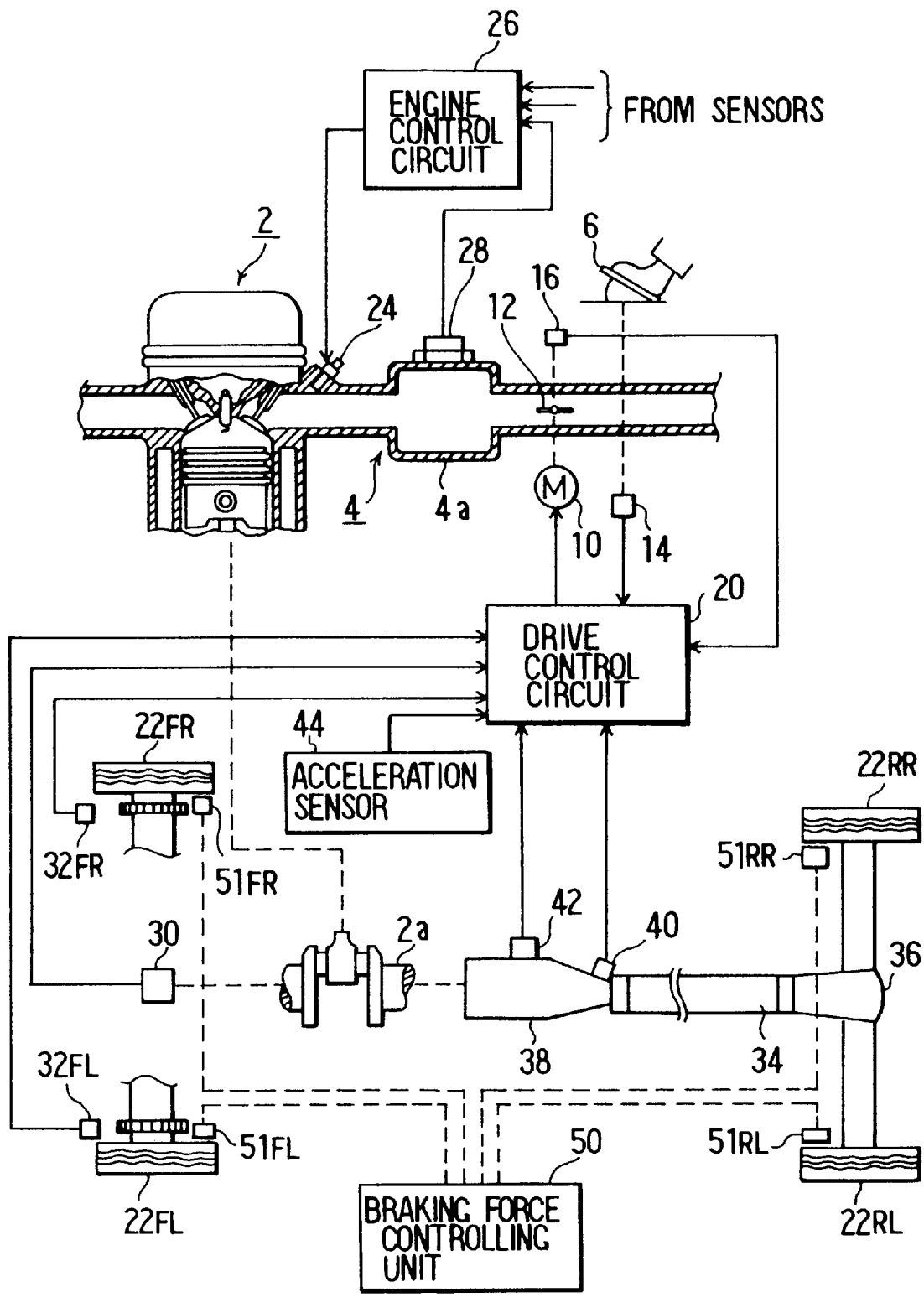
FIG. 4 is a diagram showing a schematic constitution of a vehicular motion controlling system of the first embodiment.

As shown in FIG. 4, the present embodiment is applied to a front-engine/rear-drive (FR) vehicle having an internal combustion engine 2 as its prime mover.

In an intake passage 4 of the internal combustion engine 2, as shown in FIG. 4, there is formed a surge tank 4a for suppressing pulsations of the intake air. Upstream of the surge tank 4a, there is arranged a throttle valve 12 which is opened/closed by a throttle drive motor 10. The throttle valve 12 is of the so-called "linkless throttle" and is not directly opened/closed by an accelerator 6.

These accelerator 6 and throttle valve 12 are respectively equipped with an accelerator opening sensor 14 and a throttle opening sensor 16, the detected signals of which are inputted to a drive control circuit 20.

A fuel injection valve 24 for feeding the fuel into the internal combustion engine 2 is activated on the basis of a fuel injection command coming from a well-known internal combustion engine control circuit 26. The fuel injection command is determined to fit the running state of the internal combustion engine 2 and is prepared by processing the data from various sensors including an intake pressure sensor 28 for detecting the pressure in the surge tank 4a, on the basis of a fuel injection command program of the internal combustion engine control circuit 26.

The drive control circuit 20 performs drive wheel control, as will be detailed hereinafter. To this drive control circuit 20, there are inputted not only the signals detected by the accelerator opening sensor 14 and the throttle opening sensor 16 but also the signals detected by an engine rotational speed sensor 30, driven wheel speed sensors 32FL and 32FR, a drive wheel speed sensor 40, a gear ratio sensor 42 and an acceleration sensor 44. Moreover, the drive control circuit 20 drives the throttle drive motor 10 on the basis of those input signals and controls the opening of the throttle valve 12.

Here, the engine rotational speed sensor 30 detects the rotational speed of a crankshaft 2a of the internal combustion engine 2 and is also used to prepare the fuel injection command by the internal combustion engine control circuit 26.

The driven wheel speed sensors 32FL and 32FR detect the rotational speeds of left and right driven wheels (or front wheels) 22FL and 22FR, respectively, so that their detected signals are utilized to estimate the body speed of the vehicle in the case of performing traction control or the like.

The drive wheel speed sensor 40 detects the average rotational speed (i.e., the drive wheel speed) of left and right drive wheels 22RL and 22RR and is mounted on the output shaft of a transmission 38 for transmitting the rotation of the crankshaft 2a to the left and right drive wheels 22RL and 22RR through a propeller shaft 34 and a differential gear 36.

Moreover, the gear ratio sensor 42 detects the gear ratio of the transmission 38 and is mounted like the drive wheel speed sensor 40 on the transmission 38.

Especially in the present embodiment, there is provided a braking force controlling unit 50 capable of performing driven wheel control, as will be described in the following. This braking force controlling unit 50 is exemplified in the present embodiment by a unit capable of performing well-known traction control for braking the individual wheels 22FL, 22FR, 22RL and 22RR (as will be represented by numeral 22) even when the brake pedal 6 is not depressed and anti-skid control when the brake pedal 6 is depressed, but may be a unit capable of braking at least the driven wheels (i.e., the front wheels 22FL and 22FR).

Figure 5:
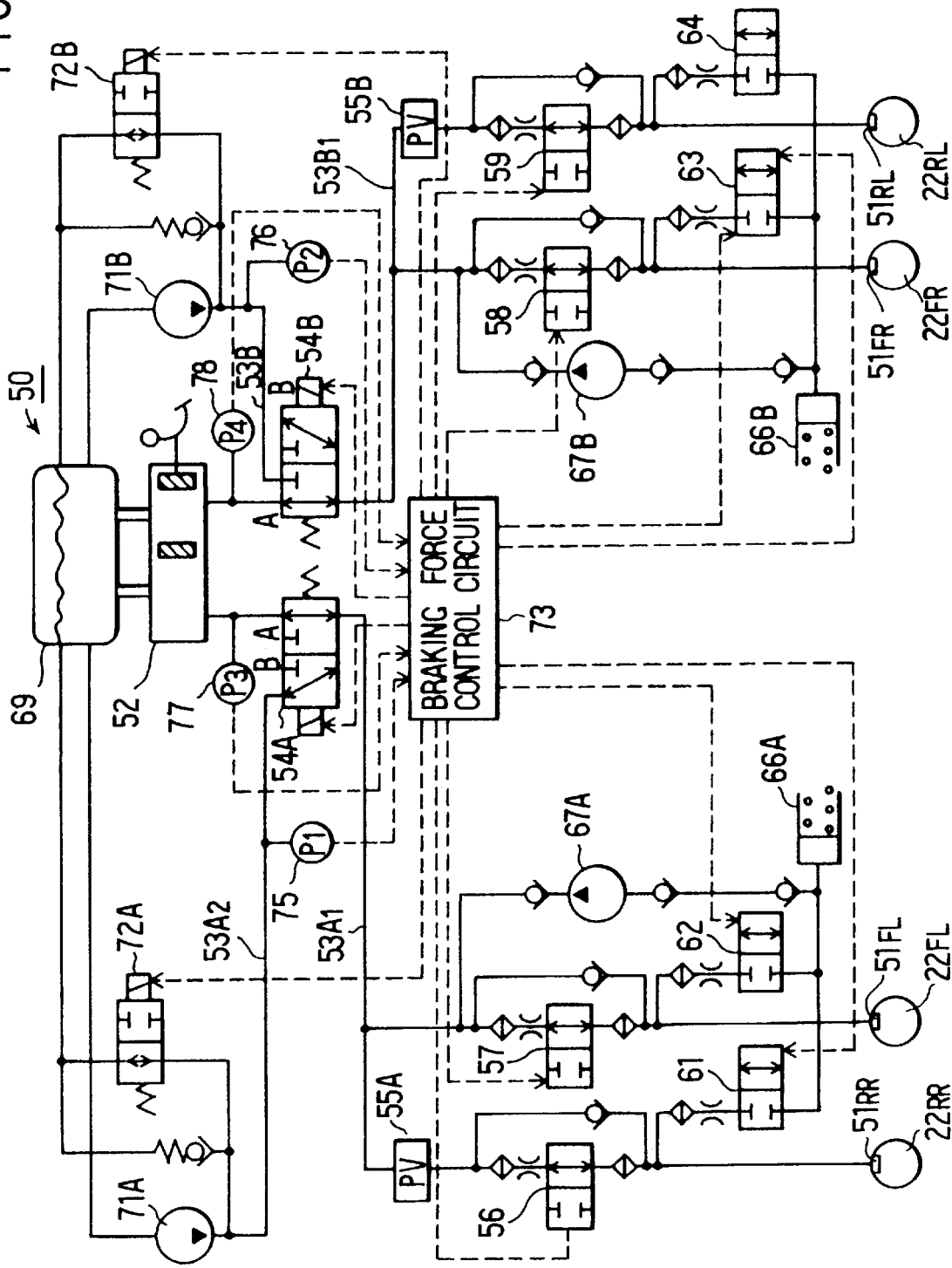
FIG. 5 is a diagram showing a hydraulic circuit and a control device of a braking force controlling system.

As shown in FIG. 5, the braking force controlling unit 50 is equipped with an diagonally-piped hydraulic circuit having piping lines individually for the right front wheel 22FR—the left rear wheel 22RL and the left front wheel 22FL—the right rear wheel 22RR and controls the braking forces for suppressing the rotations of the wheels 22 by adjusting the brake fluid pressures (i.e., the wheel cylinder pressures) to be applied to the wheel cylinders 51FL, 51FR, 51RL and 51RR (as will be represented by numeral 51) of the individual wheels 22. of the piping line, a conduit 53A1 leading from a master cylinder 52 to the wheel cylinders 51RR and 51FR is equipped with: a three-way change-over valve 54A for switching the hydraulic circuit (into two positions); a proportioning control valve 55A for applying a high brake fluid pressure to the front wheel 51FL side; increasing control valves 56 and 57 for opening/closing conduits leading from the master cylinder 52 to the wheel cylinders 51RR and 51FR; reducing control valves 61 and 62 for opening/closing conduits leading from the wheel cylinders 51RR and 51FL to a reservoir 66A; the reservoir 66A for reserving the brake fluid coming from the wheel cylinders 51RR and 51FL; and a pump 67A for pumping up the brake fluid from the reservoir 66A to the master cylinder 52. On top of which, a conduit 53A2 leading from a master reservoir 69 to the three-way change-over value 54A is equipped with a pump 71A for increasing the brake fluid pressure and a pressure control valve 72A for opening/closing a conduit between the downstream of the pump 71A and the master reservoir 69.

Of these components, when the three-way change-over valve 54A is switched to position A, the ordinary braking operation by the driver via a conduit 53A1 and well-known anti-skid control using the increasing control valves 56 and 57, the reducing control valves 61 and 62, the reservoir 66A and the pump 67A can be performed. When the three-way change-over valve 54A is switched to position B, on the other hand, well-known traction control and driven wheel control of the present embodiment by the high brake fluid pressure generated by the pump 71A can be performed.

Of the aforementioned piping line, on the other hand, the other conduit 53B1 leading from the master cylinder 52 to the wheel cylinders 51FR and 51RL is equipped as in the aforementioned conduit 53A1 with: a three-way change-over valve 54B to be switched into two positions; a proportioning control valve 55B; increasing control valves 58 and 59; reducing control valves 63 and 64; a reservoir 66B; and a pump 67B. On top of which, a conduit 53B2 leading from the master reservoir 69 to the three-way change-over valve 54B is equipped as in the conduit 53A2 with a pump 71B and a pressure control valve 72B.

The braking force controlling unit 50 thus constructed is provided with a braking force control circuit 73 for controlling the drive thereof. To this braking force control circuit 73, there are inputted the detection signals for detecting the braking state, from first and second pressure sensors 75 and 76 for detecting the brake fluid pressure between the individual three-way change-over valves 54A and 54B and the individual pumps 71A and 71B, and third and fourth sensors 77 and 78 for detecting the brake fluid pressure between the individual three-way change-over valves 54A and 54B and the master cylinder 52. In accordance with the braking state detected based on these detection signals, moreover, the control signals are outputted to the increasing control valves 56 to 59, the reducing control valves 61 to 64, the pressure control valves 72A, 72B, and the pumps 71A and 71B.

Here will be described drive wheel control and driven wheel control (as will be generally called the "engine brake control") of the present embodiment, as performed by the drive control circuit 20 and the braking force control circuit 73.

Figure 6:
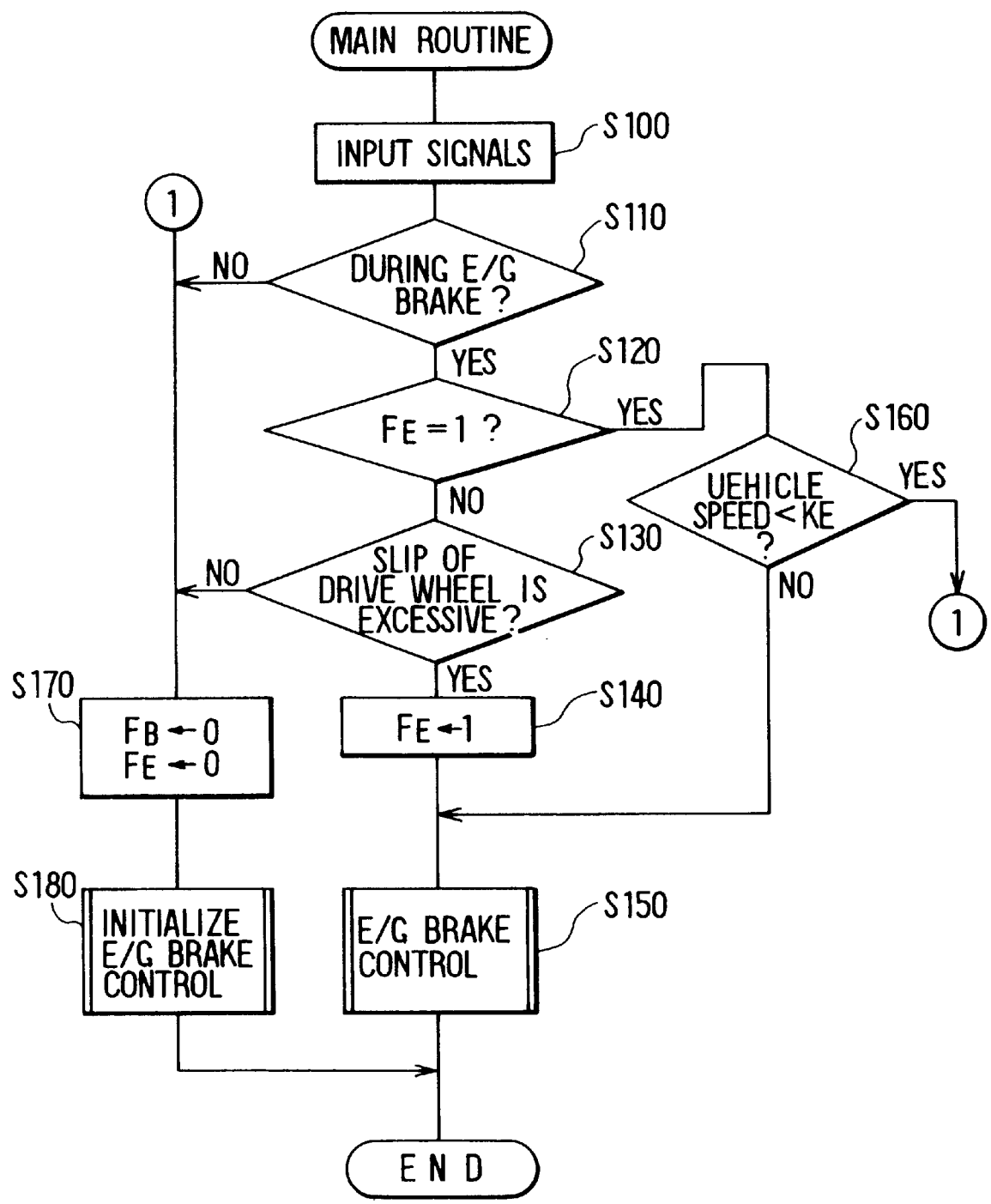
FIG. 6 is a flow chart showing a main routine of engine brake control.

First of all, the main routine of engine braking control of the present embodiment will be described on the basis of the flow chart of FIG. 6.

At Step S100, the signals of the various sensors are inputted.

At subsequent Step S110, whether or not the vehicle is being braked by the engine (i.e., during the E/G brake) is determined depending upon whether or not the accelerator 6 or the throttle valve 12 is released, on the basis of the signal of the accelerator opening sensor 14 or the throttle opening sensor 16. When the answer of Step S110 is YES, the routine advances to Step S120. When NO, on the other hand, the routine advances to Step S160.

At Step S120, whether or not engine brake control is in progress is determined depending upon whether or not a flag FE indicating the engine brake control is set (at 1). The routine advances to Step S160, when this answer is YES, and to Step S130 when NO.

At Step S130, whether or not the slip of the drive wheels is excessive is determined from the slip ratio of the drive wheels. The routine advances to Step S140, when the answer is YES, and to Step S170 when NO. Here, the slip ratio of the drive wheels is a division of the difference between the rotational speeds of the drive wheels and the driven wheels by the rotational speed of the driven wheels.

At Step S140, the flag FE is set (to 1) while assuming that the conditions for engine brake control are satisfied.

At subsequent Step S150, the present routine is once ended by executing engine brake control, as will be described in more detail.

At Step S160 to be reached by the answer YES of Step S120, on the other hand, it is determined whether or not the body speed (or vehicle speed), which is obtained from the wheel speeds of the driven wheels, is lower than a reference value KE. The routine advances to Step S170, when the answer is YES, and to Step S150 to execute engine brake control when NO. In other words, when the vehicle speed is low, the vehicle will not become unstable and so engine brake control is not required. By this determination, therefore, it is determined whether or not engine brake control is necessary.

At Step S170, moreover, there is reset not only a flag FB indicating that drive wheel rotational speed is higher than driven wheel rotational speed but also the flag FE indicating that engine brake control is in progress.

At subsequent Step S180, engine brake control is stopped (or not started) to end the routine by setting the target value of the throttle opening to 0, for example, and by turning OFF the pumps 71A and 71B, the three-way change-over valves 54A and 54B and the pressure control valves 72A and 72B to initialize engine brake control.

Thus, according to the present main routine, engine brake control can be actually executed when the predetermined conditions are satisfied.

With reference to the flow chart of FIG. 7, here will be described engine brake control to be executed at the foregoing Step S150.

At Step S200, the vehicle speed difference DFR is calculated by subtracting the drive wheel speed VR from the driven wheel speed VF. Here, the driven wheel speed VF is an average of the left and right driven wheel speeds.

At Step S210, it is determined whether or not the flag FB has already been set, that is, whether or not the drive wheel speed VR was already higher than the driven wheel speed VF. The routine advances to Step S250, when the answer is YES, and to Step S220 when NO.

At Step S220, it is determined whether or not the wheel speed difference DFR is negative for the first time, that is, whether or not the drive wheel speed VR is higher than the drive wheel speed VF. The routine advances to Step S250, when the answer is YES, and to Step S230 when NO.

In short, when the vehicle is being braked by the engine brake so that the drive wheel speed VR is not higher than the driven wheel speed VF (that is, in which the answer of Step S220 is NO), the engine braking effect is so high that the conditions for executing engine brake control are satisfied.

At Step S230, therefore, drive force increasing control (i.e., a portion of drive wheel control) for enhancing the stability of the vehicle is executed by increasing the engine output, as will be detailed.

At subsequent Step S240, braking force increasing control (i.e., driven wheel control) for preventing the body deceleration from lowering is executed by increasing the wheel cylinder pressure of the driven wheels to apply the braking force to the driven wheels, as will be detailed.

At Step S250 to be taken when the answers of Steps S210 and S220 are YES, on the other hand, the flag FB is set (at 1).

At subsequent Step S260, it is determined whether or not the wheel speed difference DFR is negative. The routine advances to Step S270, when the answer is YES, and to Step S290 when NO.

At Step S270, it is determined whether or not the absolute value of the wheel speed difference DFR is smaller than a reference value KV2. The present routine is once ended, when the answer is YES, and to Step S280 when NO.

In other words, the case of arrival at Step S280 through the decisions of Steps S260 and S270 is thought to occur when the drive wheel speed VR is considerably higher than the driven wheel speed VF as the result that the drive force is excessive.

At Step S280, therefore, drive force reducing control (or a portion of drive wheel control) for reducing the engine output is executed to once end the present routine.

At Step S290 to be taken when it is determined at Step S260 that the driven wheel speed VF is higher than the drive wheel speed VR, moreover, it is determined whether or not the wheel speed difference DFR is smaller than a reference value KV1. The present routine is once ended, when the answer is YES, and advances to Step S295 when NO.

In short, when the routine advances to Step S295 through the determinations of Steps S260 and S290, the drive wheel speed VR is considered to be considerably lower than the driven wheel speed VF as the result that the drive force is excessively low.

At Step S295, therefore, the present routine is once ended by executing drive force increasing control for increasing the engine output.

With reference to the flow chart of FIG. 8A, here will be described drive force increasing control to be executed at Steps S230 and S295.

Figure 9A:
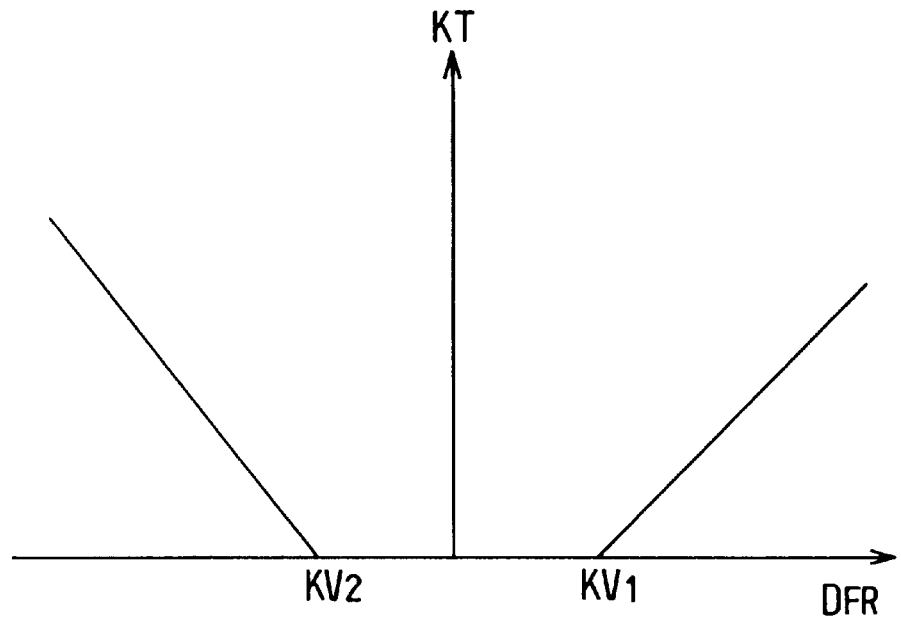
FIG. 9A is a graph illustrating a relation between a wheel speed difference and KT.

At Step S300, a requested wheel drive torque variation ΔT is set to KT (i.e., a positive value). Here, this value KT is a torque variation varying the engine output for every control cycles and may be either a fixed value or determined from the map of the wheel speed difference DFR and the torque variation KT, as illustrated in FIG. 9A.

At subsequent Step S310, the present routine is once ended by executing the later-described target opening calculation to calculate a target opening TH of the throttle valve 12.

With reference to the flow chart of FIG. 8B, here will be described the target opening calculation, as executed at the foregoing Step S310.

Figure 9B:
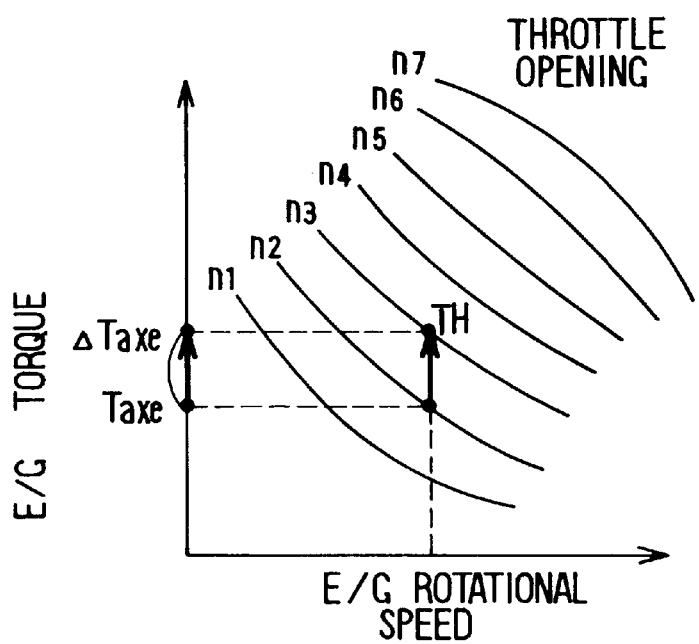
FIG. 9B is a graph illustrating a relation among an engine shaft torque, an engine rotational speed and a throttle opening.

At Step S400, an estimated engine shaft torque Taxe is calculated from the prevailing engine rotational speed and throttle opening by using the map plotting the relations among the engine shaft torque, the engine rotational speed and the throttle opening, as illustrated in FIG. 9B.

At subsequent Step S410, a requested engine shaft torque variation ΔTaxe is calculated by substituting the value ΔT, as set at Step S300, into the following Formula (1):

$$\Delta Taxe = \Delta T/(Im \times If) \tag{1},$$

wherein Im: the speed change gear ratio, and If: the final gear ratio.

At subsequent Step S420, the throttle opening TH is determined from the prevailing engine rotational speed and the target value of the engine shaft torque (Taxe+ΔTaxe) by using the map illustrated in FIG. 9B, and the present routine is once ended.

Figure 8A:
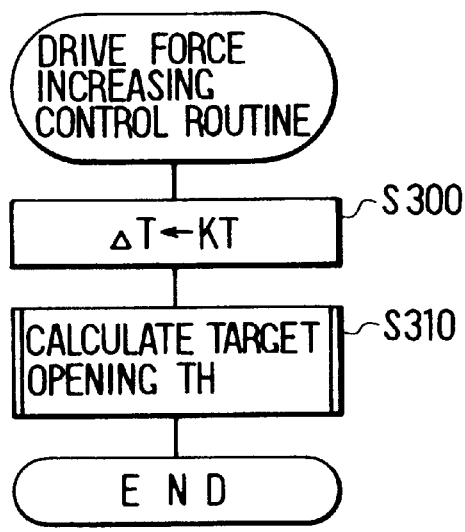
FIG. 8A is a flow chart showing a drive force increasing control routine.
Figure 8B:
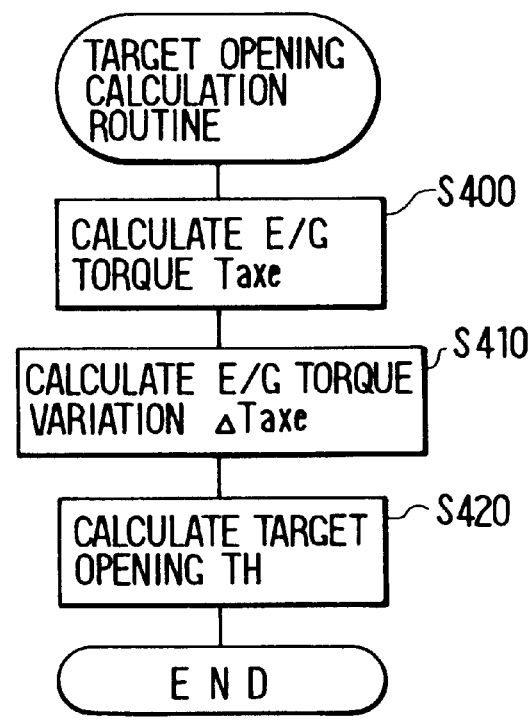
FIG. 8B is a flow chart showing a target opening calculating routine.

In drive force increasing control shown in FIGS. 8A and 8B, therefore, by controlling the opening of the throttle valve 12 to the throttle opening TH determined at Step S420, the engine output can be increased to increase the drive force to a desired value (i.e., to reduce the engine braking force).

Figure 8C:
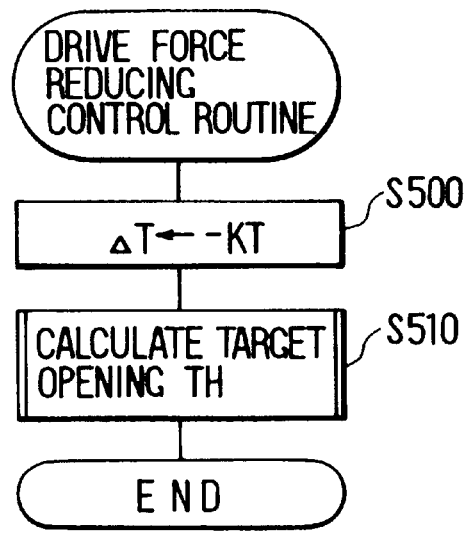
FIG. 8C is a drive force reducing control routine.

With reference to the flow chart of FIG. 8C, here will be described drive force reducing control to be performed at the aforementioned Step S280.

At Step S500, the requested wheel drive torque variation ΔT is set to −KT (at a negative value). Here, the value KT is equal to the value of the aforementioned Step S300.

At subsequent Step S510, the target opening calculation, as described with reference to FIG. 8B, is executed to calculate the target opening TH of the throttle valve 12, and the present routine is once ended.

In this drive force reducing control, therefore, by controlling the opening of the throttle valve 12 to the throttle opening TH determined at Step S510, the engine output can be reduced to reduce the drive force to the desired value (i.e., to increase the engine braking force).

Figure 10:
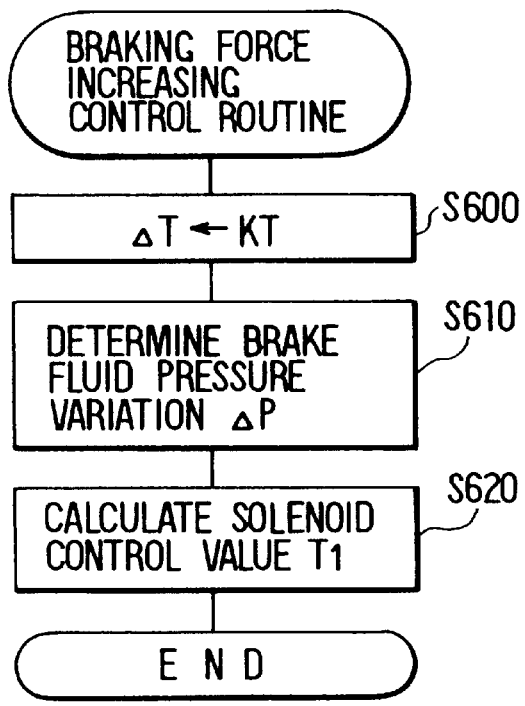
FIG. 10 is a flow chart showing a braking force increasing control routine.

With reference to the flow chart of FIG. 10, here will be described braking force increasing control to be executed at the aforementioned Step S240.

At Step S600, the requested wheel drive torque variation ΔT is set to KT (at a positive value). Here, the value KT is equal to the value of the foregoing Step S300.

At subsequent Step S610, the value ΔT, as set at Step S600, is substituted into the following Formula (2) to calculate a requested brake fluid pressure variation ΔP:

$$\Delta P = \Delta T/(2 \times \mu \times \Gamma \times Aw) \tag{2}$$

wherein $\mu$ is a friction coefficient between a brake pad and a rotor, $\Gamma$ is an effective radius of the rotor, and Aw is a sectional area of the wheel cylinder.

Figure 11:
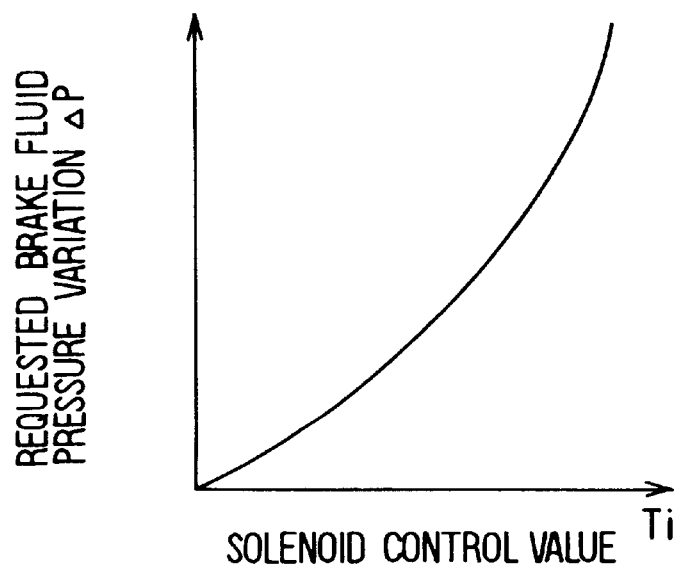
FIG. 11 is a graph illustrating a relation between a requested brake fluid pressure variation and a requested solenoid value control signal.

At subsequent Step s620, a requested solenoid control value T1, i.e., a time period for turning OFF of the increasing control valves 57 and 58 of the driven wheels is calculated, and the present routine is once ended. As shown in FIG. 11, more specifically, the requested solenoid control valve T1 [ms] is determined from the requested brake fluid pressure variation ΔP determined at Step S610, by using the map plotting the relation between the requested brake fluid pressure variation ΔP and the requested solenoid control value T1, as illustrated in FIG. 11.

In short, for the larger requested solenoid value T1, the increasing control valves 57 and 58 have the longer OFF time periods so that the higher brake fluid pressures, as boosted by the pumps 71a and 71B, are fed to the wheel cylinders 51FL and 51FR of the driven wheels 22FL and 22FR thereby to raise the braking force.

Figure 1A:
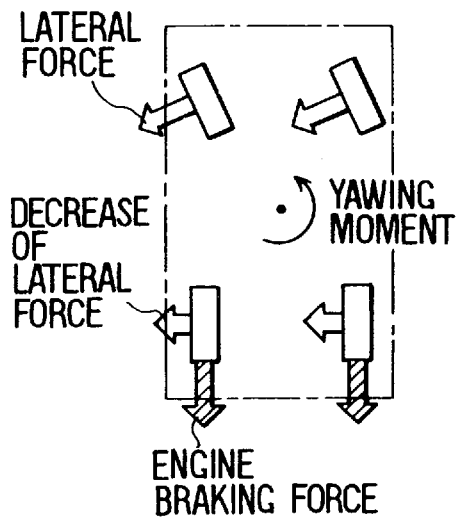
FIGS. 1A and 1B are explanatory diagrams for explaining the principle of a first embodiment in comparison with an example of the prior art.
Figure 1B:
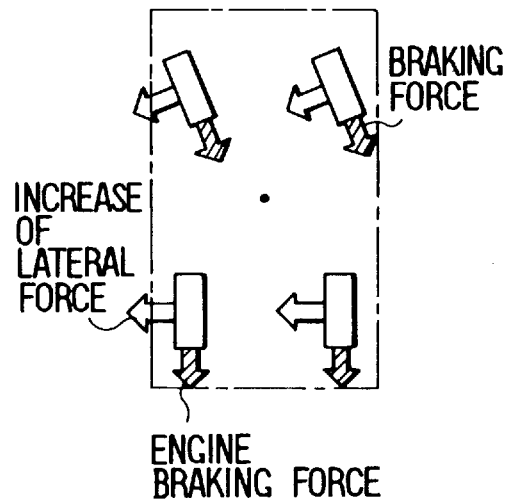
Figure 2:
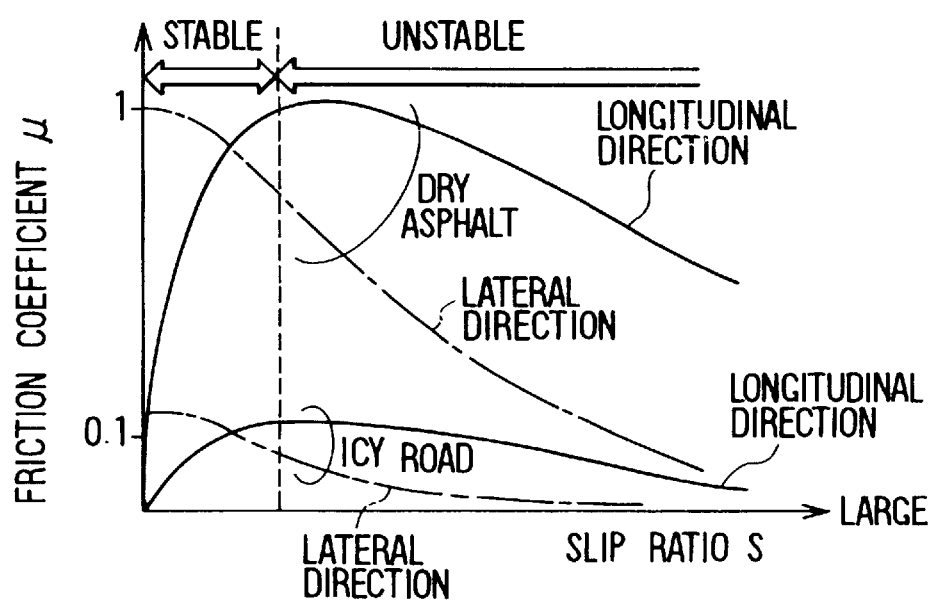
FIG. 2 is a graph illustrating μ-S characteristics.
Figure 3A:
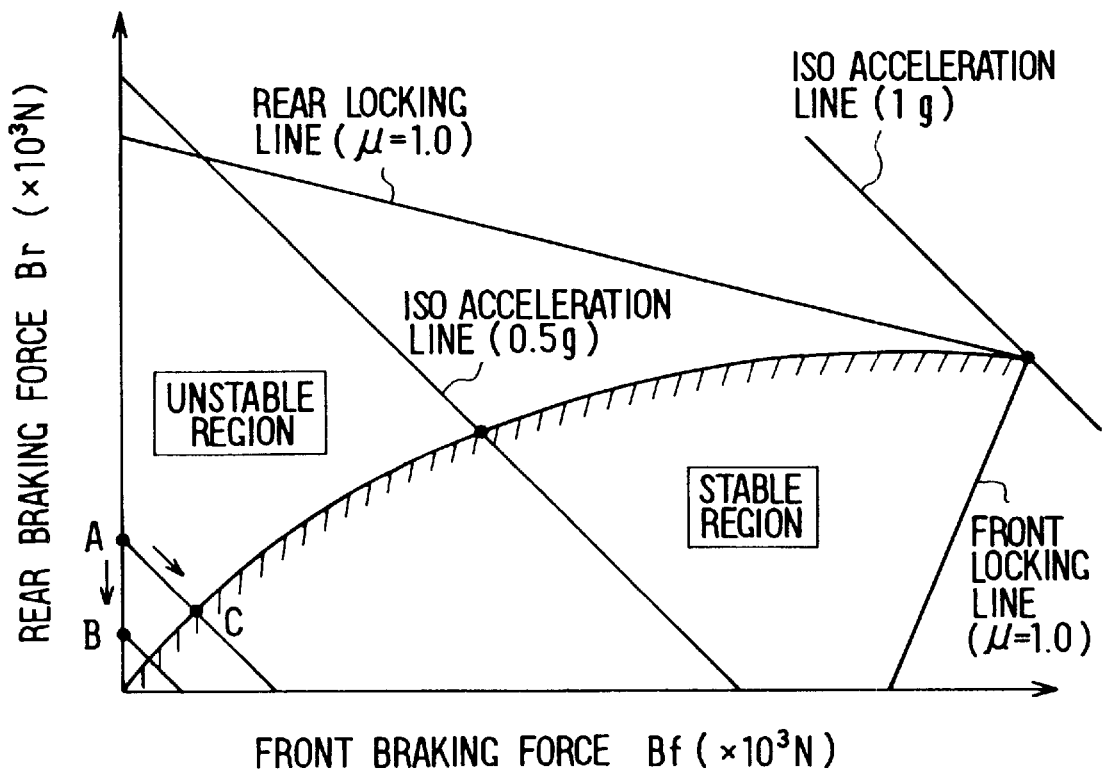
FIGS. 3A and 3B are explanatory diagrams illustrating relations between rear braking force and front braking force.
Figure 3B:
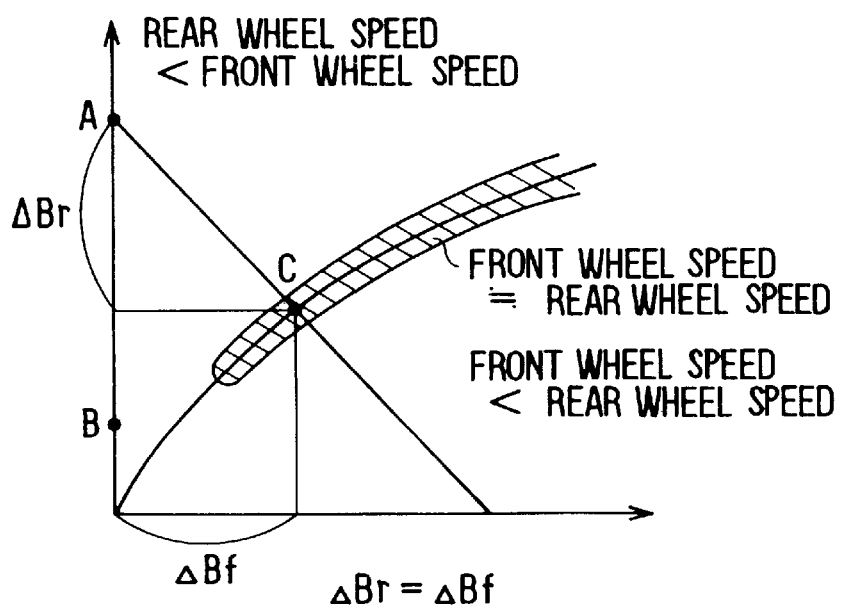

Especially in the present embodiment, for the ideal braking force distribution (as indicated by point C, for example) illustrated in FIG. 3, the distribution is adjusted between the rear braking force reduced by drive force increasing control and the front braking force increased by braking force increasing control. Specifically, by equalizing the requested wheel torque variation ΔT in the drive force increasing control and the requested wheel torque variation ΔT in the braking force increasing control, the reduction in the engine braking force of the drive wheels according to the increase in the engine output and the braking force by the increase in the braking fluid pressure of the driven wheels are equalized.

The operations by the aforementioned drive wheel control and driven wheel control will be described with reference to the time chart of FIG. 12.

Figure 12:
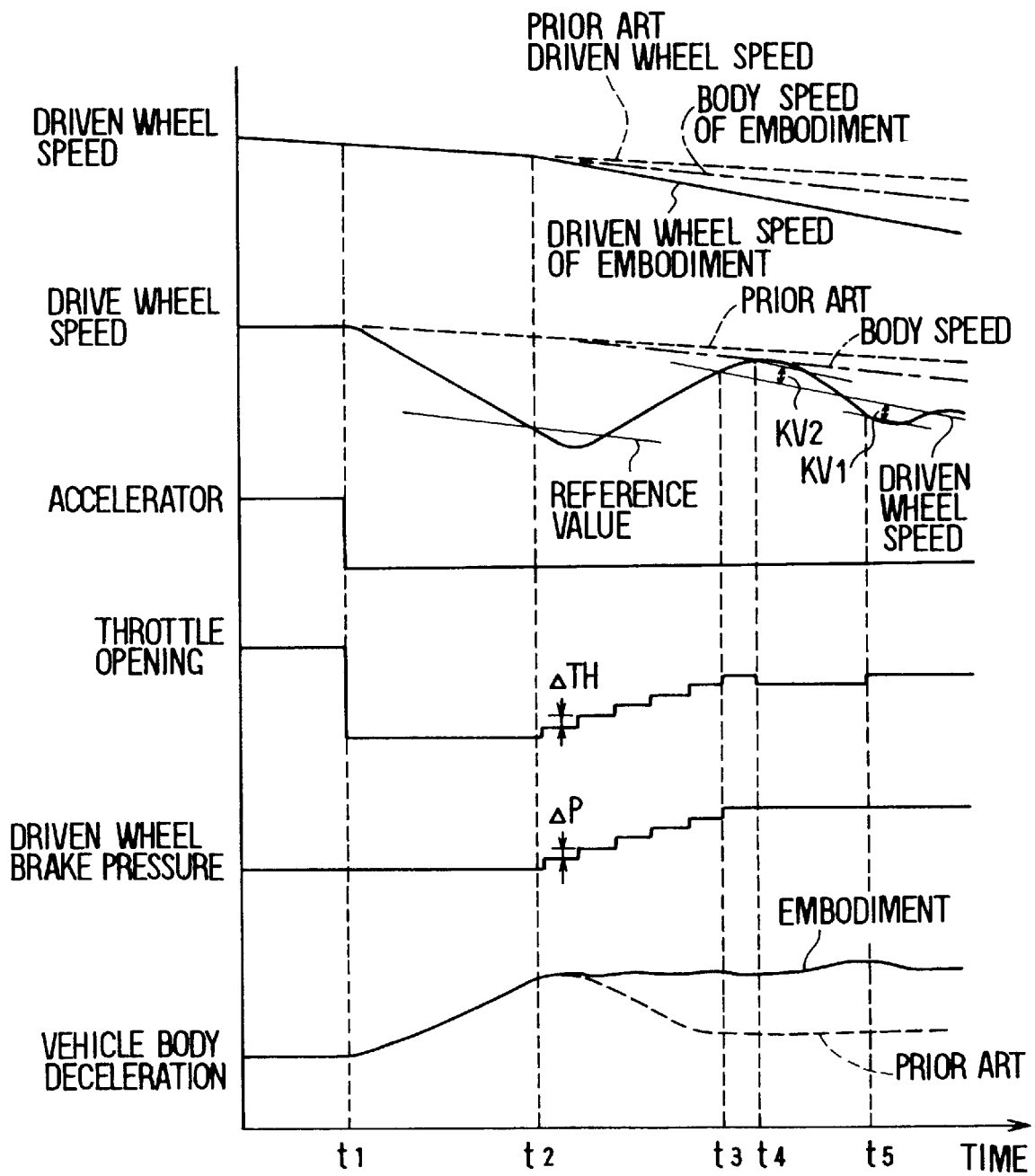
FIG. 12 is a time chart illustrating the operations by engine brake control.

When the accelerator pedal 6 is returned at a time t1 to effect the engine brake, as illustrated in FIG. 12, the drive wheel speed is gradually lowered.

When the slip ratio (corresponding to the difference between the drive wheel speed and the driven wheel speed)

exceeds the reference value at a time t2, engine braking control of the present embodiment is started. Specifically, the throttle opening is gradually increased to execute drive force increasing control, and the brake fluid pressures of the driven wheels are gradually increased to execute braking force increasing control. The drive wheel speed is gradually raised by drive force increasing control, and the driven wheel speed is gradually lowered by braking force increasing control.

At a time t3, the drive wheel speed exceeds the driven wheel speed. At a time t4, the drive wheel speed is higher by a predetermined value KV2 than the driven wheel speed, and it is determined that the engine output is excessive. Thus, the throttle opening is reduced, and the braking force of the driven wheels is kept.

At a time t5, on the other hand, the drive wheel speed is smaller by a predetermined value KV1 than the driven wheel speed, and it is determined that the engine braking force is excessive. Thus, the throttle opening is increased.

According to the present embodiment, when the slip ratio of the drive wheels exceeds the reference value, there are executed drive force increasing control for the drive wheels and braking force increasing control for the driven wheels. At the same time, when the increase in the engine output by drive force increasing control is excessive the engine output is reduced, and the engine output is increased when the engine braking force is excessive.

By this engine braking control, a higher vehicle deceleration than the prior art can be kept without making the vehicle unstable. In a turning state or when running on a low friction road such as a frozen road, a stable drive can be realized while exhibiting a high braking performance.

In the present embodiment, moreover, the reduction in the engine braking force due to the increase in the engine output is compensated by the braking force to be applied to the driven wheels, thereby to acquire an ideal braking force distribution. This makes it possible to achieve the body deceleration which could be expected by the driver when the driver applies the engine braking force.

Although the present invention has been described in connection with its first embodiment, it should not be limited thereto but can naturally be exemplified in various ways without departing from the gist thereof.

In the first embodiment, for example, the engine braking force is applied by releasing the accelerator pedal. However, the present invention can be applied to the system in which the engine braking force is automatically applied. For example the present invention can be applied to control (e.g., automatic brake control or the automatic throttle control) in which the throttle is automatically returned to apply the braking force.

In the first embodiment, moreover, engine brake control is started when the slip ratio of the drive wheels exceeds the predetermined value, but may pay attention to the road surface $\mu$. In this modification, if the road surface has a low $\mu$, the timing for starting engine brake control may be advanced because of the high possibility of the slip.

Although the first embodiment has been exemplified by the FR car, similar engine brake control can be made on the FF car. Specifically, similar drive wheel control can be executed on the front wheels or the drive wheels, and similar driven wheel control can be executed on the rear wheels or the driven wheels. As a result, the slip ratio of the drive wheels is reduced to increase the lateral resistant force, and the braking force on the driven wheels is increased so that a high braking performance can be stably exhibited without any tuck-in phenomenon.

The present invention will be described in connection with its second embodiment.

Figure 13:
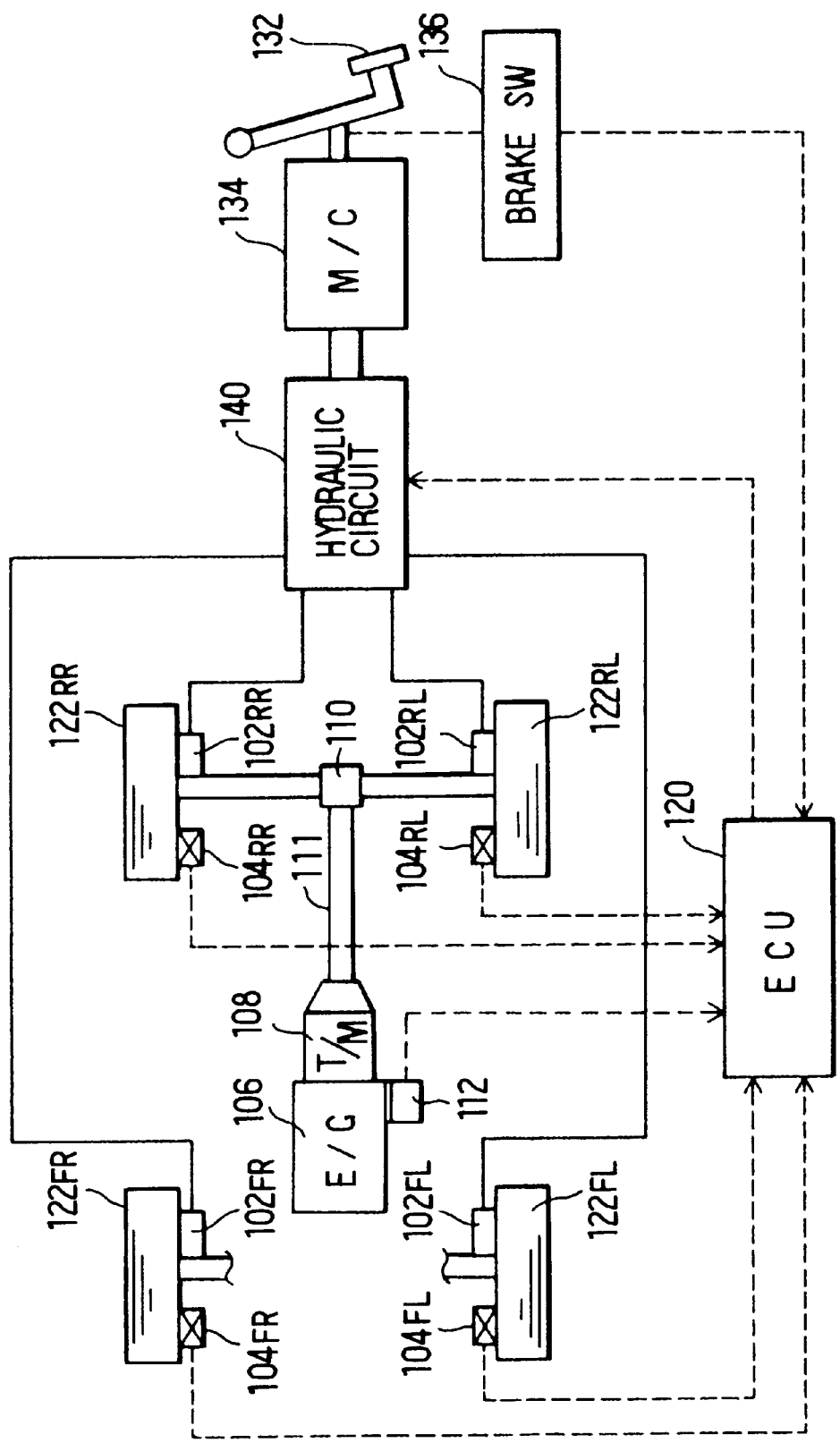
FIG. 13 is a schematic diagram showing the entire construction of a control system for a rear-drive car according to a second embodiment.

First of all, FIG. 13 is a schematic diagram showing the entire construction of a control system of a rear wheel drive car according to the second embodiment.

As shown in FIG. 13, the individual wheels (a left front wheel 122FL, a right front wheel 122FR, a left rear wheel 122RL and a right rear wheel 122RR) of the vehicle are equipped with: hydraulic brake units (as will be called "wheel cylinders: W/C") 102FL, 102FR, 102RL and 102RR as wheel braking force generating devices for applying the braking forces to the individual wheels 122FL to 122RR; and wheel speed sensors 104FL, 104FR, 104RL and 104RR for detecting the rotational speeds (as will be called "wheel speeds") of the individual wheels.

Moreover, the vehicle driving force (or drive torque) to be outputted from an engine 106 through a transmission (T/M) 108 is distributed through a propeller shaft 111 and a differential gear 110 to the left and right rear wheels (or drive wheels) 122RL and 122RR. On the other hand, the engine 106 is equipped with an accelerator switch 112 which is turned ON when the vehicle driver depresses the accelerator pedal. The detection signal from this accelerator switch 112 and the detection signals from the individual wheel speed sensors 104FL to 104 RR are inputted to an electronic control unit (as will be abbreviated to "ECU") 120.

This ECU 120 executes: anti-skid control for suppressing the slip occurring at the wheels when the vehicle is braked, by controlling the various actuators in a hydraulic circuit 140 which is disposed in the brake fluid pressure line leading from a master cylinder (as will be abbreviated to "M/C") 134 for discharging the brake fluid to the W/C 102FL to 102RR of the individual wheels 122FL to 122RR when a brake pedal 132 is depressed; and vehicular motion control for applying the braking force to the front wheels (or driven wheels) 122FL and 122FR by detecting the engine braking states of the drive wheels 122RL and 122RR, as accompanying the reduction in the drive force to be transmitted from the engine 106 to the drive wheels 122RL and 122RR, by controlling the various actuators in the hydraulic circuit 140 when the engine brake is active.

Here, the ECU 120 is constructed mainly of a microcomputer composed of a CPU, a ROM and a RAM and is further fed with a detection signal from a brake switch 136 which is turned ON when the brake pedal 132 is depressed.

Here will be described the hydraulic circuit 140.

Figure 14:
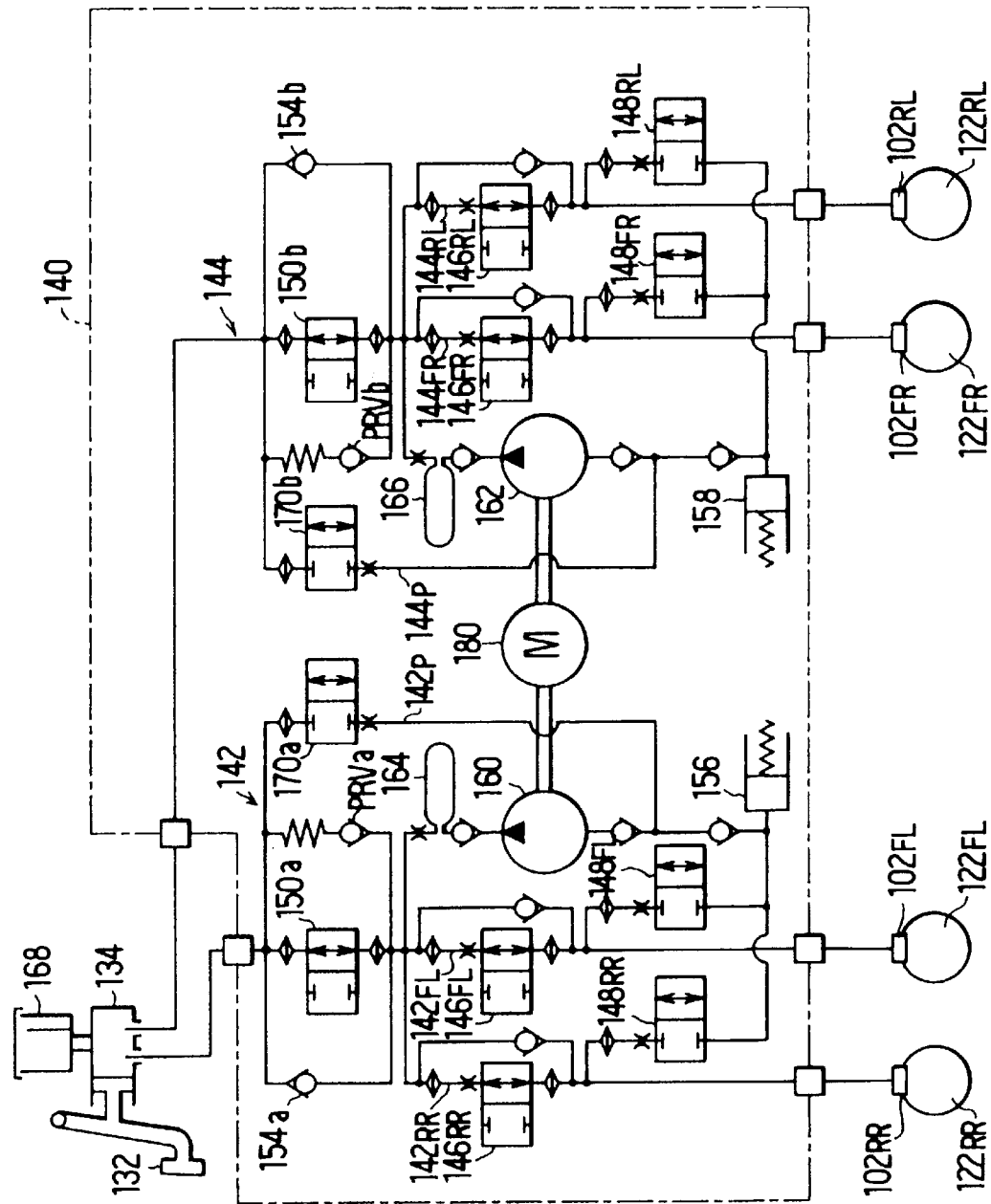
FIG. 14 is a diagram showing the construction of a hydraulic circuit of the second embodiment.

As shown in FIG. 14, the hydraulic circuit 140 is equipped with two brake fluid pressure lines 142 and 144 for feeding the brake fluid, as sent from the two brake fluid lines of the M/C 134, to the wheel cylinders 102FL and 102RR of the left front wheel 122FL and the right rear wheel 122RR, and the wheel cylinders 102FR and 102RL of the right front wheel 122FR and the left rear wheel 122RL.

Of the brake fluid pressure line 142, a conduit 142FL leading to the W/C 102FL of the left front wheel 122FL and a conduit 142RR leading to the W/C 102RR of the right rear wheel 122RR are respectively equipped with: solenoid increasing control valves 146FL and 146RR, which can be switched between an increasing position for providing the communication of the conduits 142FL and 142RR and a holding position for closing the conduits 142FL and 142RR; and solenoid reducing control valves 148FL and 148RR for discharging the individual brake fluid in the W/Cs 102FL and 102RR to a reservoir 156.

Of the brake fluid pressure line 144, a conduit 144FR leading to the W/C 102FR of the right front wheel 122FR and a line 144RL leading to the W/C 102RL of the left rear wheel 122RL are respectively equipped with: solenoid increasing control valves 146FR and 146RL which can be switched between an increasing position for providing the communication of the conduits 144FR and 144RL and a holding position for closing the conduits 144FR and 144RL; and solenoid reducing control valves 148FR and 148RL for discharging the individual brake fluid in the W/Cs 102FR and 102RL to a reservoir 158.

Here, the increasing control valves 146FL, 146FR, 146RL and 146RR are normally in the increasing position and are switched to the holding position when energized by the ECU 120. On the other hand, the reducing control valves 148FL, 148FR, 148RL and 14BRR are normally in the closing state and are switched to the communicating state when energized by the ECU 120, to discharge the brake fluid in the corresponding W/C 102FL to 102RR.

In the brake fluid pressure line 142, on the other hand, the conduit, as closer to the M/C 134 than the increasing control valves 146FL and 146RR, is equipped with a master cylinder cut valve (as will be abbreviated to "SM valve") 150a for opening/closing the conduit. In parallel with the SM valve 150a, moreover, there is connected a relief valve 154a which is opened, when the brake fluid pressure at the side of the M/C 134 exceeds the brake fluid pressure at the side of the increasing control valves 146FL and 146RR, to feed the pressurized brake fluid, which is provided from the M/C 134, to the increasing control valves 146FL and 146RR.

In the brake fluid pressure line 144, the conduit, as closer to the M/C 134 than the increasing control valves 146FR and 146RL, is equipped with a master cylinder cut valve 150b for opening/closing the conduit. In parallel with the SM valve 150b, moreover, there is connected a relief valve 154b which is opened, when the brake fluid pressure at the side of the M/C 134 exceeds the brake fluid pressure at the side of the increasing control valves 146FR and 146RL, to feed the pressurized brake fluid generated from the M/C 134, to the increasing control valves 146FR and 146RL.

Here, the SM valves 150a and 150b are opened, when the power supply thereto is OFF, and are switched to the closing state when energized by the ECU 120.

With the SM valves 150a and 150b, respectively, there are connected differential pressure valves PRVa and PRVb, which inhibit the flow of the brake fluid from the M/C 134 to the W/C 102FL to 102RR and allow the flow of the brake fluid from the W/C 102FL to 102RR to the M/C 134 when the brake fluid pressure at the W/C side grows higher by a predetermined level than that at the side of the M/C 134. This predetermined pressure may be set to 50 atms to 200 atms, and the individual differential pressure valves PRVa and PRVb protect the conduit so that the pressure in the conduit closer to the W/C 102FL to 102RR than the SM valves 150a and 150b may not exceed the predetermined level due to discharging of pumps 160 and 162.

In FIG. 14, the conduits are connected in parallel with the SM valves 150a and 150b and are equipped with the differential pressure valves PRVa and PRVb. In place of this construction, there may be adopted a construction in which the valve members of the SM valves 150a and 150b at their closing positions are exemplified by differential pressure valves having predetermined relief (or release) pressures, that is, the differential pressure valves PRVa and PRVb may be mounted in the respective SM valves 150a and 150b.

Moreover, the individual brake fluid pressure lines 142 and 144 are equipped with: reservoirs 156 and 158 for temporarily reserving the brake fluid discharged through the reducing control valves 148FL to 148RR; and pumps 160 and 162 for pumping the brake fluid to the conduits between the SM valves 150a and the increasing control valves 146FL and 146RR and to the conduits between the SM valve 150b and the increasing control valves 146FR and 146RL. The discharge lines of the brake fluid from the individual pumps 160 and 162 are respectively equipped with accumulators 164 and 166 for suppressing the pulsations in the internal brake fluid pressure.

The individual brake fluid pressure lines 142 and 144 are further equipped with brake fluid feed lines 142P and 144P for feeding the brake fluid directly to the pumps 160 and 162 from a reservoir 168 disposed on the M/C 134, through the M/C 134 at the time of executing the later-described vehicular motion control. In these individual brake fluid feed lines 142P and 144P, there are arranged reservoir cut valves (as will be abbreviated to "SR valves") 170a and 170b for opening/closing the lines 142P and 144P.

Here, the SR valves 170a and 170b are normally in closing state and are switched to the opening state when energized by the ECU 120. Moreover, the individual pumps 160 and 162 are driven through a motor 180 at the time of executing anti-skid control and vehicular motion control.

Here will be briefly described anti-skid control and vehicular motion control to be executed by the ECU 120. When neither anti-skid control nor vehicular motion control is executed, all the solenoid valves of the hydraulic circuit 140 are OFF, and FIG. 14 shows the no-control state.

When a slip is caused at each of the wheels 122FL to 122RR by an abrupt braking operation of the driver, for example, anti-skid control is started. With the SM valves 150a and 150b kept to the opening position (OFF) and with the SR valves 170a and 170b kept to the closing positions (OFF), the motor 180 is driven to activate the pumps 160 and 162, and the increasing control valves 146FL to 146RR and the reducing control valves 148FL to 148RR are individually turned ON/OFF (energized/deenergized) to switch the brake fluid pressures in the individual W/C 102FL to 102RR suitably into the reducing, holding and increasing states in accordance with the slip states of the individual wheels 122FL to 122RR.

Specifically, when it is determined that a wheel has a tendency to be locked, one of the increasing control valve 146FL to 146RR, as corresponding to the locked wheel, is closed (ON), and one of the reducing control valves 148FL to 148RR, as corresponding thereto, is opened (ON) so that the brake fluid pressure of the corresponding one of the W/C 102FL to 102RR is lowered to prevent the wheel from being locked. At this time, the brake fluid, as lowered in pressure, from the W/C 102FL to 102RR is discharged through the corresponding reducing control valve 148FL to 148RR to the reservoir 156 and 158, and the brake fluid, as reserved in the reservoirs 156 and 158, are circulated to the ordinary brake system by driving the motor 180.

When it is determined during anti-skid control that the tendency of the wheel to be locked is eliminated, the increasing control valve 146FL to 146RR, as corresponding to that wheel, is opened (OFF), and the reducing control valve 148FL to 148 corresponding thereto is closed (OFF) to increase the brake fluid pressure of the corresponding W/C 102FL to 102RR. When the W/C brake fluid pressure is abruptly increased in this case, the wheel takes the tendency to be locked. Therefore, both the increasing control valves 146FL to 146RR and the reducing control valves 148FL to 148RR are closed (i.e., the increasing control valves 146= ON, and the reducing control valves 148=OFF) to establish the state in which the W/C brake fluid pressures are held during the increase of the W/C brake fluid pressures. By this control, moreover, the W/C brake pressures are gradually increased to retain the stability of the vehicle while preventing the locking of the wheels.

After the end of anti-skid control, moreover, the motor 180 is driven for a predetermined time period for favorably performing the subsequent anti-skid control thereby to evacuate the brake fluid from the reservoirs 156 and 158.

[Vehicular Motion Control (Control of Braking Forces of Front Wheels 122FL & 122FR)]

Figure 17:
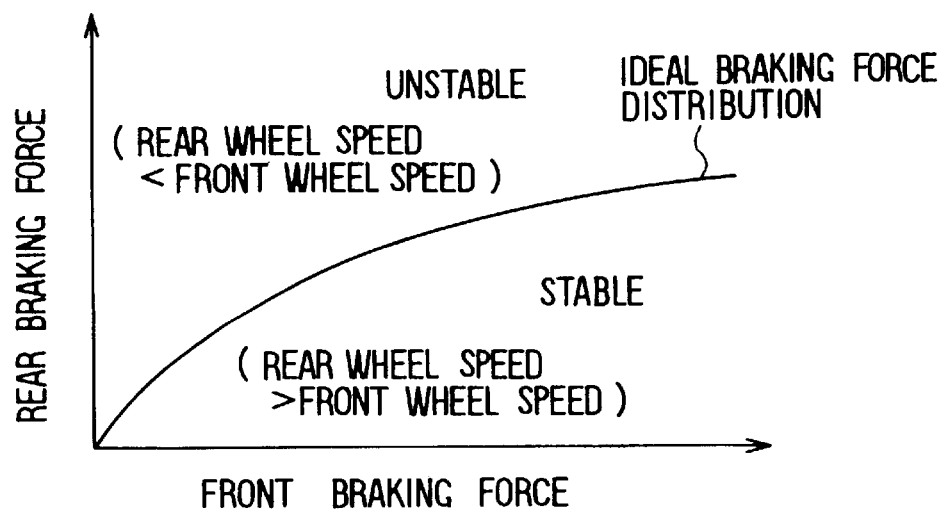
FIG. 17 is a graph illustrating an ideal braking force distribution diagram between front wheels and rear wheels of a vehicle.

When the rear wheels or the drive wheels are being braked by the engine brake, the lateral resistant forces of the rear wheels 122RL and 122RR may be lowered by the movement of load to make the vehicular motion unstable. In order to prevent this phenomenon, there is made vehicular motion control, by which the braking force corresponding to the load movement is applied to the front wheels 122FL and 122FR, when the engine brake is active, so that the braking force of the rear wheels 122RL and 122RR and the braking force of the front wheels 122FL and 122FR may fall within the stable region of the ideal braking force distribution diagram, as illustrated in FIG. 17.

In this vehicular motion control, moreover, the motor 180 is driven at first to activate the pumps 160 and 162, and the SM valves 150*a* and 150*b* and the SR valves 170*a* and 170*b* are turned ON (or energized). In short, with the SM valves 150*a* and 150*b* switched to the closing positions and with the SR valves 170*a* and 170*b* switched to the opening positions, the pumps 160 and 162 are enabled to pump the brake fluid from the reservoir 168, disposed on the M/C 134, to the individual increasing control valves 146FL to 146RR.

In this vehicular motion control, moreover, in accordance with the vehicle speed difference ΔV between the average wheel speed VF of the front wheels 122FL and 122FR and the average wheel speed VR of the rear wheels 122RL and 122RR, the average front wheel speed VF is controlled to be lower than the average rear wheel speed VR by turning ON/OFF the increasing control valves 146FL and 146FR and the reducing control valves 148FL and 148FR for increasing/reducing the brake fluid pressures of the W/C 102FL and 102FR of the front wheels 122FL and 122FR.

Specifically, the increasing control valves 146FL and 146FR and the reducing control valves 148FL and 148FR are activated to switch the brake fluid pressures of the front wheels 122FL and 122FR suitably into the increasing/ holding/reducing states so that the braking forces of the front wheels 122FL and 122FR are changed to adjust the average front wheel speed VF with reference to the average rear wheel speed VR.

With reference to the flow chart shown in FIG. 15, here will be described the vehicular motion controlling routine to be executed in the ECU 120 for vehicular motion control.

Here, this routine is executed periodically at every predetermined time intervals when the (not-shown) ignition switch of the vehicle is turned ON.

Figure 15:
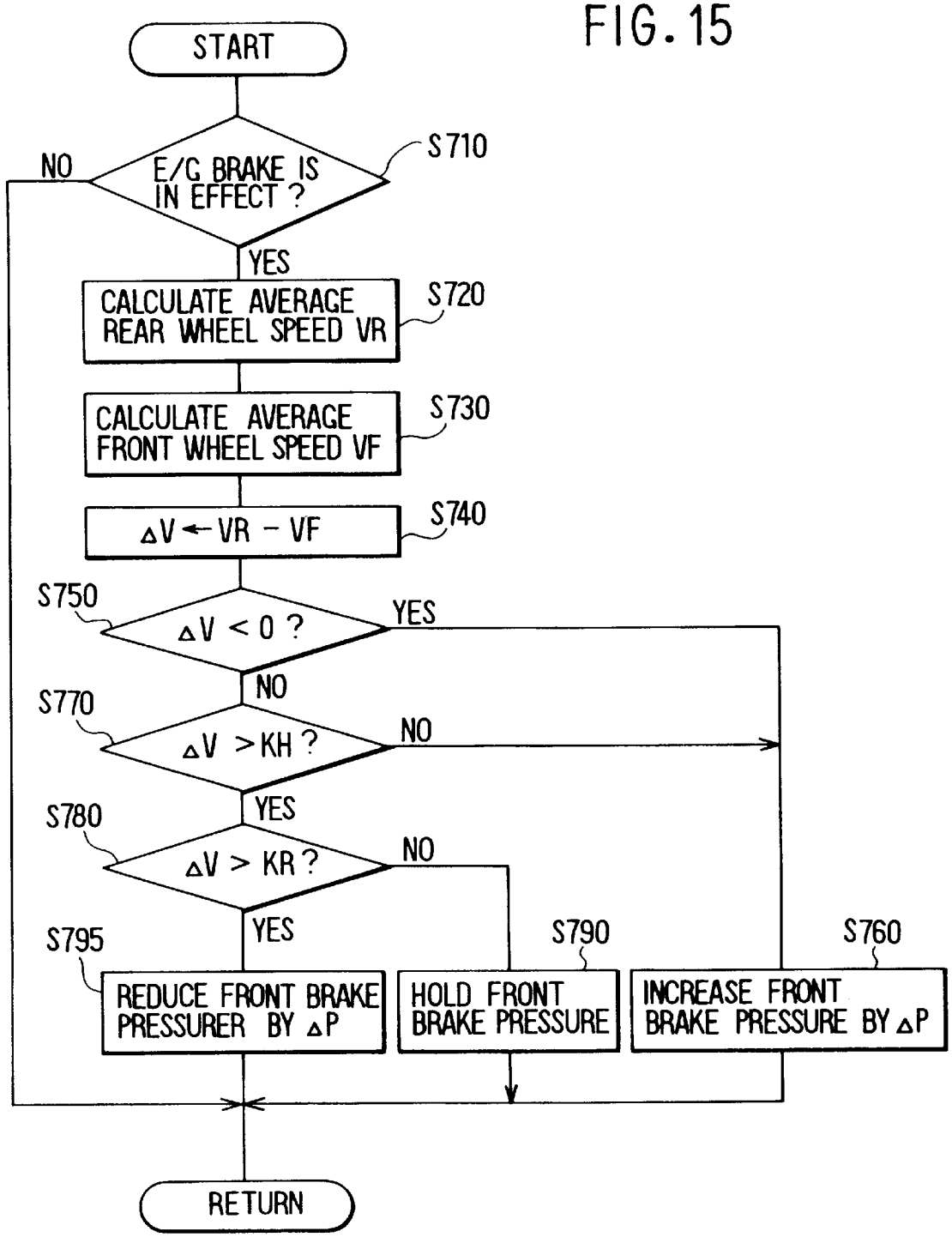
FIG. 15 is a flow chart showing vehicular motion control to be executed at an ECU when an engine brake is applied.

When the vehicular motion controlling routine is started, as shown in FIG. 15, whether or not both the accelerator switch 112 and the brake switch 136 are OFF is determined at Step S710 to determine whether or not the drive wheels 122RL and 122RR are being braked by the engine brake.

When the driver is operating the accelerator or the brake pedal so that the vehicle is not being braked by the engine brake, the present routine is ended without any further operation. When the driver is operating neither the accelerator nor the brake pedal and when the vehicle is being braked by the engine brake, the processing (corresponding to the control device of the present invention) at and after Step S720 are executed.

When it is determined at Step S710 that the drive wheels 122RL and 122RR are being braked by the engine brake, brake fluid is supplied to the wheel cylinders 102FL and 102FR by driving the motor 180 to activate the pumps 160 and 162 and by turning ON the SM valves 150*a* and 150*b* and the SR valves 170*a* and 170*b* so that the brake fluid pressures of the front wheels 122FL and 122FR can be controlled by the vehicular motion controlling routine.

On the basis of the detection signals from wheel speed sensors 104RL and 104RR mounted at the rear wheels 122RL and 122RR, the average wheel speed VR of the left and right rear wheels 122RL and 122RR is calculated at Step S720. At subsequent Step S730, on the basis of the detection signals from wheel speed sensors 104FL and 104FR mounted at the front wheels 122FL and 122FR, the average wheel speed VF of the left and right front wheels RL and RR is calculated. At subsequent Step S740, the difference ΔV (i.e., ΔV=VR−VF) between the average rear wheel speed VR and the average front wheel speed VF, as determined at Steps S720 and S730, is determined.

When the difference ΔV between the average rear wheel speed VR and the average front wheel speed VF is thus determined, the routine advances to Step S750, at which it is determined whether or not the difference ΔV is at a negative value smaller than "0", that is, whether or not the average rear wheel speed VR is smaller than the average front wheel speed VF. When the difference ΔV is negative so that the average rear wheel speed VR is lower than the average front wheel speed VF, the routine advances to Step S760, at which the increasing control valves 146FL and 146FR are turned ON whereas the reducing control valves 148FL and 148FR are turned OFF so as to increase the brake fluid pressures of the W/C 102FL and 102FR of the front wheels 122FL and 122FR by the predetermined level ΔP, and the present routine is once ended.

When it is determined at Step S750 that the difference ΔV is larger than "0", on the other hand, the routine transfers to Step S770, at which it is determined whether or not the difference ΔV is larger than a preset first reference value KH (or a positive value) so that the average front wheel speed VF is higher by the first reference value KH than the average rear wheel speed VR. This first reference value KH is one for determining whether or not the braking forces to be applied to the front wheels 122FL and 122FR can be controlled to a level higher than the braking forces to be applied to the rear wheels 122RL and 122RR, by increasing the brake fluid pressures of the front wheels 122FL and 122FR at Step S760. The routine is once ended after the execution of the operation of Step S760, when the difference ΔV is no more than the first reference value KH, and advances to Step S780 when the difference ΔV is more than the first reference value KH.

At Step S780, it is determined whether or not the aforementioned difference ΔV is more than a second reference value KR (or a positive value), which is preset to a value larger than the first reference value KH, that is, whether or not the average front wheel speed VF is smaller by the second reference value KR than the average rear wheel speed VR. This second reference value KR is one for determining whether or not the braking forces to be applied to the front wheels FL and FR grows excessively higher than braking forces to be applied to the rear wheels 122RL and 122RR, by increasing the brake fluid pressures of the front wheels 122FL and 122FR at Step S760. When the difference ΔV is no more than the second reference value KR (i.e., within the range from the first reference value KH to the second reference value KR), the brake fluid pressures of the W/Cs 102FL and 102FR of the front wheels 122FL and 122FR are held at the present level at Step S790 by turning ON the increasing control valves 146FL and 146FR and OFF the reducing control valves 148FL and 148FR, and the routine is then once ended.

When the difference ΔV is larger than the second reference value KR, on the other hand, the braking forces to be applied to the front wheels 122FL and 122FR grow so excessive that the front wheels 122FL and 122FR take the tendency to be locked, so that the vehicular motion is made unstable. In order to reduce the brake fluid pressures of the front wheels 122FL and 122FR, therefore, the routine advances to Step S795, at which the increasing control valves 146FL and 146FR are turned ON whereas the reducing control valves 148FL and 148FR are turned ON, and the present routine is once ended.

Figure 16:
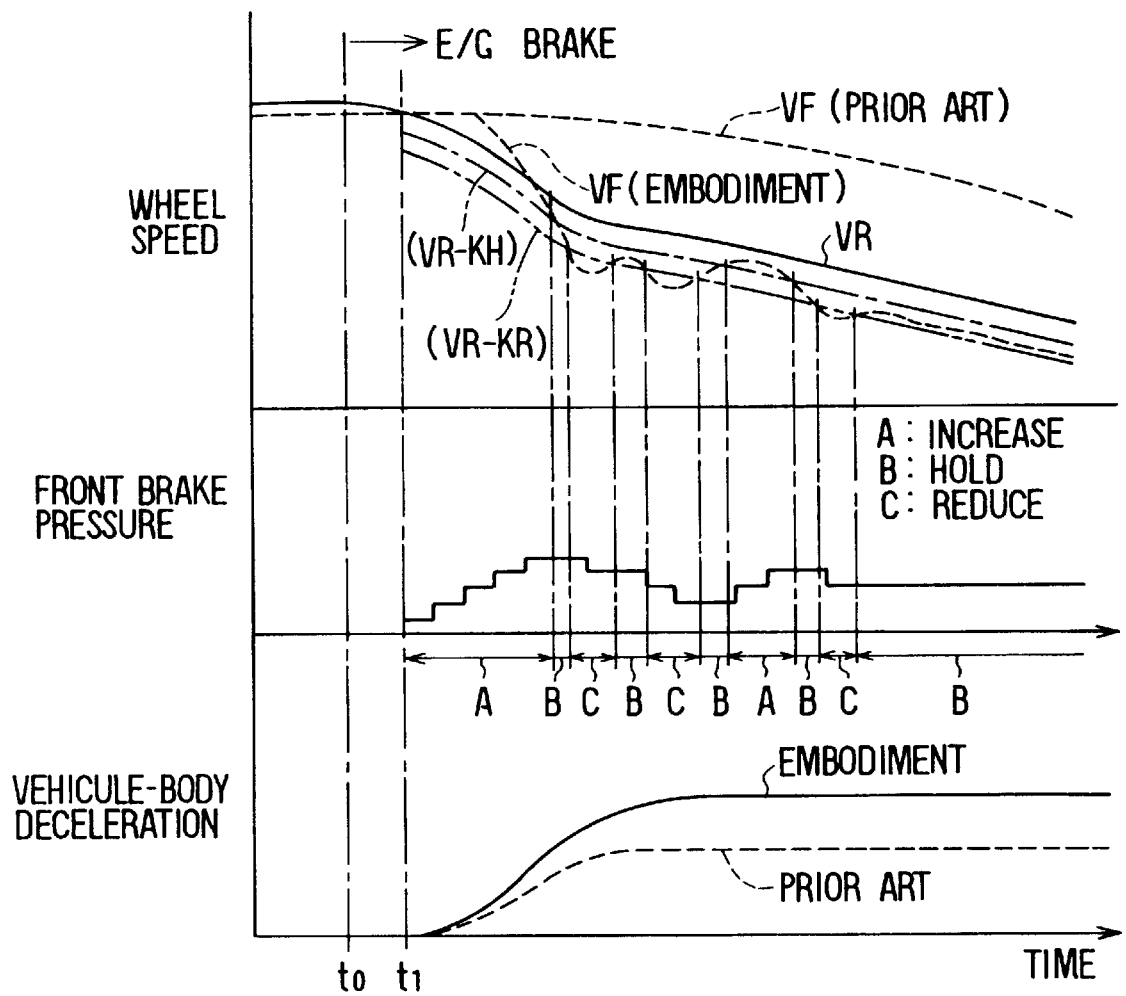
FIG. 16 is a time chart for explaining the operations of vehicular motion control to be executed by the ECU.

Thus, in the rear wheel drive car of the present embodiment in which the vehicular motion control is executed, as illustrated in FIG. 16, the brake fluid pressures of the front wheels 122FL and 122FR are gradually increased to apply the braking forces to the front wheels 122FL and 122FR, when the drive wheels (or the rear wheels) 122RL and 122RR come into the engine braking state (at a time t0) to lower the average rear wheel speed VR. As a result, the difference ΔV of the average rear wheel speed VR from the average front wheel speed VF becomes negative (at a time t1).

When the average front wheel speed VF is made lower than the average rear wheel speed VR by increasing the brake fluid pressures of the front wheels 122FL and 122FR so that their difference ΔV exceeds the first reference value KH, the brake fluid pressures of the front wheels 122FL and 122FR are held. When the difference ΔV exceeds the second reference value KR, the brake fluid pressures of the front wheels 122FL and 122FR are reduced to reduce the braking forces to be applied to the front wheels 122FL and 122FR.

According to the present embodiment, therefore, the braking forces to be applied to the front wheels 122FL and 122FR, when the engine brake is in effect, are controlled so that the average front wheel speed VF may fall within the speed range from the speed (VR−KH), as calculated by subtracting the first reference value KH from the average rear wheel speed VR, to the speed (VR−KR) as calculated by subtracting the second reference value KR from the average rear wheel speed VR. As a result, the vehicle deceleration during the engine braking state can be made larger than that of the system according to the prior art in which the braking forces of the front wheels 122FL and 122FR are not controlled during the engine braking state.

In the present embodiment, moreover, the braking forces higher than those to be applied to the rear wheels 122RL and 122RR by the engine brake are applied to the front wheels 122FL and 122FR so that the relation between the braking forces of the rear wheels 122RL and 122RR and the braking forces of the front wheels 122FL and 122FR can be controlled to fall within the stable region of the ideal braking force distribution diagram, as illustrated in FIG. 17, to improve the running stability of the vehicle.

Although the present invention has been described in connection with its second embodiment, it should not be limited to it but can adopt a variety of modes.

The second embodiment has been described on the construction in which the braking forces are applied to the front wheels during the engine braking state in the rear wheel drive car to improve the running stability of the vehicle. However, the second embodiment reduces the lateral resistant forces of the front wheels by applying the braking forces to the front wheels. As a result, when the lateral resistant forces of the rear wheels are lowered according to the load movement occurring during the engine braking state, the lateral resistant forces can be balanced at the front and rear wheel sides of the vehicle. Therefore, despite of the above-described construction, the second embodiment may be applied to a four-wheel drive car, and in this case, the running stability of the vehicle can be improved.

A third embodiment of the present invention will be described with reference to the accompanying drawings.

Figure 18:
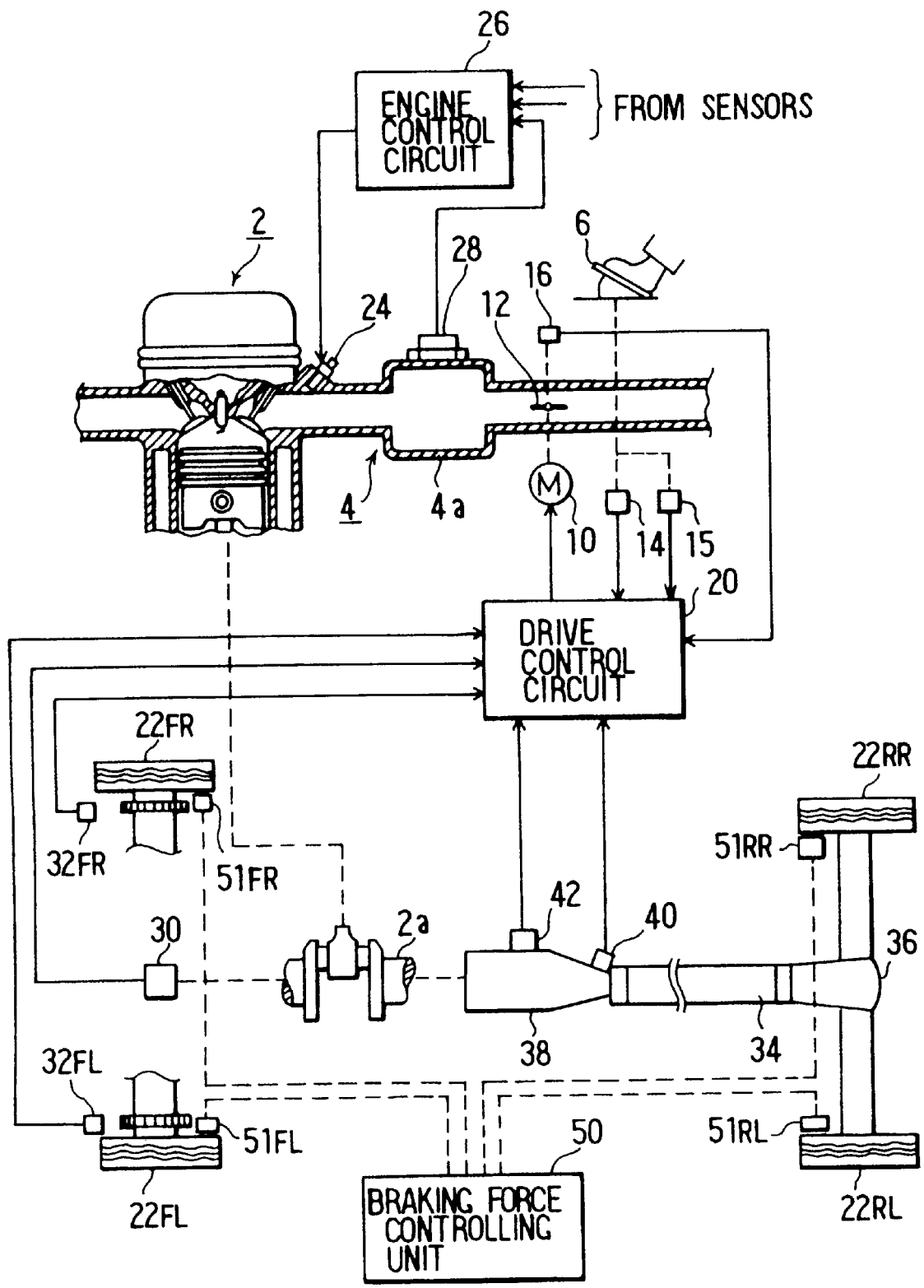
FIG. 18 is a schematic view illustrating the construction of a drive force controlling system according to a third embodiment.

The entire construction of a vehicular motion controlling system of the third embodiment is shown in FIG. 18. The construction of the vehicular motion controlling system of the third embodiment is substantially identical to that of the first embodiment, and its common components are designated by the same reference numerals. Here, in the third embodiment, the acceleration sensor 44 of the first embodiment is omitted, but there is additionally provided an idle switch 15 for detecting that the accelerator pedal 6 is returned to a non-depressing position.

Here will be described drive force control to be executed by the drive force controlling system of the present embodiment.

In the present embodiment, so as to prevent the drive wheels from being locked at the time of the engine braking action, there is executed control (as will be called the "drive force control") in which the engine output torque is raised to increase the drive force thereby to raise the rotational speed of the drive wheels.

Figure 19:
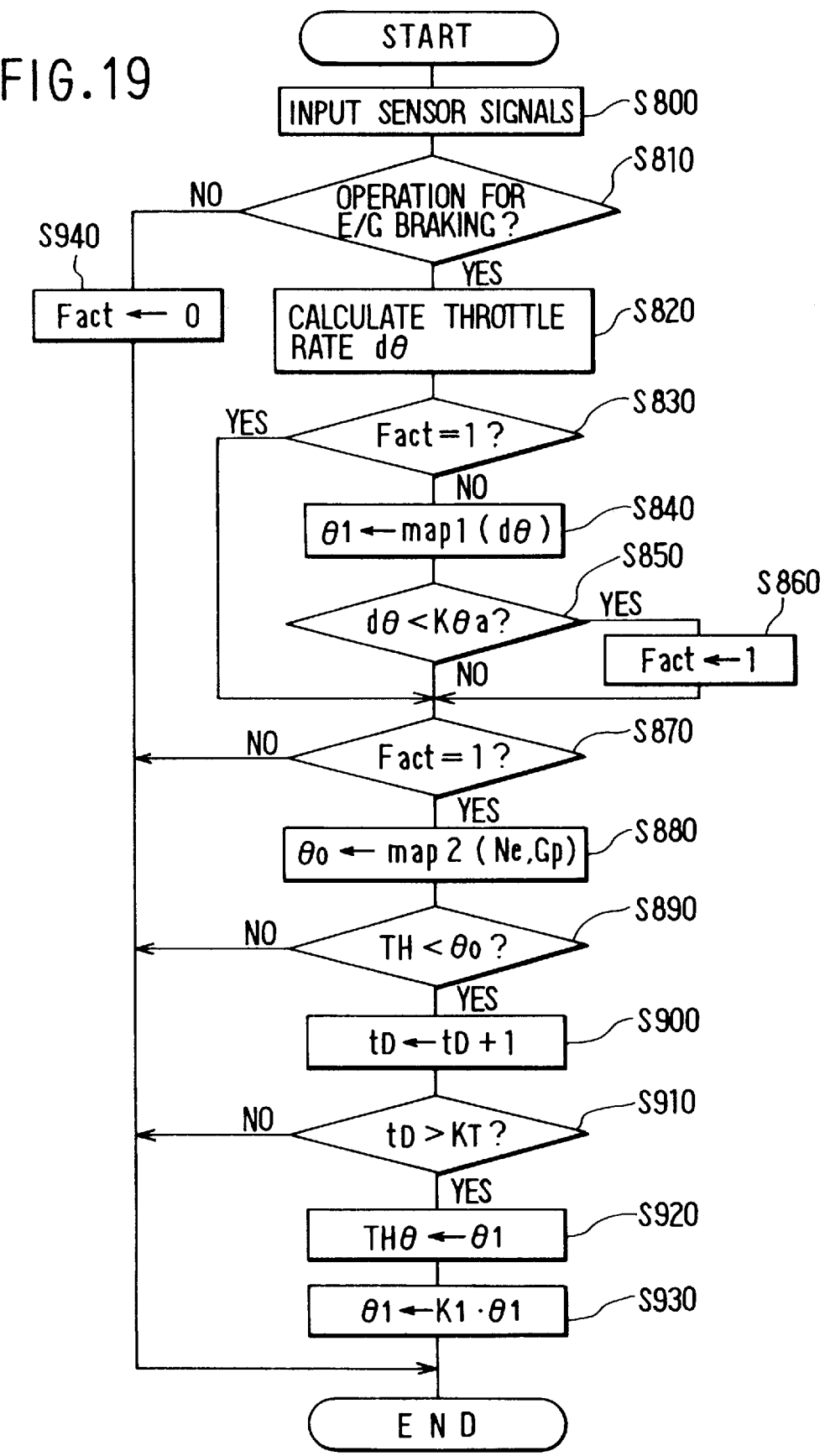
FIG. 19 is a flow chart showing a drive force control routine.

First of all, the drive force controlling routine will be described on the basis of the flow chart of FIG. 19.

At Step S800, the signals of the various sensors are inputted.

At subsequent Step S810, whether or not the operation for effecting the engine braking (E/G brake) has been started is determined depending upon whether or not the throttle valve 12 is moving in the returning direction (or in the closing direction), on the basis of the signal from the throttle opening sensor 16, for example. The routine advances to Step S820, when the answer is YES, and to Step S940 when NO.

At Step S940, since the engine braking operation is not started, drive force control is not executed and a flag Fact indicating that drive force control is in progress is reset (to 0), and the present routine is once ended.

At Step S820, on the other hand, since the engine braking operation has been started, a throttle operating rate dθ, i.e., the changing rate of a throttle opening θ, is obtained from the signal coming from the throttle opening sensor 16. Here, the throttle operating rate dθ takes a negative value when the throttle valve 12 is returned.

At subsequent Step S830, whether or not drive force control has already been started by the preceding operation is determined depending upon whether or not the flag Fact is set (to 1). The routine advances to Step S870, when the answer is YES, and to Step S840 when NO.

Figure 20:
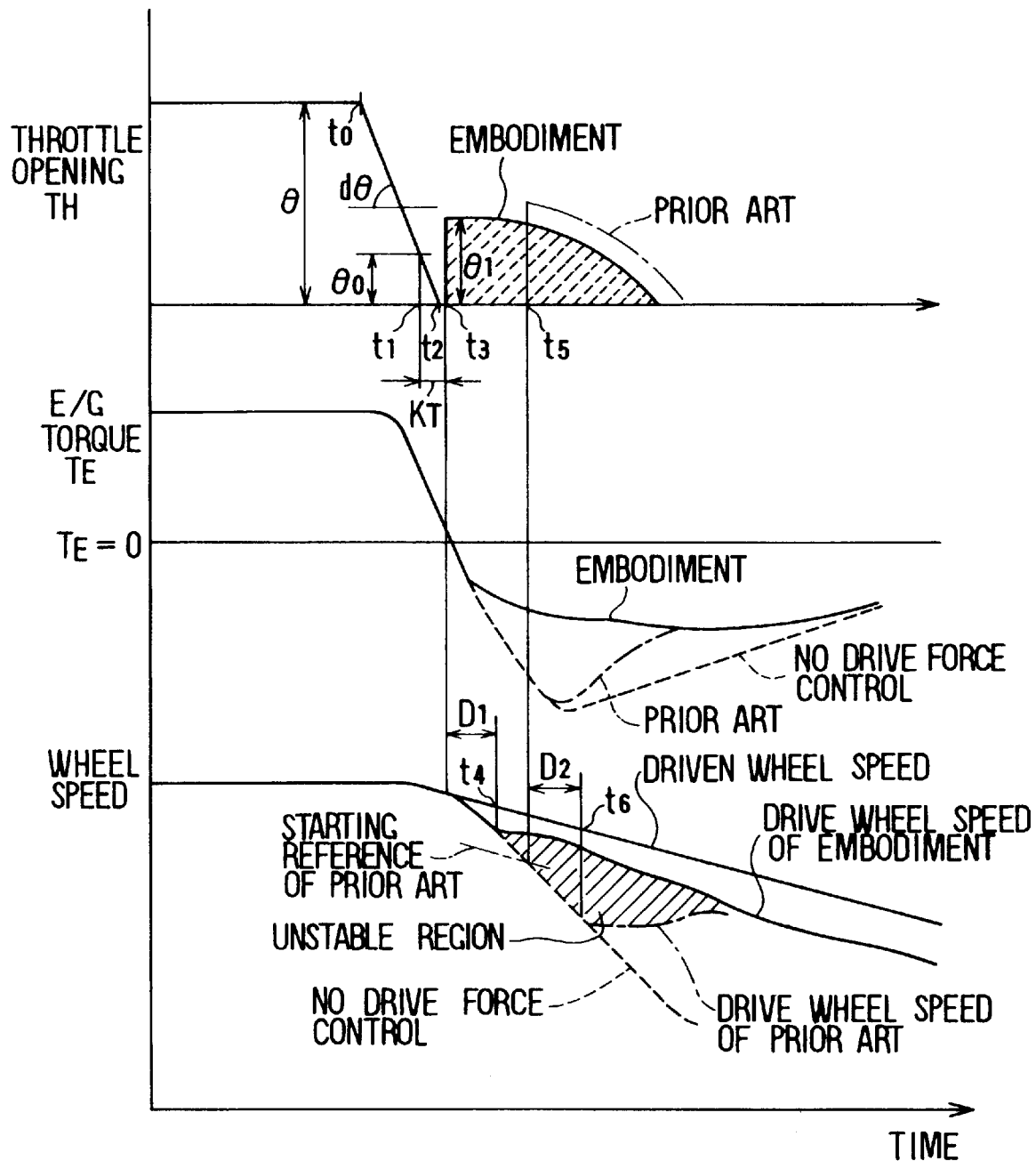
FIG. 20 is a time chart illustrating the operations by drive force control.

At Step S840, for starting drive force control, a map (map1) is used to determine the initial value e1 of the throttle opening θ from the throttle operating rate dθ. This initial value θ1 is for opening the throttle valve 12 largely at first from the fully closed state of the throttle valve 12 during the engine braking state, as illustrated in FIG. 20.

Figure 21:
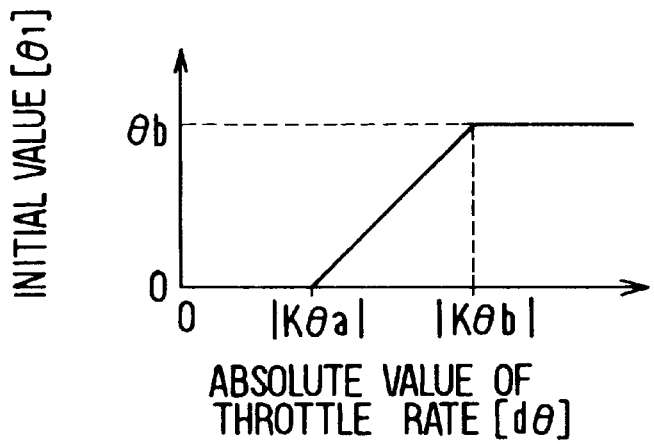
FIG. 21 is a graph (map 1) illustrating the relation between throttle rate and initial value.

The aforementioned map1 is established to make the initial value dθ of the throttle opening θ the larger for the higher absolute value of the throttle operating rate dθ, as illustrated in FIG. 21. According to this map1, the initial value θ1 is set to 0, when the absolute value of the throttle operating rate dθ is no more than the absolute value of a first reference value Kθa, to a value proportional to the absolute value of the throttle operating rate do, while the absolute value of the throttle operating rate de is between the absolute value of the first reference value Kθa and the absolute value of a second reference value Kθb, and to a predetermined value θb when the absolute value of the throttle operating rate dθ is no less than the absolute value of the second reference value Kθb.

At Step S850, it is determined whether or not the throttle operating rate dθ (negative in the case of deceleration) is lower than the first reference value Kθa (i.e., a negative value), that is, whether or not the throttle valve 12 is abruptly returned (toward the fully closed state). Although not strictly, it is determined whether or not the vehicle is substantially in the engine braking state. The routine advances to Step S860, when the answer is YES, and to Step S870 when NO.

When it is determined that the throttle operating rate de is so large that the vehicle is substantially in the engine braking operation, that is, when it is determined that the conditions for executing drive force control are satisfied, the flag Fact indicating the execution of the drive force control is set to 1 at Step S860, and the routine advances to Step S870.

At Step S870, it is determined whether or not the flag Fact is set to 1. The routine advances to Step S880, when the answer is YES, and the present routine is once ended when NO.

At Step S880, on the basis of the detection results of the engine rotational speed sensor 40 and the gear position sensor 42, a map (map2) is used to determine the throttle opening θ0, at which an engine output torque TE is at 0, from the engine rotational speed (i.e., the number of revolutions) Ne and a gear position Gp. Here, the reason for determining the throttle opening θ0, at which the engine output torque TE is at 0, that is, the throttle opening θ0 (as will be called the "0 torque opening θ0"), at which the engine braking is actually applied, is to use this 0 torque opening θ0 as a reference for determining the timing for starting drive force control.

Even at the 0 torque opening θ0, the engine braking action is not instantly applied to the drive wheels because there is some delay by the inertia or the like. However, the 0 torque opening θ0 corresponds to the value 0 of the engine output torque TE. When, therefore, this state (i.e., the state of the 0 torque opening θ0 or less) continues for a predetermined time period or longer, the 0 state of the engine output torque TE is transmitted to the drive wheels to effect the engine brake.

Figure 22:
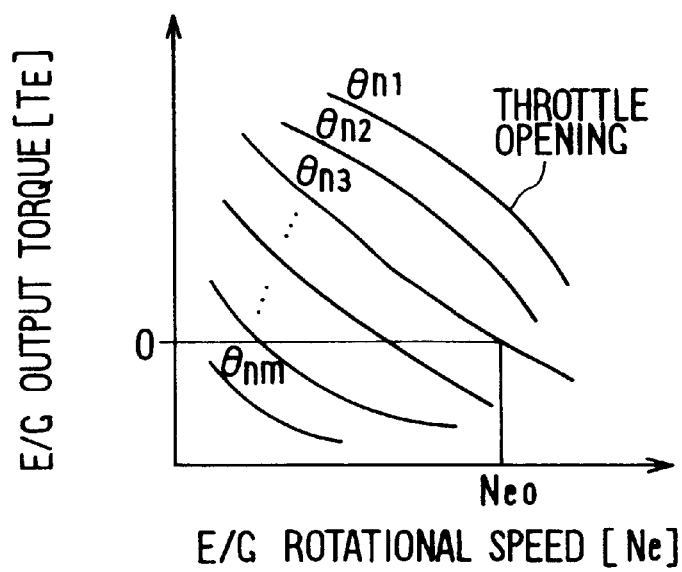
FIG. 22 is a graph (map 2) illustrating the relation between engine rotational speed and engine output torque.

The aforementioned map2 is prepared for each gear ratio Gp and illustrates the relation among the engine rotational speed Ne, the engine output torque TE and the throttle opening θ, as in FIG. 22 (presenting a map for a certain gear ratio). By using this map2, therefore, a throttle opening θ, at which the engine output torque TE is at 0, can be determined from an engine rotational speed Ne0 at a gear ratio Gp, and the throttle opening 8 can be set as the 0 torque opening θ0.

At subsequent Step S890, it is determined whether or not the prevailing throttle opening TH, as obtained from the throttle opening sensor 16, is smaller than the aforementioned 0 torque opening θ0. Specifically, it is determined whether or not the actual throttle opening TH is smaller than the 0 torque opening θ0, at which the engine braking can be applied. The routine advances to Step S900, when the answer is YES, and the present routine is once ended when NO.

At Step S900, a timer tD is incremented. This timer tD is provided for counting the time period from the timing when the throttle opening TH becomes equal to or less than the 0 torque opening θ0 to the start of drive force control.

At subsequent Step S910, it is determined whether or not the timer tD exceeds the reference value KT. The routine advances to Step S920, when the answer is YES, and the present routine is ended when NO. This reference value KT is for compensating the response delay time of the engine output due to the inertia or the like and is set to such a value as can start drive force control after a sufficient deceleration feeling was actually achieved by the engine brake.

At Step S920, since the time period of the reference value KT is awaited before the timing for starting drive force control actually, the initial value θ1 of the throttle opening TH is set to a target throttle opening THθ. As a result, the throttle opening TH is controlled to the initial value θ1.

At subsequent Step S930, the initial value θ1 is updated by multiplying it by an attenuation constant K1 (0<K1<1), and the present routine is once ended. In short, the initial value θ1 is gradually decreased by this operation so that the target throttle opening THθ to be set by the operation of the aforementioned Step S920 is also gradually decreased, as illustrated in FIG. 20.

The operations of the aforementioned control will be described in contrast to the control example of the prior art with reference to FIG. 20. In FIG. 20: the case of the present embodiment is plotted by solid lines; the case of the drive force control of the prior art is plotted by single-dotted lines; and the case of no drive force control is plotted by broken lines.

In the prior art, the throttle valve is released from a time t0 and when the slip rises to satisfy the control starting reference at a time t5, the throttle opening TH is increased. As a result, the drive wheel speed is restored after a delay time D2 due to the inertia or the like, but prior art control is not started before the hatched unstable region in which the drive wheel speed seriously drops, so that a sufficient running stability cannot be retained. Here, the running stability is worse when the control is not executed.

In the present embodiment, on the other hand, the operation of returning the throttle valve 12 (as indicated by a negative throttle operating rate dθ) is started from a time t0, and when it is determined that the absolute value of the throttle operating rate dθ is larger than the absolute value of a reference value Ke, drive force control is started.

In short, in accordance with the throttle operating rate dθ, the initial value θ1 of the throttle opening TH at the start of drive force control is determined at first. Next, the actual throttle opening TH is checked and the counting to the time period before the start of the drive force control is started when the actual throttle opening TH comes to the 0 torque opening θ0 at a time t1.

After this, the actual throttle opening TH is fully closed at a time t2. When, at a time t3, the value of the counter tD then reaches the reference value KT or the delay time (which is set to obtain the deceleration feeling by the engine braking), the throttle opening θ is set to the large value of the initial value θ1.

As a result, after a delay time period D1 due to the inertia or the like of the mechanism from the engine to the drive wheels, the engine output torque TE according to the throttle opening TH of the initial value θ1 is transmitted to the drive wheels, so that the rotational speed of the drive wheels rises from a time t4. As a result, the slip of the drive wheels can be reduced to prevent the drive wheels from being locked.

As described above, the present embodiment is different from the control example of the prior art such that it does not raise the drive force after a slip occurs at the drive wheels. The engine braking state is detected from the operation (i.e., the throttle operating rate dθ) of the throttle valve 12, for example. If such an operation is detected, the throttle opening TH is increased to raise the engine output torque TE, thereby to increase the drive force. Before the slip rises, therefore, the rotational speed of the drive wheels rises (or restores, as illustrated in FIG. 20) so that the drive wheels can be prevented from being locked. As a result, a sufficient running stability can be retained.

In the present embodiment, moreover, the start of drive wheel control is awaited for the predetermined time period KT after the actual throttle opening TH reached the 0 torque opening θ0. In short, the start of drive force control is delayed till the reduction in the engine output torque TE by the throttle operation is actually transmitted to the drive wheels. This makes it possible to realize a sufficient deceleration by the engine braking.

In the present embodiment, moreover, the initial value θ1 of the throttle opening TH in drive force control is set according to the throttle operating rate dθ. Specifically, the initial value 91 is set to a high value for a high throttle operating rate dθ. As a result, the drive wheel speed can be prevented from seriously dropping so that the drive wheels can also be prevented from being locked.

Although the third embodiment of the present invention has been described, it can naturally be practiced in various modes.

In the foregoing embodiment, for example, it is determined based on the throttle operating rate that the vehicle is in the engine braking state. This engine braking state may be determined by the following different methods (1) to (5).

(1) The engine braking state may be determined when the throttle valve 12 is operated in the closing direction and the opening TH thereof becomes a reference value or less (e.g., the fully closed state).

(2) The engine braking state may be determined on the basis of the signal from the accelerator opening sensor when the accelerator pedal is operated in the returning direction and the position thereof becomes a reference value or less (e.g., a depression stroke 0).

(3) The engine braking state may be determined on the basis of the signal from the accelerator opening sensor when the rate at which the accelerator pedal is returned becomes a reference value or more.

(4) The engine braking state may be determined, when the idle switch is ON because it is turned ON when the accelerator pedal is returned (that is, the throttle valve is fully closed).

(5) The throttle opening (or its changing rate) or the accelerator opening (or its changing rate) is not directly detected, but the intake pressure or intake air flow of the engine may be detected to determine the engine braking state. This is because the intake pressure or intake air flow changes with the throttle or accelerator operation. Therefore, the engine braking state may be determined based on the intake pressure (or its changing rate) or the intake air flow (or its changing rate).

Moreover, the foregoing embodiment has been exemplified by the case in which the accelerator pedal is released and the engine braking is applied. In addition, the present invention can be applied to the case in which the engine braking is automatically applied. In this applicable case, the throttle is automatically returned to apply the brake (i.e., automatic braking control and automatic throttle control).

In drive force control of the embodiment, moreover, the road surface μ may be considered to perform drive force control. When the road surface μ is small, for example, a serious slip may soon occur, and the timing for starting the drive wheel control may be advanced. In order to prevent a serious drop in the drive wheel speed, moreover, the initial value of the throttle opening may be enlarged.

Furthermore, drive force control may be executed by increasing the fuel injection amount together with (or in place of) the adjustment of the throttle opening.

The embodiment has been described in connection with the FR car, but similar drive wheel control can also be executed for the FF car to retain the running stability.

Here will be described a fourth embodiment of the present invention.

Figure 23:
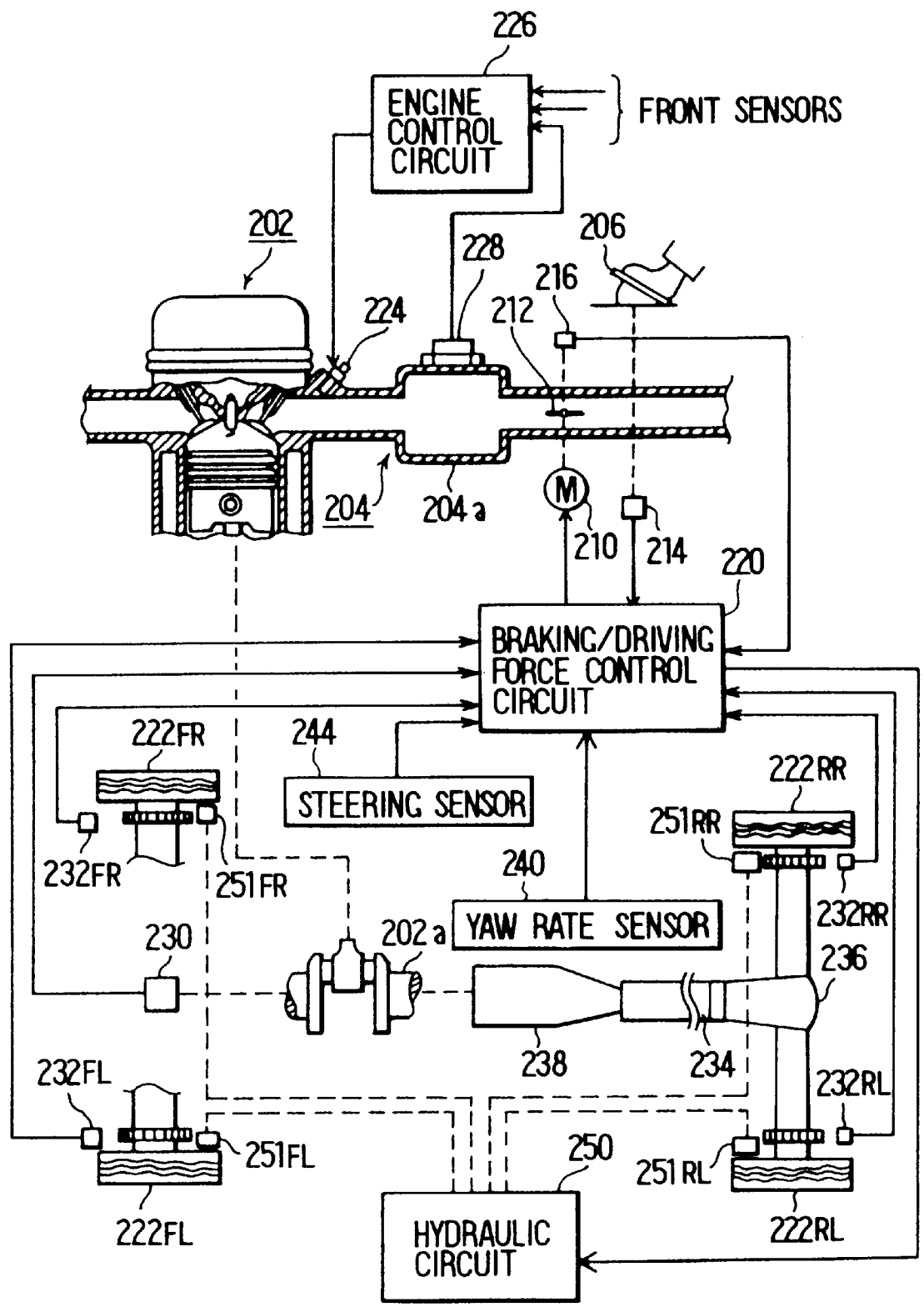
FIG. 23 is a schematic view illustrating the construction of a vehicular motion controlling system according to a fourth embodiment.

FIG. 23 is a schematic diagram showing the entire construction of a vehicular motion controlling system according to the fourth embodiment. Here, the vehicular motion controlling system of the present embodiment is applied to a front engine and rear drive (FR) vehicle using an internal combustion engine 202 as a drive force generating source.

In an intake passage 204 of the internal combustion engine 202 as shown in FIG. 23, there is formed a surge tank 204a for suppressing pulsations of the intake air. Upstream of the surge tank 204a, there is arranged a throttle valve 212 which is opened/closed by a throttle drive motor 210. The throttle valve 212 is of the so-called "linkless throttle" and is not directly opened/closed by an accelerator pedal 206 to be operated by the driver.

These accelerator 206 and throttle valve 212 are respectively equipped with an accelerator opening sensor 214 and a throttle opening sensor 216, the detected signals of which are inputted to a braking/driving force control circuit 220.

On the other hand, the intake passage 204 is equipped with a fuel injection valve 224 which is opened by a fuel injection command from an internal combustion engine control circuit 226 for injecting the fuel into the internal combustion engine 202. The fuel injection command is determined according to the running state (e.g., the intake pipe pressure, the rotational speed and the cooling water temperature) of the internal combustion engine 202 and is prepared by processing the data from various sensors including an intake pressure sensor 228 for detecting the pressure in the surge tank 204a, on the basis of a fuel injection command program of the internal combustion engine control circuit 226.

To the braking/driving force control circuit 220, there are inputted not only the detected signals of the accelerator opening sensor 214 and the throttle opening sensor 216 but also the signals which are detected by an engine rotational speed sensor 230, driven wheel speed sensors 232FL and 232FR, drive wheel speed sensors 232RL and 232RR, a yawing rate sensor 240 and a steering angle sensor 244.

Here, the engine rotational speed sensor 230 detects the rotational speed (i.e., the engine RPM) of a crankshaft 202a of the internal combustion engine 202 and is also used to prepare the fuel injection command by the internal combustion engine control circuit 226.

The driven wheel speed sensors 232FL and 232FR are for detecting the rotational speeds of left and right driven wheels (or front wheels) 222FL and 222FR, respectively, and are respectively mounted on the rotary shafts of those left and right driven wheels 222FL and 222FR.

On the other hand, the drive wheel speed sensors 232RL and 232RR are for detecting the rotational speeds of the left and right drive wheels (or rear wheels) 222RL and 222RR and are respectively mounted on the rotary shafts of the left and right drive wheels 222RL and 222RR, to which is transmitted the rotation of the crankshaft 202a of the internal combustion engine 202 through a transmission 238, a propeller shaft 234 and a differential gear 236.

Thus, the braking/driving force control circuit 220 controls: the drive force to be transmitted from the internal combustion engine 202 to the left and right drive wheels 222RL and 222RR, by driving the throttle drive motor 210 on the basis of the input signals from those individual sensors to control the opening (i.e., the throttle opening) of the throttle valve 212; and the braking force to be applied to the individual wheels 222FL to 222RR, by driving the various solenoid valves disposed in a hydraulic circuit 250 acting as a brake fluid pressure adjusting device, to adjust the pressure (i.e., the brake fluid pressure) to be applied to wheel cylinders 251FL, 251FR, 251RL and 251RR provided to the individual wheels 222FL to 222RR.

Specifically, the braking/driving force control circuit 220 executes: throttle control for controlling the throttle opening to the opening corresponding to the accelerator operation of the driver, at an ordinary running state of the vehicle, on the basis of the input signal from the accelerator opening sensor 214; traction control for suppressing an acceleration slip occurring at the drive wheels 222RL and 222RR, during acceleration of the vehicle, by controlling the throttle opening (i.e., the drive force generated by the internal combustion engine 202) or the braking forces of the left and right drive wheels 222RL and 222RR; anti-skid control for controlling the braking forces of the individual wheels 222FL to 222RR during vehicle braking (i.e., during the depression of the brake pedal); and turning control for retaining the steering stability for a vehicle in a turning state, by controlling the throttle opening (i.e., the drive force generated by the internal combustion engine 202) or the braking forces of the individual wheels 222FL to 222RR.

Here will be described the hydraulic circuit 250 to be used to control braking forces applied to the individual wheels 222FL to 222RR.

Figure 24:
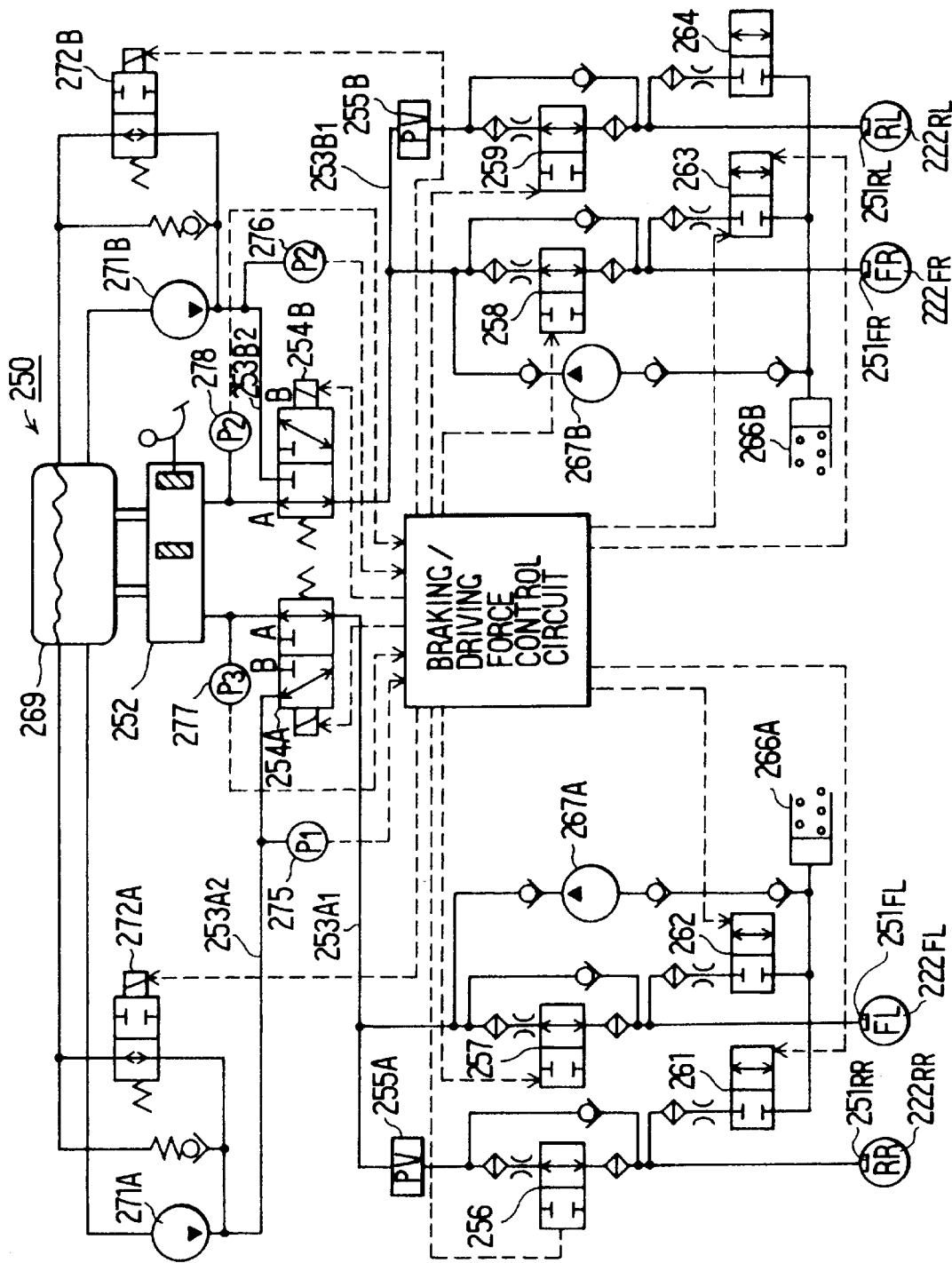
FIG. 24 is a diagram for explaining the construction of a hydraulic circuit of the fourth embodiment.

As shown in FIG. 24, this hydraulic circuit 250 is constructed of the x-piping system which is equipped with individual piping lines for the left driven wheel 222FL—the right drive wheel 222RR and the right driven wheel 222FR the left drive wheel 222RL.

Of these piping lines, a conduit 253A1 leading from a master cylinder 252 for sending out pressurized brake fluid by the braking operation of the driver to the wheel cylinders 251FL and 251RR of the left front wheel 222FL and the right rear wheel 222RR is equipped with: a three-way change-over valve 254A for switching the hydraulic circuit (into two positions); a proportioning valve 255A for applying a high brake fluid pressure to the wheel cylinder 251FL of the left driven wheel 222FL; increasing control valves 256 and 257 for opening/closing conduits leading from the master cylinder 252 to the wheel cylinders 251RR and 251FL; reducing control valves 261 and 262 for opening/closing conduits leading from the wheel cylinders 251RR and 251FL to a reservoir 266A; the reservoir 266A for reserving the brake fluid coming from the wheel cylinders 251RR and 251FL; and a pump 267A for pumping up the brake fluid from the reservoir 266A to the master cylinder 252. On the other hand, a conduit 253A2 leading from a master reservoir 269 to the three-way change-over value 254A is equipped with a pump 271A for boosting the brake fluid pressure and a pressure control valve 272A for opening/closing a conduit between the downstream of the pump 271A and the master reservoir 269.

Of these components, when the three-way change-over valve 254A is switched to position A, the ordinary braking operation by the driver via a conduit 253A1 and well-known anti-skid control using the increasing control valves 256 and 257, the reducing control valves 261 and 262, the reservoir 266A and the pump 267A can be performed. When the three-way change-over valve 254A is switched to position B, on the other hand, traction control and turning motion control by the high brake fluid pressure generated by the pump 271A are enabled.

Of the aforementioned piping lines, on the other hand, the other conduit 253B1 leading from the master cylinder 252 to the wheel cylinders 251FR and 251RL of the right front wheel 222FR and the left rear wheel 222RL is equipped as in the aforementioned conduit 253A1 with: a three-way change-over valve 254B to be switched into two positions; a proportioning control valve 255B; increasing control valves 258 and 259; reducing control valves 263 and 264; a reservoir 266B; and a pump 267B. In addition, a conduit 253B2 leading from the master reservoir 269 to the three-way change-over valve 254B is equipped as in the conduit 253A2 with a pump 271B and a pressure control valve 272B.

Moreover, this hydraulic circuit 250 is equipped with: first and second pressure sensors 275 and 276 for detecting the brake fluid pressures between the individual pumps 271A and 271B and the individual three-way change-over valves 254A and 254B; and third and fourth pressure sensors 277 and 278 for detecting the brake fluid pressures between the master cylinder 252 and the individual three-way changeover valves 254A and 254B. The detection signals from these individual sensors 275 to 278 are also inputted to the braking/driving force control circuit 220.

This braking/driving force control circuit 220 controls the brake fluid pressures (i.e., the braking forces of the individual wheels 222FL to 222RR) to be applied to the individual wheel cylinders 251FL to 251RR, by controlling the increasing control valves 256 to 259, the reducing control valves 261 to 264, the pressure control valves 272A, 272B, and the pumps 271A and 271B on the basis of those detection signals.

Of control to be executed by the braking/driving force control circuit 220, here will be described turning motion control for controlling the turning motion, which is main control in the fourth embodiment.

A processing for this turning motion control is repeatedly executed in the braking/driving force control circuit 220 in the turning state of the vehicle, in which the steering angle of the steering wheel obtained from the signal of the steering angle sensor 244 has reached a predetermined value or more.

Figure 25:
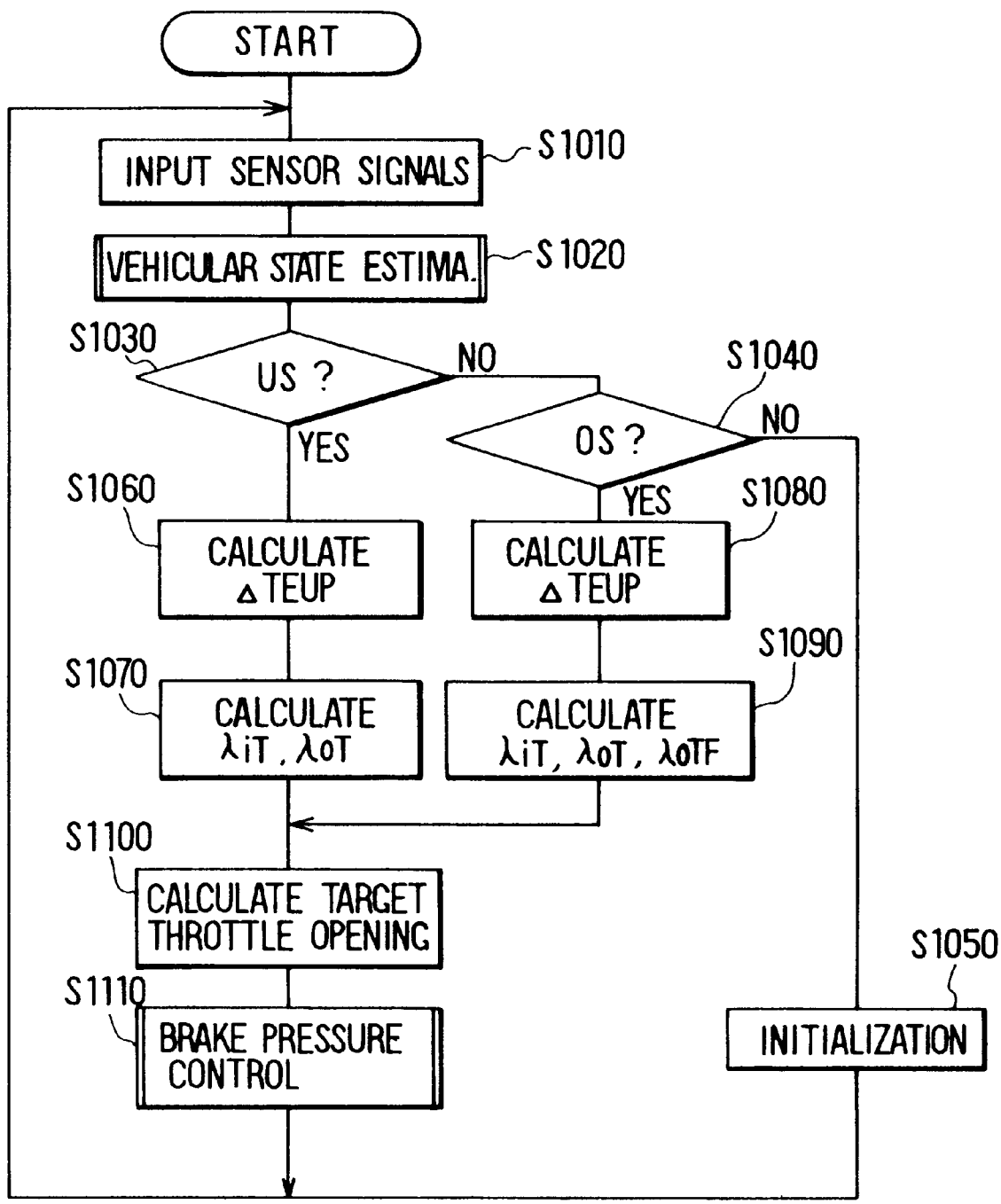
FIG. 25 is a flow chart showing a turning motion controlling routine to be executed in a braking/driving force control circuit.

When the processing for turning motion control is started, as shown in FIG. 25, the running state of the vehicle is detected at Step S1010 by reading the signals from the aforementioned individual sensors. At subsequent Step S1020, the vehicular state estimation for estimating the vehicular state is executed on the basis of the detected running state of the vehicle.

Figure 26:
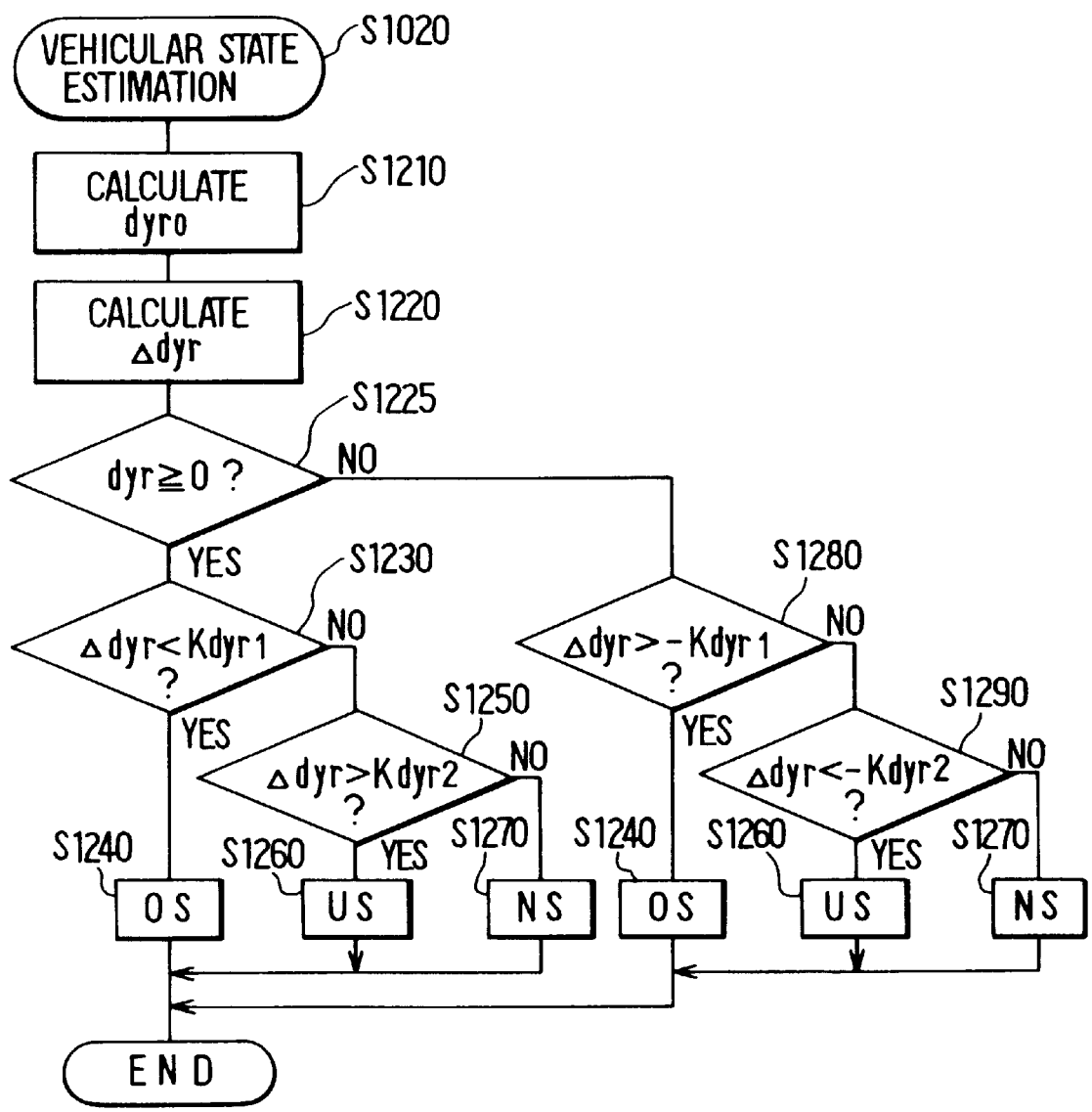
FIG. 26 is a flow chart showing a vehicular state estimating routine to be executed at Step S1020 of FIG. 25.

This vehicular state estimation is for estimating whether the running state of the vehicle is in the under-steer (US) tendency, in the over-steer (OS) tendency or in the neutral-steer (NS) state, and is executed as shown in FIG. 26.

In the vehicular state estimation, more specifically, at Step S1210, a target yawing acceleration dyro corresponding to the steering operation of the driver is calculated by using the following Formula (3) using a steering angular rate dma, a vehicle speed (or body speed) V, a wheel base L, a steering gear ratio M and a stability factor Kh as parameters:

$$dyro = dma \times V / L \times N (1 + Kh \times V2) \qquad (3)$$

Of the parameters, the steering angular rate dma is a differential value of the steering angle and is determined on the basis of the input signal from the steering angle sensor 244. The vehicle speed V is determined by calculating the average value (i.e., the average driven wheel speed) of the rotational speeds of the left and right driven wheels 222FL and 222FR, as obtained from the driven wheel speed sensors 232FL and 232FR. On the other hand, the wheel base L, the steering gear ratio N and the stability factor Kh are values intrinsic to the vehicle and are stored in advance in the ROM.

When the target yawing acceleration dyro is thus calculated, a yawing acceleration deviation Δdyr (=dyro−dyr) is calculated at Step S1220 by determining an actual yawing acceleration (i.e., real yawing acceleration) of the vehicle on the basis of the output signal from the yawing rate sensor 240 and by subtracting the real yawing acceleration dyr from the target yawing acceleration dyro.

At subsequent Step S1225, the sign of the real yawing acceleration dyr is determined (negative or positive). When dyr≧0, it is determined at Step S1230 whether or not the yawing acceleration deviation Δdyr is smaller than a preset OS tendency reference value Kdyr1 (Kdyr1: a negative constant). When Δdyr<Kdyr1, it is stored at Step S1240 that the vehicle is in the OS tendency.

When Δdyr≧Kdyr1, on the other hand, the routine advances to Step S1250, at which it is determined the yawing acceleration deviation Δdyr is larger than a preset US tendency reference value Kdyr2 (Kdyr2: a positive constant).

When Δdyr>Kdyr2, it is stored at Step S1260 that the vehicle is in the US tendency. When Δdyr≦Kdyr2, because the yawing acceleration deviation Δdyr is no less than the OS tendency reference value and no more than the US tendency reference value, it is stored at Step S1270 that the vehicle is turning in the neutral state (NS).

When dyr<0 at Step S1225, on the other hand, it is determined at Step S1280 whether or not Δdyr>−Kdyr1. When Δdyr>−Kdyr1, it is stored at Step S1240 that the vehicle is in the OS tendency.

When Δdyr≦−Kdyr1, it is determined at subsequent Step S1290 whether or not Δdyr<−Kdyr2. When Δdyr<−Kdyr2, it is stored (at Step S1260) that the vehicle is in the US tendency. When Δdy≧−Kdyr2, on the other hand, it is stored (at Step S1270) that the vehicle is turning in the neutral state (NS).

When the running state of the vehicle is thus estimated by the vehicular state estimation processing (at Step S1020), it is then determined at Step S1030 on the basis of the estimation result whether or not the vehicle is in the US tendency. When the vehicle is in the US tendency, the engine output correction value ΔTEUP for increasing the output of the internal combustion engine 202 in accordance with the turning state (or the US tendency) of the vehicle is calculated at Step S1060, and target slip ratios λiT and λoT of the individual wheels 222RL and 222RR for controlling the braking forces of the left and right drive wheels 222RL and 222RR are calculated at Step S1070.

When it is determined at Step S1030 that the vehicle is not in the US tendency, on the other hand, it is determined at Step S1040 on the basis of the estimation result of Step S1020 whether or not the vehicle is in the OS tendency. When the vehicle is in the OS tendency, the engine output correction value ΔTEUP for increasing the output of the internal combustion engine 202 in accordance with the turning state (i.e., the OS tendency) of the vehicle is calculated at Step S1080, and target slip ratios λit, λot and λoTF of the individual wheels 222RL, 222RR and 222oF respectively for controlling the braking forces of the left and right drive wheels 222RL and 222RR and the braking force of one of the driven wheels 222oF which is an outer driven wheel of a turning circle among the left and left driven wheels 222FL and 222FR are calculated at Step S1090.

Here: the suffix "iT" attached to the target slip ratio λ indicates the target slip ratio to the inner wheel of the turning circle among the left and right drive wheels 222RL and 222RR; the suffix "oT" indicates the target slip ratio to the outer drive wheel of the turning circle among the left and right drive wheels 222RL and 222RR; and the suffix "oTF" indicates the target slip ratio to the outer driven wheel of the turning circle among the left and right driven wheels 222FL and 222FR.

When it is determined at Step S1040 that the vehicle is not in the OS tendency, on the other hand, it is considered that the turning state of the vehicle is optimum and that turning motion control is unnecessary. Therefore, and the control is initialized to transfer the routine to Step S1010 again.

Figure 27A:
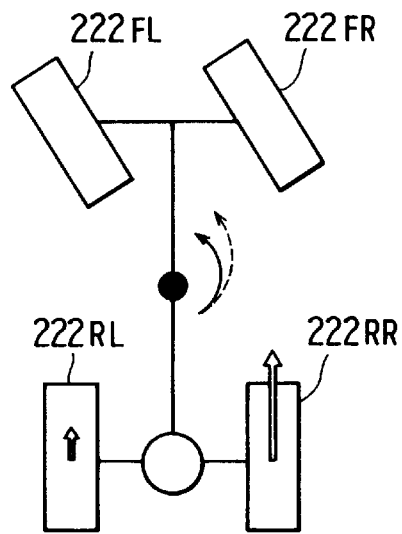
FIGS. 27A and 27B are explanatory diagrams for explaining control operations in an under-steer state and an over-steer state by turning motion control.

When the vehicle is in the US tendency, as illustrated in FIG. 27A, the actual yawing moment (as indicated by a dotted line) to be applied to the position of gravity of the vehicle is lower than the requested (target) yawing moment (as indicated by a solid line), as requested from the driver by the steering operation. At Steps S1060 and S1070, therefore, the control quantities for controlling the yawing moment of the vehicle to the requested yawing moment corresponding to the steering operation of the driver are calculated. In more detail, the engine output correction value ΔTEUP for increasing the output of the internal combustion engine 202 is calculated at Step S1060, and target slip ratios λiT and λoT of the individual drive wheels 222RL and 222RR are calculated at Step S1070. In accordance with the engine output correction value ΔTEUP and the target slip ratios λiT and λoT, the output torque from the internal combustion engine 202 is increased and the braking force to the drive wheel (corresponding to the left drive wheel 222RL in FIG. 27A), which is the inner drive wheel of the turning circle among the left and right drive wheels 222RL and 222RR, is applied. As a result, the torque distribution ratio between the left and right drive wheels 222RL and 222RR is controlled so as to make the drive force of the outer drive wheel of the turning circle (corresponding to the right drive wheel 222RR in FIG. 27A) higher than that of the inner drive wheel of the turning circle (corresponding to the left drive wheel 222RL).

To describe the detailed processing at Step S1060, the requested yawing moment Mreq is determined on the basis of the yawing acceleration deviation Δdyr, as determined at Step S1220, and the inertial moment I of the vehicle by using the following Formula (4):

$$Mreq = I \times \Delta dyr \qquad (4).$$

Moreover, the prevailing engine torque TE is determined by using a map (not illustrated) in which the engine rotational speed detected by the engine rotational speed sensor 230 and the throttle opening detected by the throttle opening sensor 216 are used as parameters.

Furthermore, the prevailing drive torque TN of the drive wheels 222RL and 222RR is determined on the basis of the engine torque TE, the total transmission efficiency Γ of the drive forces in the power transmission line from the internal combustion engine 202 to the left and right drive wheels 222RL and 222RR, and the total gear ratio i in the power transmission line by using the following Formula (5):

$$TN = TE \times i \times \Gamma \qquad (5).$$

Finally, the correction value (i.e., the engine output correction value) ΔTEUP for the engine torque is calculated by the following Formula (6):

$$\Delta TEUP = \{(\Gamma/LT) \times Mreq - (TN - Rt)\} / i \times \Gamma \qquad (6).$$

In Formula (6), Γ: the effective radius of the drive wheels, LT: one half of the tread, and Rt: the torque converted value of the rolling resistance.

When the engine output correction value ΔTEUP thus determined is negative, ΔTEUP is set to 0, that is, ΔTEUP is guarded by the value "0".

At Step S1070, the target drive force difference ΔDR of the left and right drive wheels 222RL and 222RR is determined on the basis of the required yawing moment Mreq and a value LT corresponding to one half of the tread by using the following Formula (7):

$$\Delta DR = Mreq/LT \qquad (7).$$

Next, the slip ratio difference ΔSDLT of the left and right drive wheels 222RL and 222RR is determined on the basis of the target drive force difference ΔDR and the changing rate K1 of the braking/driving forces with respect to the slip ratio λ of the wheels by using the following Formula (8):

$$\Delta SDLT = \Delta DR/K1 \qquad (8).$$

Moreover, the target slip ratio λiT of the inner drive wheel of the turning circle is determined on the basis of the slip ratio difference ΔSDLT and the prevailing slip ratio λi of the inner drive wheel of the turning circle by using the following Formula (9):

$$\lambda iT = \lambda i - \Delta SDLT/2 \qquad (9).$$

Finally, the target slip ratio λoT of the outer drive wheel of the turning circle is determined on the basis of the target slip ratio λiT of the inner drive wheel of the turning circle and the slip ratio difference ΔSDLT by using the following Formula (10):

$$\lambda oT = \lambda iT + \Delta SDLT \qquad (10).$$

Figure 28:
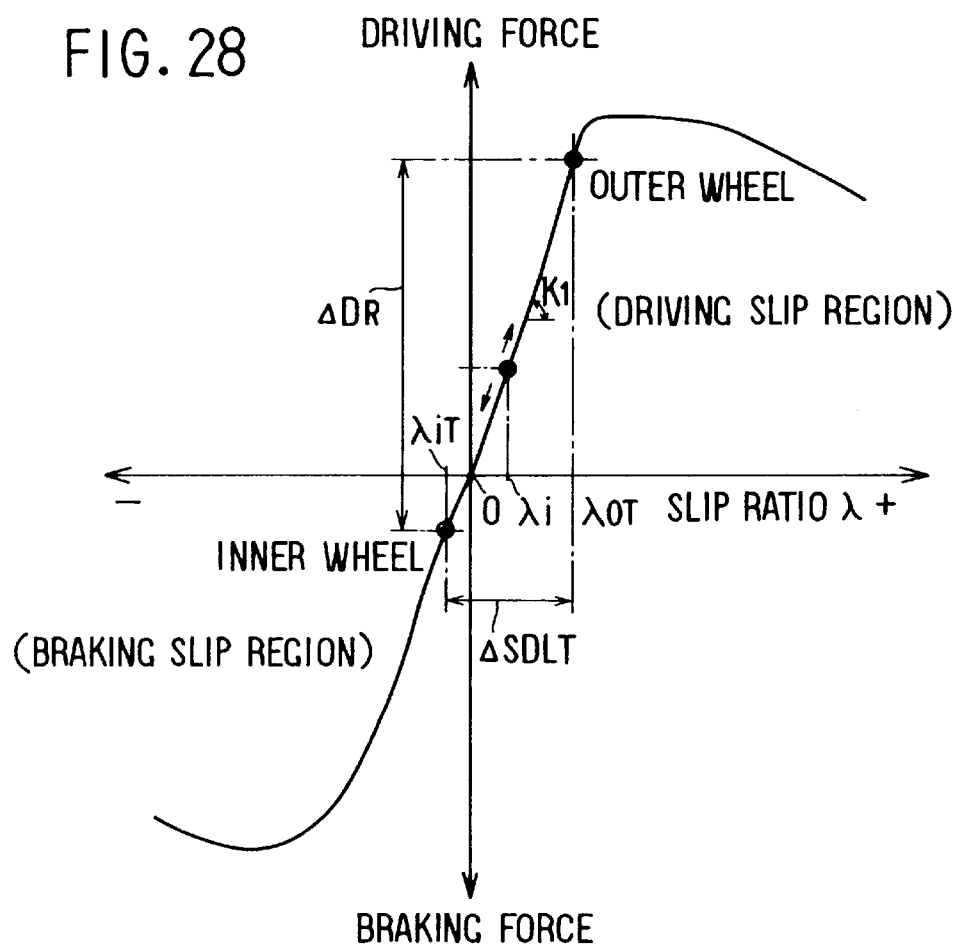
FIG. 28 is a graph for explaining the changing characteristics of braking/driving forces against slip ratio λ of drive wheels and the procedure for setting the target slip ratio of left/right drive wheels.

Here, the changing rate K1 to be used for determining the slip ratio difference ΔSDLT is a changing rate (i.e., the gradient of a linear section illustrated in FIG. 28) of the braking/driving forces to the slip ratio λ within a region, in which the braking/driving forces change substantially in proportion to the change in the slip ratio λ so that the change can be linearly approximated, from the braking slip region (in which the slip ratio λ is negative) in which the wheel speed is lower than the body speed V, to the drive slip region (in which the slip ratio λ is positive) in which the wheel speed is higher than the body speed V, as illustrated in FIG. 28.

In the present embodiment, moreover, the turning state of the vehicle can be controlled to the target turning state corresponding to the steering operation of the driver, by determining the target slip ratios λiT and λoT of the individual drive wheels, i.e., the inner and outer drive wheels of the turning circle. That is, in response to the target slip ratios λiT and λoT, the braking force is applied to the inner drive wheel of the turning circle and the drive force is applied to the outer drive wheel of the turning circle thereby to increase the yawing moment of the vehicle in the US tendency to the target yawing moment.

In the present embodiment, moreover, the target slip ratios λiT and λoT of the inner and outer drive wheels of the turning circle are determined on the basis of the changing rate K1. When these individual target slip rates λiT and λoT fail to fall within the region in which the changes in the braking/driving forces to the slip rate λ can be linearly approximated, the desired yawing moment cannot be established in the vehicle so that the vehicular motion becomes unstable. For the individual target slip ratios λiT and λoT, therefore, upper and lower limits λLimit are set so that the target slip ratios λiT and λoT are individually limited not to exceed the upper and lower limits λLimit as to their absolute values.

Figure 27B:
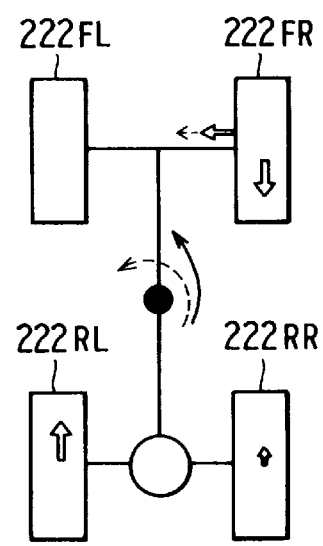

On the other hand, when the vehicle in the OS tendency, as illustrated in FIG. 27B, the actual yawing moment (as indicated by a dotted line) to be applied to the position of gravity of the vehicle is higher than the requested yawing moment (as indicated by a solid line), as requested from the driver by the steering operation. Therefore, at Steps S1080 and S1090, the control quantities are calculated so that the output torque from the internal combustion engine 202 is increased, and the braking force is applied to the outer drive wheel of the turning circle (corresponding to the right drive wheel 222RR). As a result, the torque distribution ratio to the left and right drive wheels 222RL and 222RR is controlled to make the drive force of the outer turning drive wheel lower than the drive force of the inner turning drive wheel. Moreover, the control quantities are calculated so that the braking force is applied to the outer driven wheel of the turning circle (corresponding to the right driven wheel 222FR) so as to reduce the lateral resistant force (applied to the right driven wheel 222FR, as indicated by a transverse arrow) of the outer driven wheel of the turning circle from the value, as indicated by a dotted line, to the value as indicated by solid line. As a result, the yawing moment of the vehicle can be controlled to the requested yawing moment corresponding to the steering operation of the driver.

The operation of Step S1080 is executed as that of the aforementioned Step S1060. At Step S1090, the target drive force difference ΔDR of the left and right drive wheels 222RL and 222RR is determined by using the following Formula (11) on the basis of the requested yawing moment Mreq, as determined by the aforementioned Formula (4), the value LT corresponding to one half of the tread, the changing rate Kf of the lateral resistant force to the braking force, and the distance Lf between the axis of the driven wheel (or the front wheel) and the gravity position of the vehicle:

$$\Delta DR = Mreq/(LT \times 1.5 + 0.5 \times Kf \times Lf) \qquad (11).$$

Next, the slip ratio difference ΔSDLT of the left and right drive wheels 222RL and 222RR is determined on the basis of the target drive force difference ΔDR and the changing rate K1 of the braking/driving forces to the slip ratio λ of the wheels by using the aforementioned Formula (8).

The target slip ratios λit and λoT of the inner and outer drive wheels of the turning circle are determined on the basis of the slip ratio difference ΔSDLT and the prevailing slip ratios λi and λo of the inner and outer drive wheels of the turning circle by using the following Formulas (12) and (13).

$$\lambda iT = \lambda i + \Delta SDLT/2 \qquad (12)$$

$$\lambda oT = \lambda o - \Delta SDLT/2 \qquad (13)$$

Finally, the target slip ratio λoTF of the outer driven wheel of the turning circle is determined on the basis of the slip ratio difference ΔSDLT and the prevailing slip ratio λoF of the outer driven wheel of the turning circle by using the following Formula (14):

$$\lambda oTF = \lambda iT + \Delta SDLT \qquad (14).$$

Here, the target slip ratios λiT and λoT of the individual drive wheels are so limited as in the calculation of Step S1070 that their absolute values may not exceed the upper and lower limits Limit.

Further, the calculation Formula (11) for determining the target drive force difference ΔDR of the left and right drive wheels 222RL and 222RR is set, as follows.

Specifically, the requested yawing moment Mreq can be written by the following Formula (15), if: the difference between the drive forces to be generated in the left and right drive wheels is designated by ΔDR; the braking force to be applied to the outer driven wheel of the turning circle is designated by ΔBF; the lateral resistant force to be applied to the outer driven wheel of the turning circle is designated by ΔFy; the one half of the tread by LT; and the distance between the axis of the driven wheels and the center of gravity by Lf:

$$Mreq = \Delta DR \times LT + \Delta BF \times LT + \Delta Fy \times Lf \quad (15)$$

This Formula (15) can be rewritten into the following Formula (16) if the approximations of ΔBF=ΔDR/2 and ΔFy=ΔBF×Kf are made in Formula (15):

$$Mreq = \Delta DR \times LT + (\Delta DR/2) \times LT + (\Delta DR/2) \times Kf \times Lf \quad (16)$$

From this Formula (16), moreover, the calculation formula for determining the target drive force difference ΔDR can be rewritten into the aforementioned Formula (11).

When the engine output correction value ΔTEUP and the target slip ratios λiT, λoT and λoTF of the individual wheels are thus calculated at Steps S1060 and S1070 or S1080 and S1090, the routine then advances to Step S1100 (as shown in FIG. 25).

Figure 29:
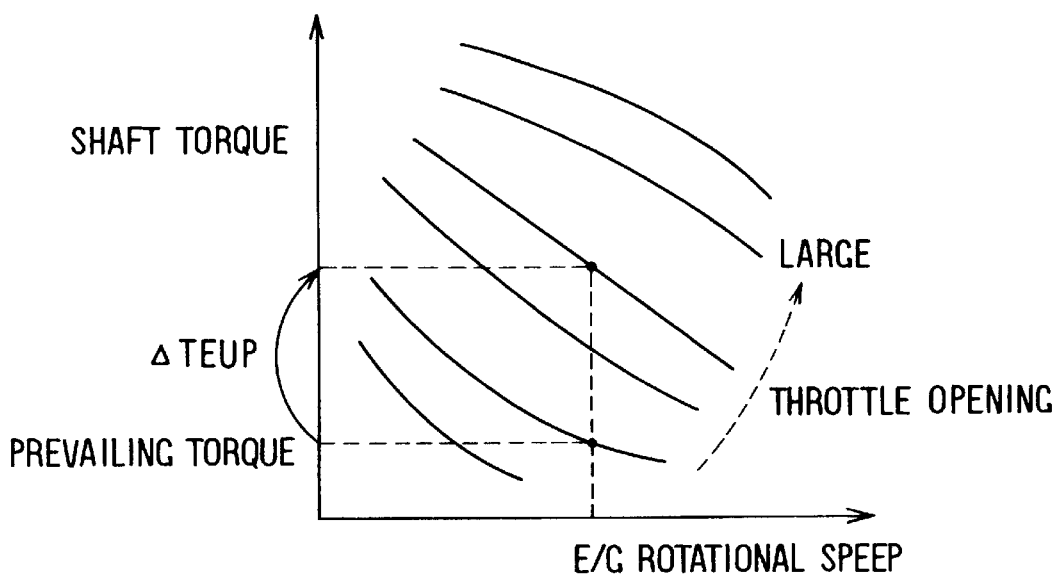
FIG. 29 is a graph illustrating a map for determining a throttle opening required for increasing the output torque of an internal combustion engine by an engine output correction ΔTEUP.

At Step S1100, moreover, the map indicating the relations among the engine rotational speed and the engine shaft torque and the throttle opening of the internal combustion engine 202, as illustrated in FIG. 29 is used to calculate the throttle opening (i.e., the target throttle opening) necessary for increasing the engine shaft torque of the internal combustion engine 202 from the prevailing torque by the engine output correction value ΔTEUP, and the throttle drive motor 210 is driven so that the throttle opening which is detected by the throttle opening sensor 216, may take that target opening.

At subsequent Step S1110, moreover, brake fluid pressure control is performed to control the slip ratio λi of the inner drive wheel of the turning circle among the left and right drive wheels 222RL and 222RR to the target slip ratio λiT and the slip ratio λo of the outer drive wheel of the turning circle to the target slip ratio λoT, and to control the slip ratio λoF of the outer driven wheel of the turning circle, when its target slip ratio λoTF is set, to the target slip ratio λoTF. When brake fluid pressure control is once ended, the routine returns to Step S1010.

Figure 30:
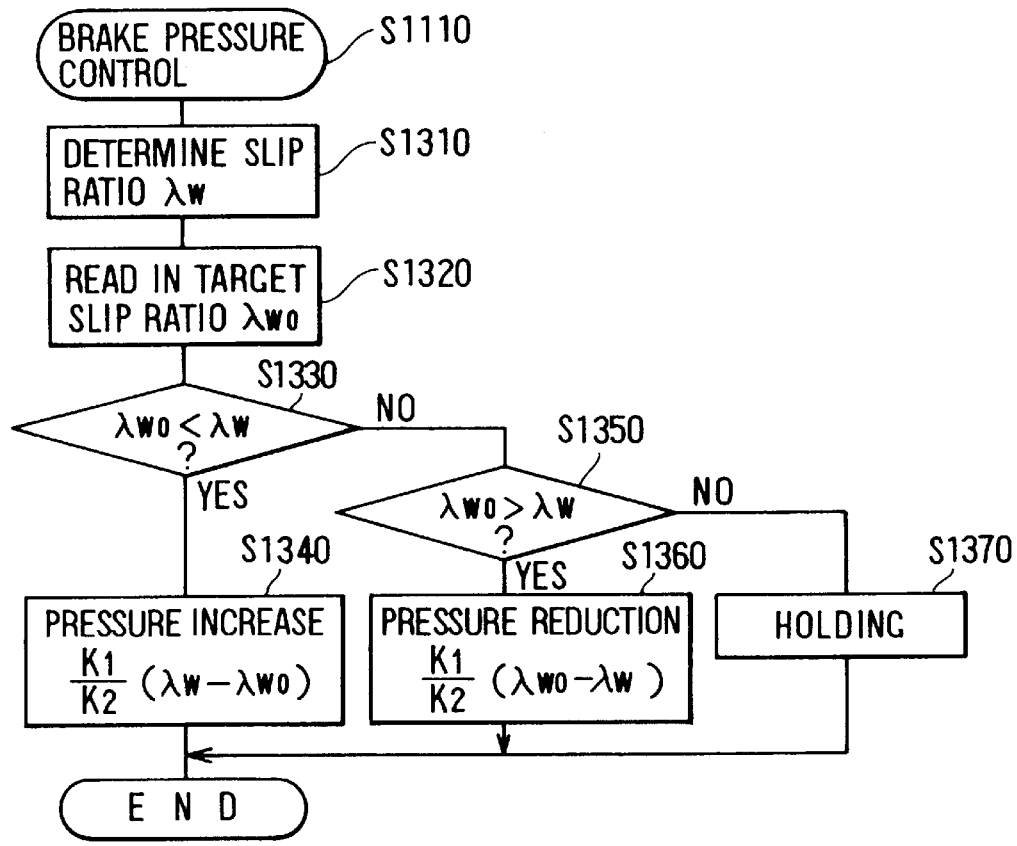
FIG. 30 is a flow chart showing a brake fluid pressure control routine to be executed at Step S1110 of FIG. 25 for each wheel.

Next, brake fluid pressure control of Step S1110 is executed according to the flow chart, as shown in FIG. 30, for the individual wheels (i.e., the left and right drive wheels 222RL and 222RR and one of the left and right driven wheels 222FL and 222FR) to be controlled.

Specifically, the slip ratio λW (i.e., λi, λo or λoF) of one of the wheels to be controlled is determined at Step S1310, and the target slip ratio λWO (i.e., λiT, λoT or λoTF) for that wheel is then read in at subsequent Step S1320.

At Step S1310, the slip ratio λw of the wheel is calculated by using the following Formula (17), when the rotational speed (i.e., the wheel speed VW) of the wheel is lower than the body speed V (V>VW) and when a braking slip occurs at the wheel, and by using the following Formula (18) when the wheel speed VW is higher than the body speed (V<VW) and when an acceleration slip occurs at the wheel. However, the slip ratio is set to λW=0 when the wheel speed VW is equal to the body speed V.

$$\lambda W = -(V - VW)/V \quad (17)$$

$$\lambda W = (VW - V)/VW \quad (18)$$

At Step S1330, it is determined whether or not the slip ratio λW determined at Step S1310 is higher than the target slip ratio λWO. When the slip ratio λW is higher than the target slip ratio λWO, the routine advances to Step S1340, at which the control pattern for controlling the brake fluid pressure of the wheel cylinder of the wheel is set to the increasing pattern for increasing the brake fluid pressure by opening/closing the increasing control valve in the hydraulic circuit 250 thereby to increase the braking force to be applied to the wheel.

Here, the increasing pattern is set so that the rise in the brake fluid pressure may be expressed by the following Formula (19) using as its parameters the changing rate K1 of the braking/driving forces to the slip ratio, the changing rate K2 of the braking force to the change in the brake fluid pressure, the slip ratio λW and the target slip ratio λWo.

$$\text{Pressure Rise} = (K1/K2) \times (\lambda W - \lambda WO) \quad (19)$$

When it is determined at Step S1330 that the slip ratio λW is no more than the target slip ratio λWO, on the other hand, the routine advances to Step S1350, at which it is determined whether or not the slip ratio λW is lower than the target slip ratio λWO. When the slip ratio λW is lower than the target slip ratio λWO, the routine advances to Step S1360, at which the control pattern for controlling the brake fluid pressure in the wheel cylinder of the wheel to a reducing pattern for reducing the brake fluid pressure thereby to reduce the braking force to be applied to the wheel, by opening/closing the reducing control valve in the hydraulic circuit 250.

Here, this reducing pattern is set so that the pressure reduction is expressed by the following Formula (20) using as its parameters the changing rate K1 of the braking/driving forces to the slip ratio, the changing rate K2 of the braking force to the change in the brake fluid pressure, the slip ratio λW and the target slip ratio λWO.

$$\text{Pressure Reduction} = (K1/K2) \times (\lambda WO - \lambda W) \quad (20)$$

When it is determined at Step S1350 that the slip ratio λW is no less than the target slip ratio λWO (that is, the slip ratio λW has been controlled to the target slip ratio λWO), the routine advances to Step S1370, at which the control pattern for controlling the brake fluid pressure of the wheel cylinder of the wheel is set to the holding pattern, in which the increasing control valve and the reducing control valve in the hydraulic circuit 250 are controlled to the closing state, thereby to retain the braking force to be applied to the wheel in the present state.

At the execution of this brake fluid pressure control, the pumps 271A and 271B in the hydraulic circuit 250 are driven so that the brake fluid pressure of the wheel cylinder of the wheel to be controlled can be controlled.

The operations by the aforementioned turning motion controlling routine will be described with reference to the explanatory diagram of FIG. 31. Here, FIG. 31 illustrates the case in which the driver highly steers sequentially leftward and rightward to change the traffic lane or to run on an S-curve, for example.

Figure 31:
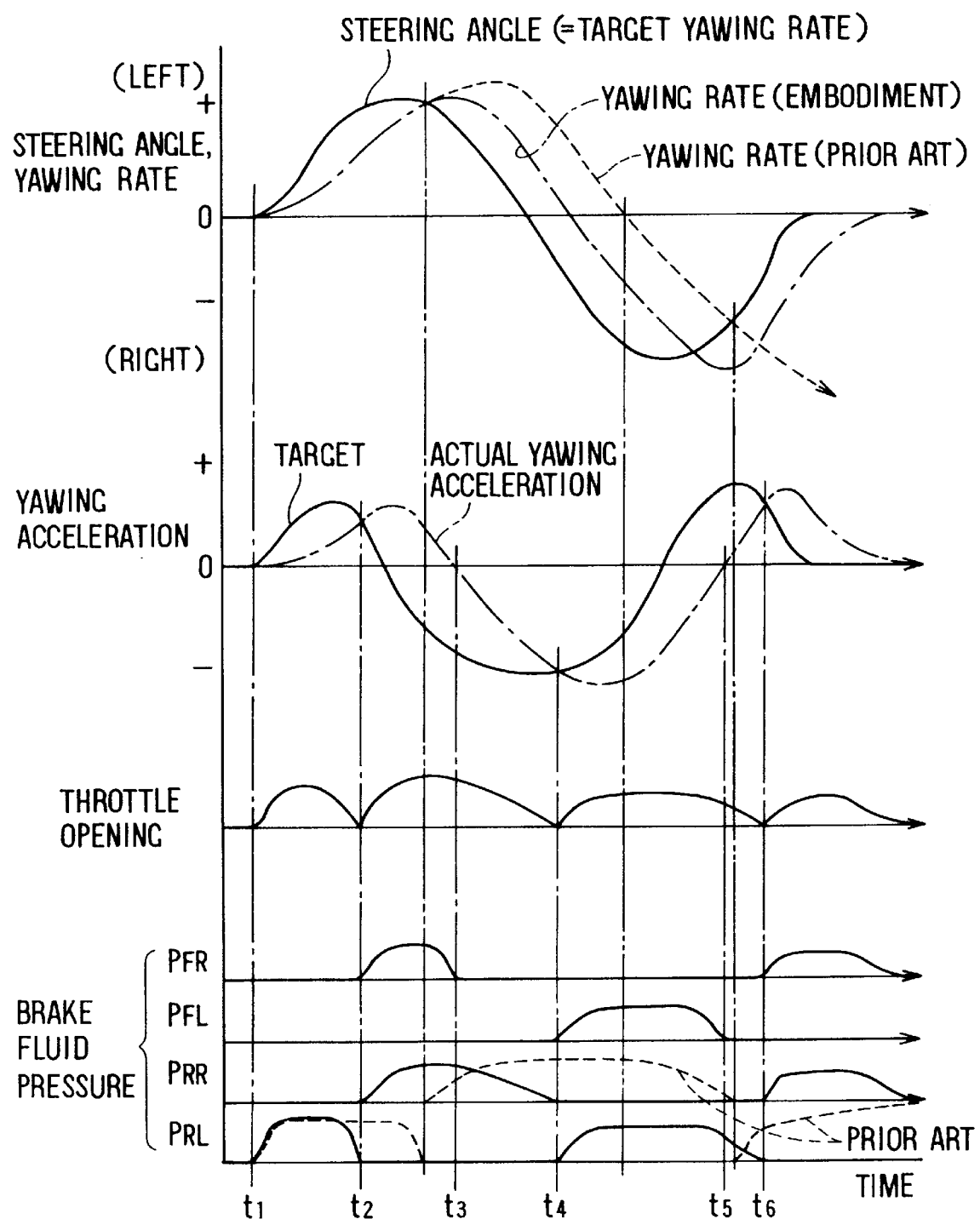
FIG. 31 is a time chart illustrating one example of the operations by turning motion control.

When the driver steers leftward at a time t1, as illustrated in FIG. 31, the target yawing rate, as required by the driver, increases in the +direction in accordance with the steering angle so that the target yawing acceleration, as required by the driver, also increases in the +direction in accordance with the steering angular rate.

When the actual yawing acceleration is lower than the target yawing acceleration, it is determined that the vehicle is in the US tendency. In order to establish the yawing moment necessary for the vehicle, the throttle opening is made larger than the reference opening corresponding to the accelerator operation of the driver to raise the output toque of the internal combustion engine 202. At the same time, the brake fluid pressure PRL provided to the inner drive wheel of the turning circle, i.e., the left drive wheel 222RL is increased to apply the braking force to the left drive wheel 222RL. As a result, a torque difference (i.e., the dive force difference) in the left and right drive wheels 222RL and 222RR is established.

When the actual yawing acceleration of the vehicle is caused by such control to reach the target yawing acceleration so that the former exceeds the latter (at a time t2), it is then determined that the vehicle is in the OS tendency. In order to suppress the yawing moment generated in the vehicle, the throttle opening is made larger than the reference opening corresponding to the accelerator operation of the driver thereby to raise the output torque of the internal combustion engine 202. At the same time, the brake fluid pressure PRR to the outer drive wheel of the turning circle, i.e., the right drive wheel 222R is increased to apply the braking force to the left drive wheel 222RL. As a result, the torque difference (i.e., the drive force difference) in the direction inverted from the foregoing one in the left and right drive wheels 222RL and 222RR is established. Moreover, the brake fluid pressure PFR to the outer driven wheel of the turning circle, i.e., the right driven wheel is increased to reduce the lateral resistant force of the driven wheel 222FR.

According to the present embodiment, therefore, when the driver turns the vehicle by the steering operation, the yawing moment necessary for the turn can be established in the vehicle to realize the turning state the driver requests.

When the driver once steers leftward and then switches to the rightward steering, on the other hand, the target yawing acceleration changes in the direction (i.e., the −direction, as illustrated) opposed to the prevailing one.

When the target yawing acceleration thus changes, it is determined till the actual yawing acceleration reaches "0" that the vehicle is in the OS tendency, and the aforementioned control is continued. When the actual yawing acceleration comes (at a time t3) in the same (−) direction as that of the target yawing acceleration, it is determined that the vehicle is in the US tendency.

When it is thus determined that the vehicle is in the US tendency, in order to establish the yawing moment necessary for turning the vehicle rightward, the throttle opening is made larger than the reference opening corresponding to the accelerator operation of the driver to increase the output torque of the internal combustion engine 202. At the same time, the brake fluid pressure PRR to the inner drive wheel of the turning circle, i.e., the right drive wheel 222RR is increase (in a continuous manner) to apply the braking force to the right drive wheel 222RR. As a result, a torque difference (i.e., the drive force difference) in the left and right drive wheels 222RL and 222RR is established.

When the actual yawing acceleration of the vehicle is caused by such control to reach the target yawing acceleration so that the actual yawing acceleration exceeds the target yawing acceleration in the −direction (at a time t4), it is then determined that the vehicle is in the OS tendency. In order to suppress the yawing moment generated in the vehicle, the throttle opening is made larger than the reference opening corresponding to the accelerator operation of the driver to raise the output torque of the internal combustion engine 202. At the same time, the brake fluid pressure PRL to the outer drive wheel of the turning circle, i.e., the left drive wheel 222RL is increased to apply the braking force to the left drive wheel 222RL. As a result, a torque difference (i.e., the drive force difference) in the direction opposed to the prevailing one is established in the left and right drive wheels 222RL and 222RR. In addition, the brake fluid pressure PFL to the outer driven wheel of the turning circle, i.e., the left driven wheel 222FL is increased to reduce the lateral resistant force of the driven wheel 222FL.

When the driver stops the steering operation to return the steering angle to "0", the target yawing acceleration changes again in the +direction. When the target yawing acceleration thus changes, it is determined till the actual yawing acceleration reaches "0" that the vehicle is in the OS tendency, and the aforementioned control is continued. When the actual yawing acceleration comes (at a time t5) in the same +direction as that of the target yawing acceleration, it is determined that the vehicle is US tendency.

When it is thus determined that the vehicle is in the US tendency, in order to establish the yawing moment necessary for the vehicle, the throttle opening is made larger than the reference opening corresponding to the accelerator operation of the driver to raise the output torque of the internal combustion engine 202. At the same time, the brake fluid pressure PRL to the inner drive wheel of the turning circle, i.e., the left drive wheel 222RL is increased (in the continuous manner) to apply the braking force to the left drive wheel 222RL. As a result, the torque difference (i.e., the drive force difference) necessary for the left and right drive wheels 222RL and 222RR is established.

When the actual yawing acceleration of the vehicle is caused by such control to reach the target yawing acceleration so that the actual yawing acceleration exceeds the target yawing acceleration (at a time t6), it is then determined that the vehicle is in the OS tendency. In order to suppress the yawing moment generated in the vehicle, the throttle opening is made larger than the reference opening corresponding to the accelerator operation of the driver to raise the output torque of the internal combustion engine 202. At the same time, the brake fluid pressure to the outer drive wheel of the turning circle, i.e., the right drive wheel 222RR is increased to apply the braking force to the right drive wheel 222RR. As a result, a torque difference (i.e., the drive force difference) in the direction opposed to the prevailing one in the left and right drive wheels 222RL and 222RR is established. In addition, the brake fluid pressure PFR to the outer driven wheel of the turning circle, i.e., the right driven wheel 222FR is increased to reduce the lateral resistant force of the driven wheel 222FR.

According to the vehicular motion controlling system of the present embodiment, therefore, even when the vehicle is steered sequentially leftward and rightward so that it may change the lane or turn at the S-curve, it can improve the stability while retaining the steerability, unlike the system of the prior art in which the yawing moment necessary for turning the vehicle is generated merely by the torque difference of the left and right drive wheels so that the vehicle may possibly become unstable by the steering operation after having once imparting the turning round moment to the vehicle.

Specifically, the changes of the brake fluid pressures PRL and PRR to the left and right drive wheels 222RL and 222RR, as illustrated by dotted lines in FIG. 31, represent the brake fluid pressure changes of the case in which the braking forces are applied to the individual drive wheels 222RL and 222RR so that the torque difference may be established by the system of the prior art in the left and right drive wheels 222RL and 222RR to make the yawing rate of the vehicle the target yawing rate corresponding to the steering angle. If the steering stability in the vehicle turning state is tried to be retained merely by the torque difference of the left and right drive wheels 222RL and 222RR as in the prior art, it takes a long time to change the yawing moment of the vehicle in response to the subsequent steering operation if the turning round moment is established in the vehicle by the torque difference of the left and right drive wheels 222RL and 222RR. For this long time, the vehicle comes into an extremely unstable state so that it is likely to spin (with reference to the yawing rate of the prior art, as illustrated by a dotted line.

In the present embodiment, on the contrary, the yawing moment necessary for the turning motion is established not only the torque difference of the left and right drive wheels 222RL and 222RR but also the braking force applied to one of the driven wheels, so that not only the steerability but also the stability can be retained in the vehicle turning state.

Especially in the present embodiment, the torque difference of the left and right drive wheels and the braking force to be applied to the driven wheels are not controlled, as in the prior art system, according to the difference between the target yawing rate and the actual yawing rate, but the torque difference in the left and right drive wheels and the braking forces to be applied to the driven wheels are controlled on the basis of the difference (i.e., the yawing acceleration difference) between the target yawing acceleration and the actual yawing acceleration so that the responsibility of the control after the steering operation can be improved to further improve the steerability and the stability.

Although the fourth embodiment of the present invention has been described, it can be modified in various ways.

For example, the fourth embodiment has been described on the case in which the present invention is applied to the front-engine/rear-drive (FR) vehicle (i.e., the FR car), but similar effects can be attained even when the present invention is applied to the front-engine/front-drive (FF) vehicle (i.e., the FF car).

On the other hand, the foregoing embodiment has been described on the construction in which in the vehicle turning state, not only the drive force (i.e., the output torque of the internal combustion engine) of the drive wheels is increased but also the braking force is applied to the outer drive wheel of the turning circle so as to establish the torque difference between the left and right drive wheels. Despite of this description, however, for the drive wheels, control to generate the torque difference is not executed, but the drive force of the drive wheels may be merely increased according to the turning extent of the vehicle. With this modification, in the vehicle turning state, the lateral resistant force at the drive wheels can be increased to retain the stability of the vehicle, and the braking force is applied to one of the driven wheels to improve the turning characteristics (i.e., the steerability) of the vehicle. As a result, the steerability and stability in the vehicle turning state can be improved better than those of the system of the prior art.

In addition, the foregoing embodiment is given a construction in which the braking force is applied, only when the vehicle is in the OS tendency, to the outer driven wheel of the turning circle to prevent the vehicle from becoming likely to spin. When the vehicle is in the US tendency, however, the steerability of the vehicle can be improved better if the braking force is applied to the inner driven wheel of the turning circle.

A fifth embodiment of the present invention will be described with reference to the accompanying drawings.

Figure 32:
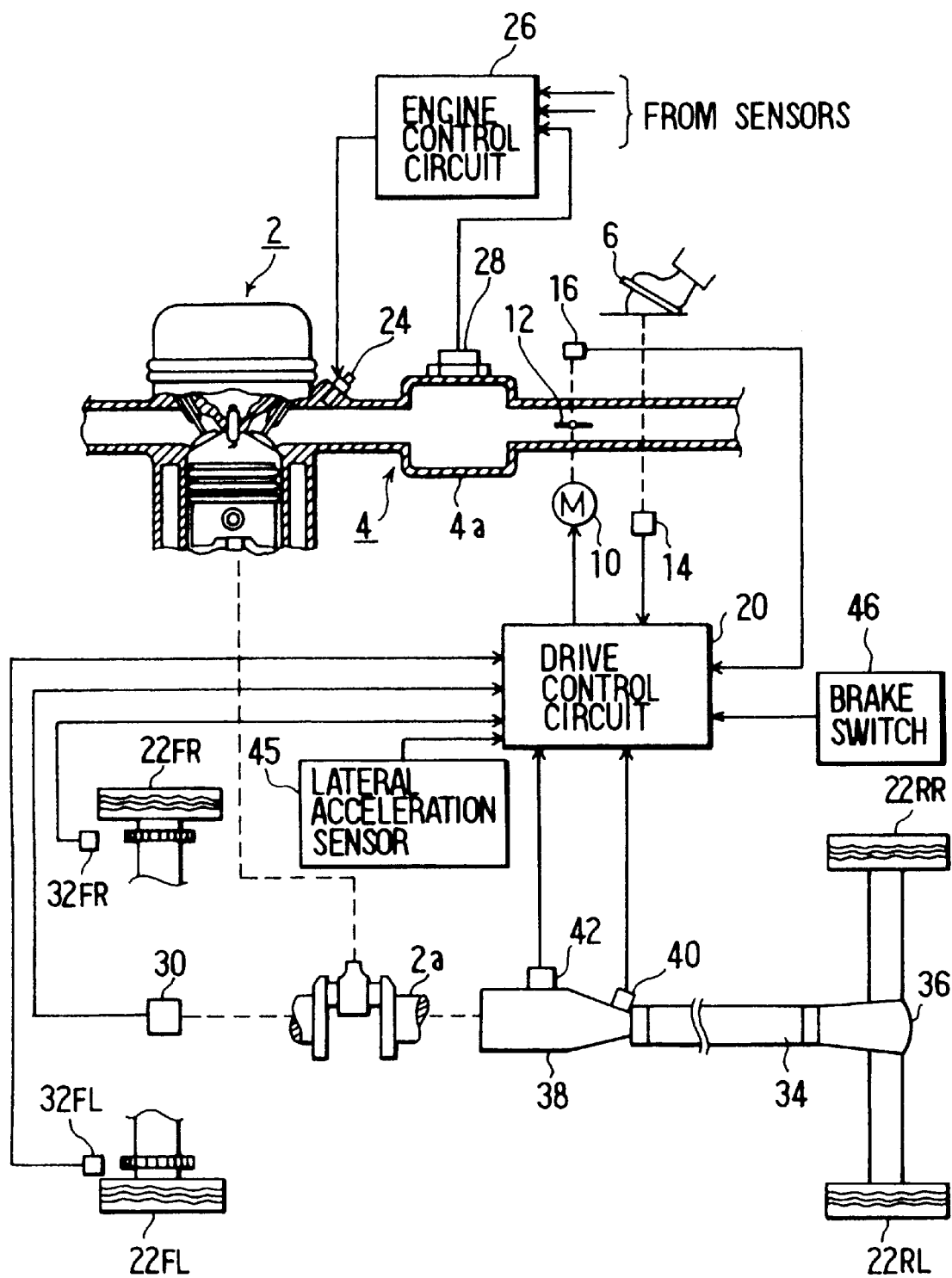
FIG. 32 is a diagram showing a schematic construction of a vehicular motion controlling system according to a fifth embodiment.

The entire construction of a vehicular motion controlling system of the fifth embodiment is shown in FIG. 32. The construction of the vehicular motion controlling system of the fifth embodiment is similar to that of the first embodiment excepting that it is not provided with the braking force controlling unit 50.

However, the sensor for detecting the state of the vehicle is different in the fifth embodiment such that the acceleration sensor 44 is replaced by a lateral acceleration sensor, and such that a brake switch 46 is added.

The lateral acceleration sensor 45 is a well-known semiconductor G sensor for detecting the lateral acceleration to be applied to the vehicle body in a vehicle turning state.

The brake switch 46 is turned ON when a brake pedal (not illustrated) is depressed. It is detected by detecting the ON state of the brake switch 46 that the braking forces are applied to the individual wheels 22FL to 22RR.

Here will be described in more detail the drive force controlling circuit 20.

The drive force controlling circuit 20 is constructed mainly of a microcomputer composed of a CPU, a ROM and a RAM. The ROM is stored with the (not-shown) "fundamental throttle opening map" for calculating the fundamental opening (as will be called the fundamental throttle opening") $\theta B$ of the throttle valve 12 in accordance with the rotational speed of the engine 2, as detected by the engine rotational speed sensor 30, and the opening of the accelerator 6, as detected by the accelerator opening sensor 14.

Figure 33A:
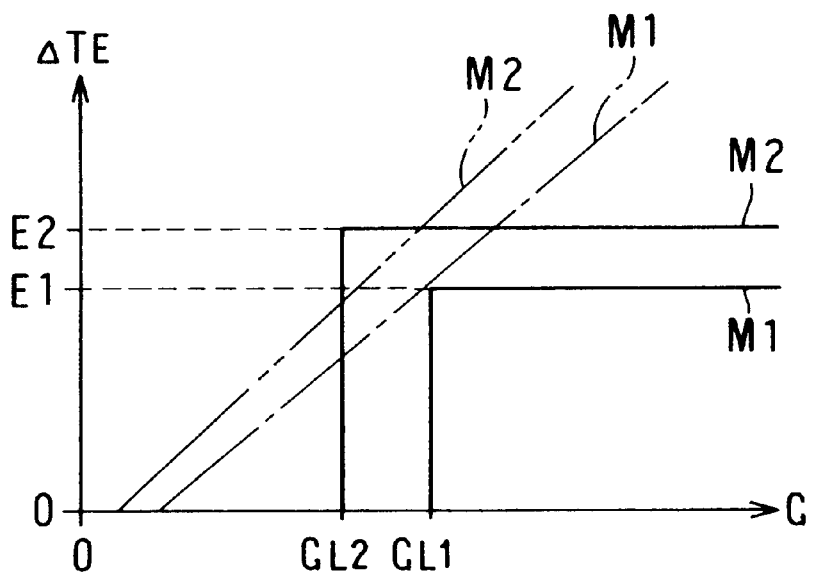
FIG. 33A is a graph illustrating an engine output increase map.

The ROM of the drive force controlling circuit 20 is further stored, as illustrated in FIG. 33A, with the "engine output increase map" indicating the relation between a lateral acceleration G, as detected by the lateral acceleration sensor 45, and the output increase $\Delta TE$ of the engine 2.

As illustrated by two solid lines in FIG. 33A, in the engine output increase map, there are prepared two relations M1 and M2: the first relation M1 to be used for the ordinary turning state in which no braking force is applied to the wheels 22FL to 22RR; and the second relation M2 to be used for the turning and braking states at which the braking forces are applied to the wheels 22FL to 22RR. Moreover, the first relation M1 is set such that when the lateral acceleration G exceeds a first low level reference value GL1, the output increase $\Delta TE$ takes a first predetermined value E1, and the second relation M2 is set such that when the lateral acceleration G exceeds a second low level reference value GL2, the output increase $\Delta TE$ takes a second predetermined value E2 larger than the first predetermined value E1.

Figure 33B:
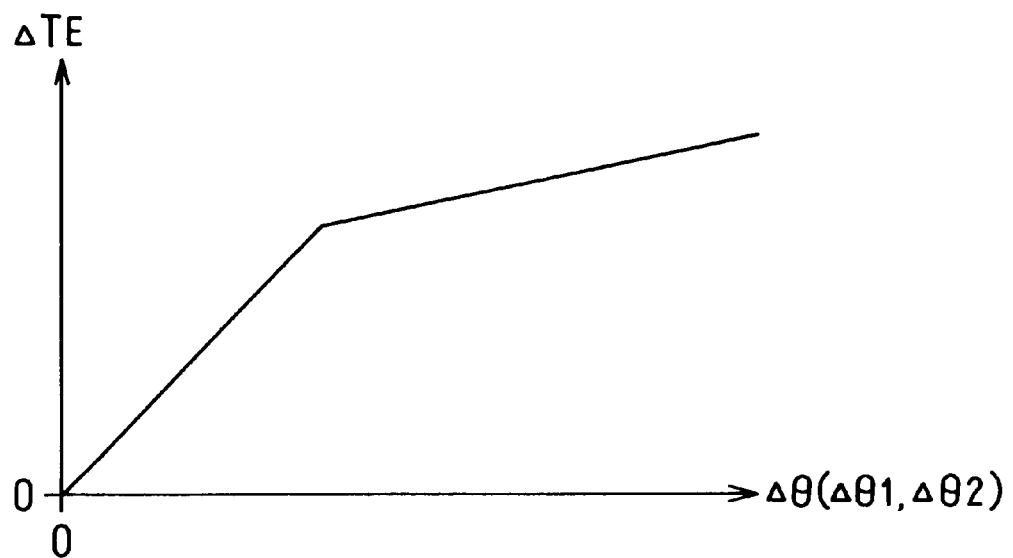
FIG. 33B is a graph illustrating a throttle opening correction map.

The ROM of the drive force controlling circuit 20 is further stored, as illustrated in FIG. 33B, with the "throttle opening correction map" indicating the relation between the output increase $\Delta TE$ of the engine 2 and the correction amount $\Delta \theta$ of the opening of the throttle valve 12 (as will be called the "throttle opening correction amount") necessary for achieving the output increase $\Delta TE$. As seen from FIG. 33B, the throttle opening correction amount $\Delta \theta$ is set to the larger value as the output increase $\Delta TE$ of the engine 2 becomes the larger.

Here, FIGS. 33A and 33B present images, and the individual actual maps present numerical data of the relations of those Figures.

Here will be described the routine for the drive force controlling circuit 20 to control the opening of the throttle valve 12.

First of all, the drive force controlling circuit 20 executes the fundamental throttle opening setting operation (not illustrated) periodically to calculate the fundamental throttle opening $\theta B$ of the throttle valve 12 by using the aforementioned "fundamental throttle opening map" on the basis of the rotational speed of the engine 2 which is detected by the engine rotational speed sensor 30, and the opening of the accelerator 6 which is detected by the accelerator opening sensor 14.

Moreover, the drive force controlling circuit 20 executes the later-described turning state output correcting routine (FIG. 34) and turning braking output correcting routine (FIG. 35) individually for every predetermined time periods, to correct the calculated fundamental throttle opening θB in accordance with the vehicle turning state (i.e., the lateral acceleration G in the present embodiment) thereby to determine the target throttle opening θT of the throttle valve 12.

Still moreover, the drive force controlling circuit 20 executes the drive controlling routine (not illustrated) periodically to drive the throttle drive motor 10 so that the actual opening of the throttle valve 12 which is detected by the throttle opening sensor 16, may be the determined target throttle opening θT. Here in this drive control, for the control of the opening of the throttle valve 12, there is preferentially used the larger target throttle opening θT among the target throttle openings θT which are individually determined by the later-described turning state output correcting routine and turning braking output correcting routine.

Thus, the turning state output correction routine and the turning braking output correction routine, as executed by the drive force controlling circuit 20, will be described with reference to the flow charts of FIGS. 34 and 35.

Figure 34:
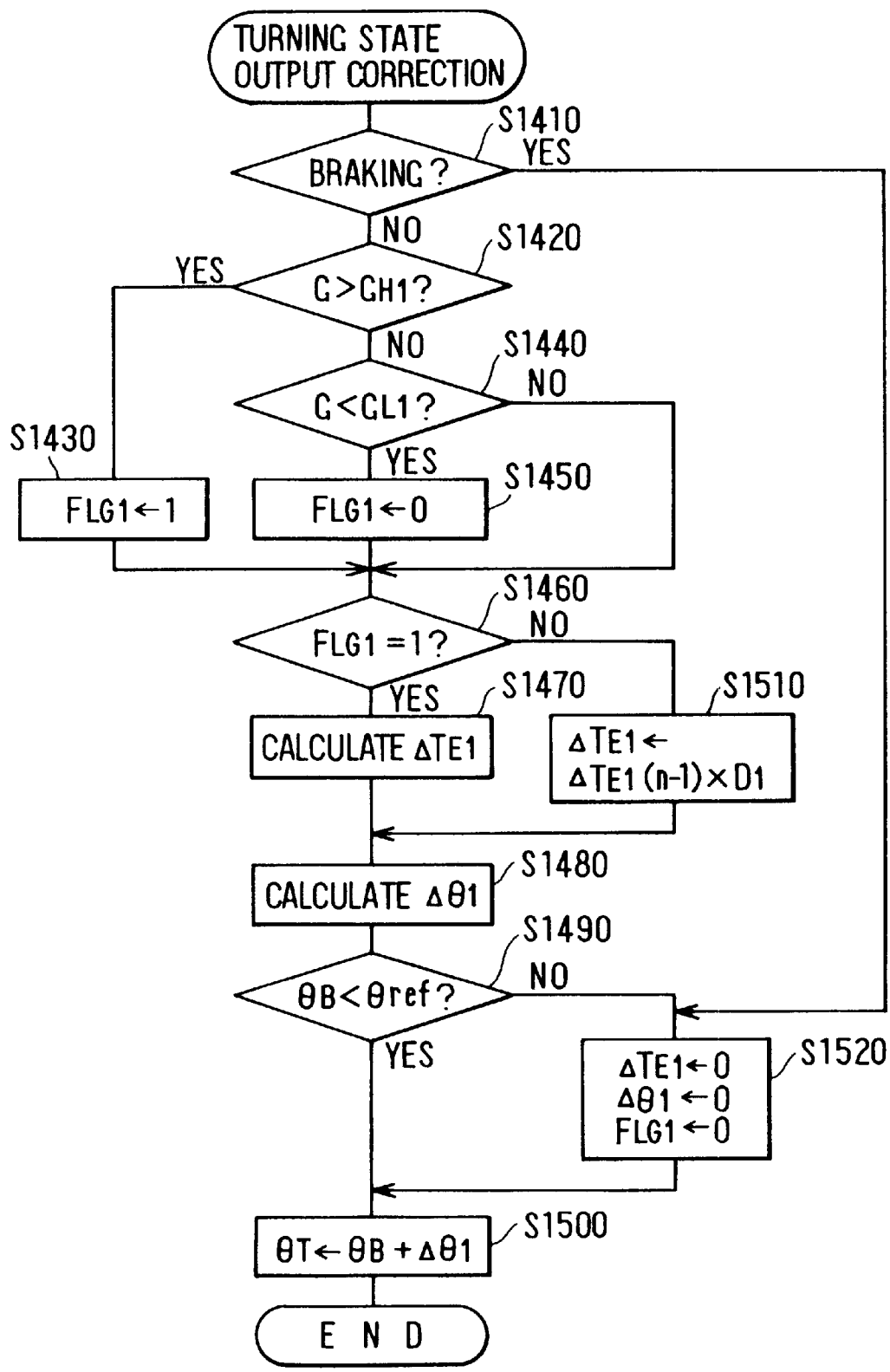
FIG. 34 is a flow chart showing an output correcting routine at the time of a turning state in the fifth embodiment.

First of all, FIG. 34 is a flow chart showing the turning state output correction routine. Here, this routine is executed to increase the output of the engine 2 in accordance with the turning state (i.e., the lateral G) of the vehicle in the ordinary turning state in which no braking force is applied to the wheels 22FL to 22RR.

When the drive force controlling circuit 20 starts the execution of the turning state output correction routine, as shown in FIG. 34, it is determined at first Step S1410 on the basis of the ON/OFF state of the brake switch 46 whether or not the vehicle is being braked.

When it is determined at Step S1410 that the vehicle is not in the braking state (that is, the brake switch 46 is OFF), the routine advances to Step S1420, at which it is determined whether or not the lateral acceleration G of the vehicle body, as detected by the lateral acceleration sensor 45, is higher than the first high level reference value GH1 (>GL1) which is set at a higher value than a first low level reference value GL1. When the lateral acceleration G is higher than the first high level decision value GH1, the routine advances to Step S1430, at which a turning state control flag FLG1 is set to "1".

When it is determined at Step S1420 that the lateral acceleration G is not higher than the high level reference value GH1, the routine advances to Step S1440, at which it is determined whether or not the lateral acceleration G is lower than the first low level reference value GL1. When the lateral acceleration G is lower than the first low level reference value GL1, the turning state control flag FLG1 is set to "0" (or cleared) at subsequent Step S1450.

When any of the operations of Step S1430 and S1450 is executed, or when it is determined at Step S1440 that the lateral acceleration G is not lower than the first low level reference value GL1 (that is, when the lateral acceleration G is no more than the first high level reference value GH1 and no less than the first low level reference value GL1), the routine advances to Step S1460.

At Step S1460, it is determined whether or not the turning state control flag FLG1 is at "1". When at "1", the ΔTE routine advances to Step S1470, at which the output increase ΔTE of the engine 2 is calculated on the basis of the lateral acceleration G of the vehicle body at that time by using the first relation M1 of the engine output increase map, as illustrated in FIG. 33A, and is stored as a turning state output increase ΔTE1 in the RAM. Here in the present embodiment, as illustrated in FIG. 33A, the first predetermined value E1 is stored as the turning state output increase ΔTE1.

At subsequent Step S1480, the throttle opening correction amount Δθ is calculated on the basis of the turning state output increase ΔTE1 by using the throttle opening correction map illustrated in FIG. 33B, as stored in the RAM, and is stored as a turning state opening correction Δθ1 in the RAM.

At subsequent Step S1490, it is determined whether or not the latest fundamental throttle opening θB, as calculated in the aforementioned fundamental throttle opening setting operation (although not shown), is smaller than a predetermined reference value θref. When the fundamental throttle opening θB is smaller than the reference value θref, the routine advances to Step S1500.

Figure 40:
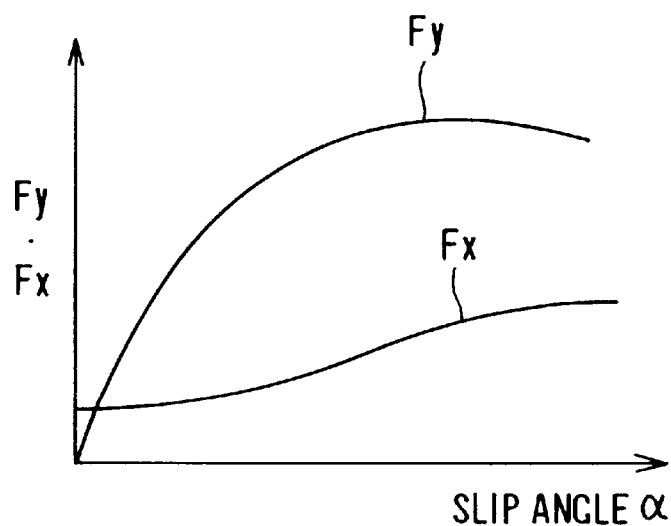
FIG. 40 is a graph for explaining relations of the rolling resistance Fx and the lateral resistant force Fy to a slip angle α of the wheels.

Here, the reference value θref is a value such that, for the engine output in which the opening of the throttle valve 12 is smaller than the value θref, the drive forces to be transmitted to the drive wheels 22RL and 22RR are overcome by the rolling resistance Fx occurring in the turning state and so the lateral resistant force Fy of the wheels drop. In the present embodiment, the aforementioned determination of Step S1490 acts as drive force determining device for determining whether or not the drive force transmitted from the engine 2 to the drive wheels 22RL and 22RR is no more than a predetermined value. Moreover, the rolling resistance Fx of the wheels grows the higher as the turning state of the vehicle grows the more steep (with the larger slip angle α), as illustrated in FIG. 40. In the present embodiment, therefore, the aforementioned reference value θref is set to the higher value as the lateral acceleration G of the vehicle body is the larger.

At Step S1500, moreover, the turning state opening correction amount Δθ1 stored in the Step S1480 is added to the prevailing fundamental throttle opening θB, and the sum (θB+Δθ1) is stored as the target throttle opening θT of the throttle valve 12 in the RAM. By the (not-shown) drive control to be separately executed, as described above, the opening of the throttle valve 12 is controlled to the target throttle opening θT so that the output of the engine 2 is increased by the turning state output increase ΔTE1.

After the execution of this operation of Step S1500, the turning state output correcting routine is once ended.

When it is determined at Step S1460 that the turning state control flag FLG1 is not "1", on the other hand, the routine advances to Step S1510. The turning state output increase ΔTE1(n−1), as used for determining the turning run opening correction Δθ1 at preceding Step S1480, is multiplied by a predetermined attenuation factor D1 (<1), and the multiplied result is stored as the turning state output increase ΔTE1 of this time in the RAM, and the routine then advances to Step S1480.

When it is determined at Step S1460 that the turning state control flag FLG1 is not "1", the turning state output increase ΔTE1 is decreased by the attenuation factor D1 from the first predetermined amount E1 at each execution of the turning state output correction routine, so that the turning state opening correction Δθ1 to be stored at Step S1480 in the RAM is also gradually decreased.

When it is determined at Step S1410 that the vehicle is being braked (that is, the brake switch 46 is ON), on the other hand, the routine advances to Step S1520. At this Step S1520, moreover, frags and the like used in the routine are initialized by setting the turning state output increase ΔTE1, the turning state opening correction Δθ1 and the turning state control flag FLG1 individually to "0", and the routine then advances to Step S1500. When it is determined at Step S1410 that the vehicle is being braked, the fundamental throttle opening θB is set as it is as the target throttle opening θT.

In short, in the turning state output correction routine, it is determined in the ordinary turning state in which no braking force is applied to the wheels 22FL to 22RR that the lateral acceleration G of the vehicle body exceeds the first high level reference value GH1, and that the fundamental throttle opening θB is smaller than the reference value θEref (that is: the answer of Step S1410 is NO; the answer of Step S1420 is YES; and the answer of Step S1490 is YES), the sum of the fundamental throttle opening θB and the turning state opening correction Δθ1 is used as the target throttle opening θT of the throttle valve 12 so that the output of the engine 2 is increased by the turning state output increase ΔTE1 (i.e., the first predetermined value E1) (that is, the answer of Step S1460 is YES, and the operations of Steps S1470 to Step S1500). IF the lateral acceleration G is lower than the first low level reference value GL1 (that is, the answer of Step S1440 is YES), the turning state output increase ΔTE1 for determining the turning state opening correction Δθ1 is decreased at the predetermined attenuation factor D1 so that the target throttle opening θT is gradually reduced to the fundamental throttle opening θB (that is, the answer of Step S1460 is NO, and the operations of Steps S1510 and S1480 to S1500).

Figure 35:
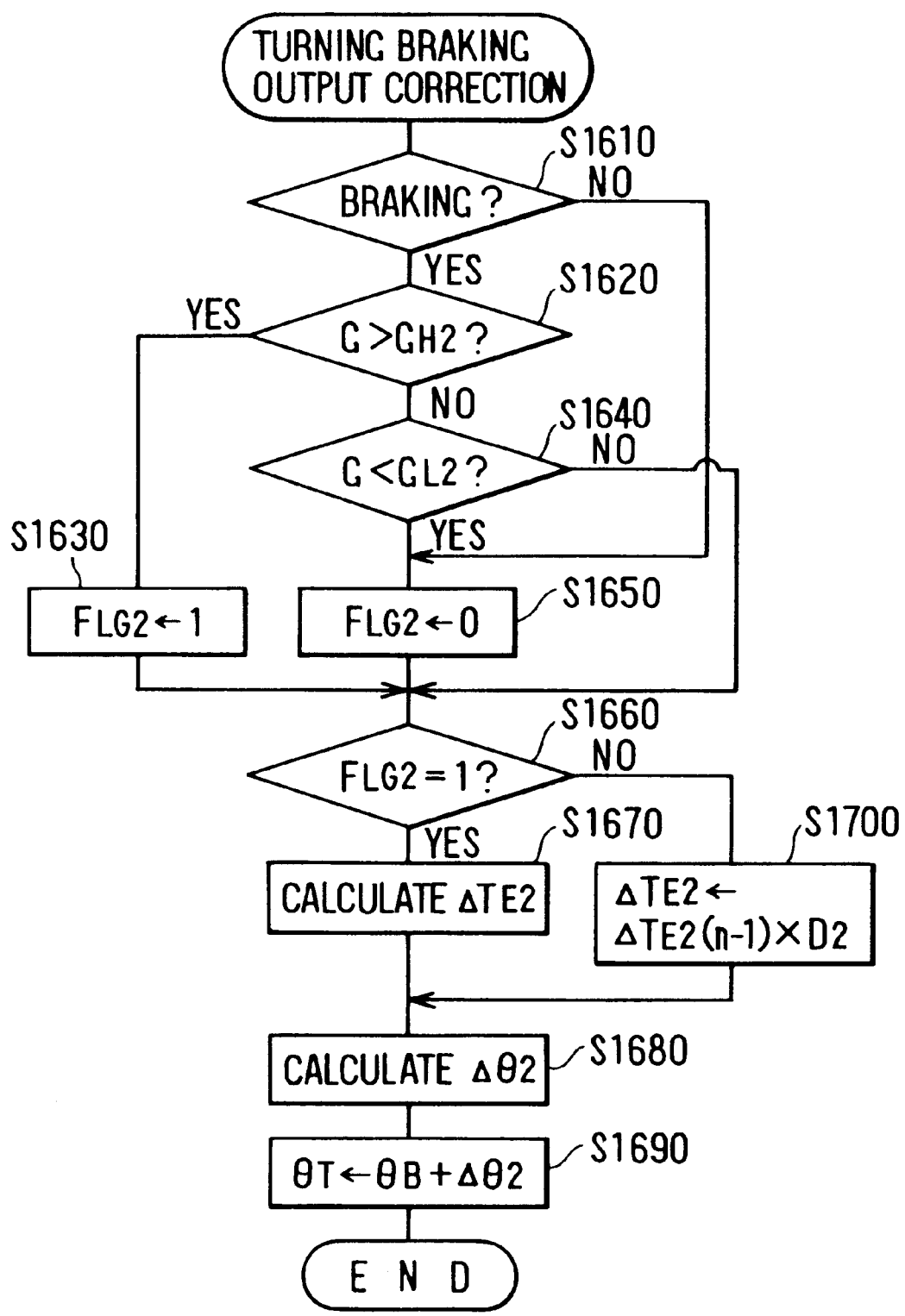
FIG. 35 is a flow chart showing an output correcting routine at the time of turning and braking states in the fifth embodiment.

FIG. 35 is a flow chart showing the turning braking output correction routine. This routine is executed to raise the output of the engine 2 in accordance with the turning state (detected based on the lateral acceleration G) of the vehicle in the turning and braking states when the braking forces are applied to the wheels 22FL to 22RR.

When the drive force controlling circuit 20 starts the execution of the turning braking output correction routine, as shown in FIG. 35, it is determined at Step S1610 whether or not the vehicle is being braked, on the basis of the ON/OFF of the brake switch 46, as in the foregoing case of Step S1410.

When it is determined at Step S1610 that the vehicle is being braked (that is, the brake switch 46 is ON), the routine advances to Step S1620, at which it is determined whether or not the lateral acceleration G of the vehicle body, as detected by the lateral acceleration sensor 45, is higher than a second high level reference value GH2 (>GL2) which is set to a value higher than a second low level reference value GL2. When the lateral acceleration G is higher than the second high level reference value GH2, the routine advances to Step S1630, at which a turning braking control flag FLG2 is set to "1".

When it is determined at Step S1620 that the lateral acceleration G is not higher than the second high level reference value GH2, the routine advances to Step S1640, at which it is determined whether or not the lateral acceleration G is lower than the second low level reference value GL2. When it is determined at Step S1640 that the lateral acceleration G is lower than the second low level reference value GL2, or when it is determined at Step S1610 that the vehicle is not being braked, the routine advances to Step S1650, at which the turning braking control flag FLG2 is set to "0" (or cleared).

When any of the operations of Steps S1630 to S1650 is executed or when it is determined at Step S1640 that the lateral acceleration G is not lower than the second low level reference value GL2 (that is, the lateral acceleration G is no more than the second high level reference value GH2 and no less than the second low level reference value GL2), the routine advances to Step S1660.

At Step S1660, it is determined whether or not the turning braking control flag FLG2 is at "1". When FLG2="1", the routine advances to Step S1670, at which the output increase ΔTE of the engine 2 is calculated on the basis of the lateral acceleration G of the vehicle body at that time by using the second relation M2 of the engine output increase map, as illustrated in FIG. 33A, and the calculated value is stored as a turning braking output increase ΔTE2 in the RAM. In the present embodiment, as illustrated in FIG. 33A, the second predetermined value E2 larger than the first predetermined value E1 is stored as the turning braking output increase ΔTE2.

At subsequent Step S1680, moreover, the throttle opening correction Δθ is calculated on the basis of the turning braking output increase ΔTE2, as stored at present in the RAM, by using the throttle opening correction map illustrated in FIG. 33B, and is stored as a turning braking opening correction Δθ2 in the RAM.

At subsequent Step S1690, still moreover, the turning braking opening correction Δθ2, as stored at Step S1680, is added to the prevailing fundamental throttle opening θB, and the sum (θB+Δθ2) is stored as the target throttle opening θT of the throttle valve 12 in the RAM. Then, by the aforementioned (not-shown) drive control executed separately, the opening of the throttle valve 12 is controlled to the aforementioned target throttle opening θT so that the output of the engine 2 is increased by the turning braking output increase ΔTE2.

After the execution of Step S1690, the preset turning braking output correcting routine is once ended.

When it is determined at Step S1660 that the turning braking control flag FLG2 is not at "1", on the other hand, the routine advances to Step S1700. Then, a turning braking output increase ΔTE2(n−1), as used at the preceding Step S1680 for determining the turning braking opening correction Δθ2, is multiplied by the predetermined attenuation factor D2 (<1), and the multiplied result is stored as the present turning braking output increase ΔTE2 in the RAM. After this, the routine advances to Step S1680.

When it is determined at Step S1660 that the turning braking control flag FLG2 is not at "1", the turning braking output increase ΔTE2 decreases from the second predetermined value E2 by the attenuation factor D2 at each execution of the turning braking output correction routine so that the turning braking opening correction Δθ2, as stored at Step S1680 in the RAM, also gradually decreases. After the turning braking opening correction Δθ2 takes the value "0". the fundamental throttle opening θB is set as it is as the target throttle opening θT at Step S1690.

In the turning braking output correcting routine, when it is determined in the turning and braking states in which the braking forces are applied to the wheels 22FL to 22RR and the lateral acceleration G of the vehicle body exceeds the second high level reference value GH2 (that is, the answer of Step S1610 is YES, and the answer of Step S1620 is YES), the sum of the fundamental throttle opening θB and the turning braking opening correction Δθ2 is used as the target throttle opening θT of the throttle valve 12 so that the output of the engine 2 is raised by the turning braking output increase ΔTE2 (i.e., the second predetermined value) (that is, the answer of Step S1660 is YES, and the operations of Steps S1570 to S1690).

When the engine is not being braked, or when the lateral acceleration G is lower than the second low level reference value GL2 (that is, the answer of Step S1610 is NO, but the answer of Step S1640 is YES), the turning braking output increase ΔTE2 for determining the turning braking opening correction Δθ2 is decreased at the predetermined attenuation factor D2 to return the target throttle opening θT gradually to the fundamental throttle opening θB (that is, the answer of Step S1660 is NO, and the operations of Steps S1700, S1680 and S1690).

The operations by the turning state output correction routine and the turning braking output correction routine will be described with reference to FIGS. 36 and 37.

Figure 36:
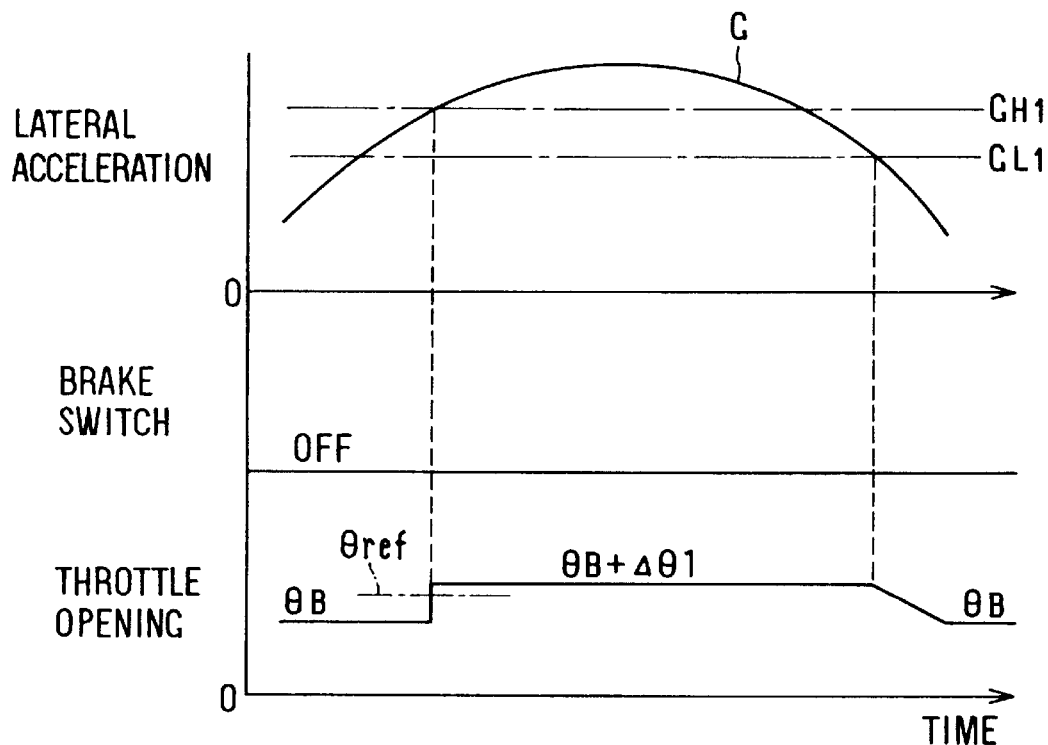
FIG. 36 is a time chart for explaining the output correcting operation in the turning state.
Figure 38:
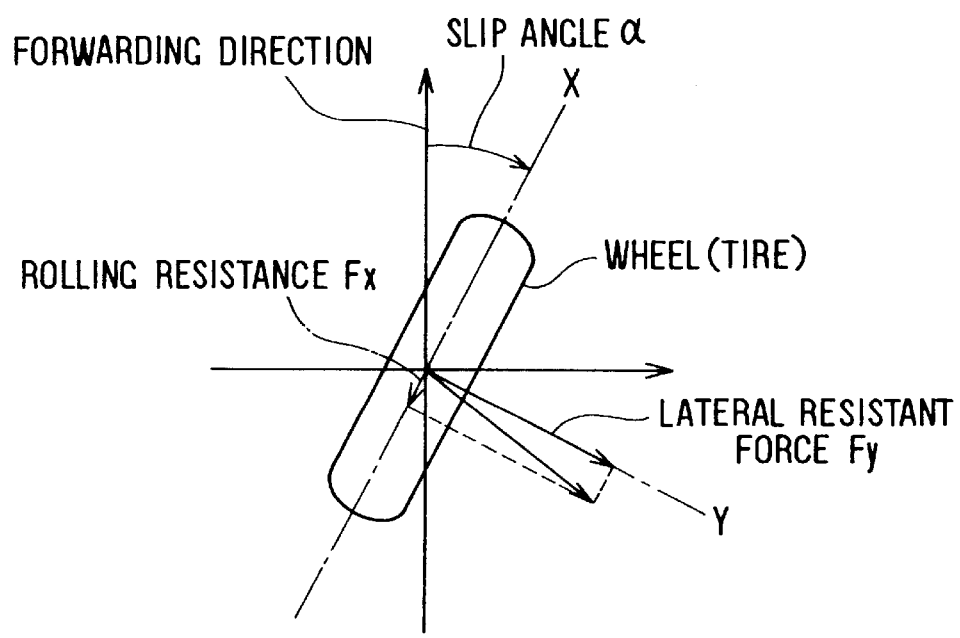
FIG. 38 is an explanatory diagram for explaining a rolling resistance Fx and a lateral resistant force Fy, which are generated at the wheels in a vehicular turning state.

When the braking operation is not made by the driver (that is, the brake switch 46 is OFF) and the fundamental throttle opening θB is smaller than the reference value θref as shown in FIG. 36, if the lateral acceleration G of the vehicle body exceeds the first high level reference value GH1, processing of Steps S1470 to S1500 in the turning state output correcting routine is executed so that the sum of the fundamental throttle opening θB and the turning state opening correction Δθ1 is set as the target throttle opening θT of the throttle valve 12. As a result, the output of the engine 2 is increased by the turning state output increase ΔTE1 (i.e., the first predetermined value E1).

Figure 39:
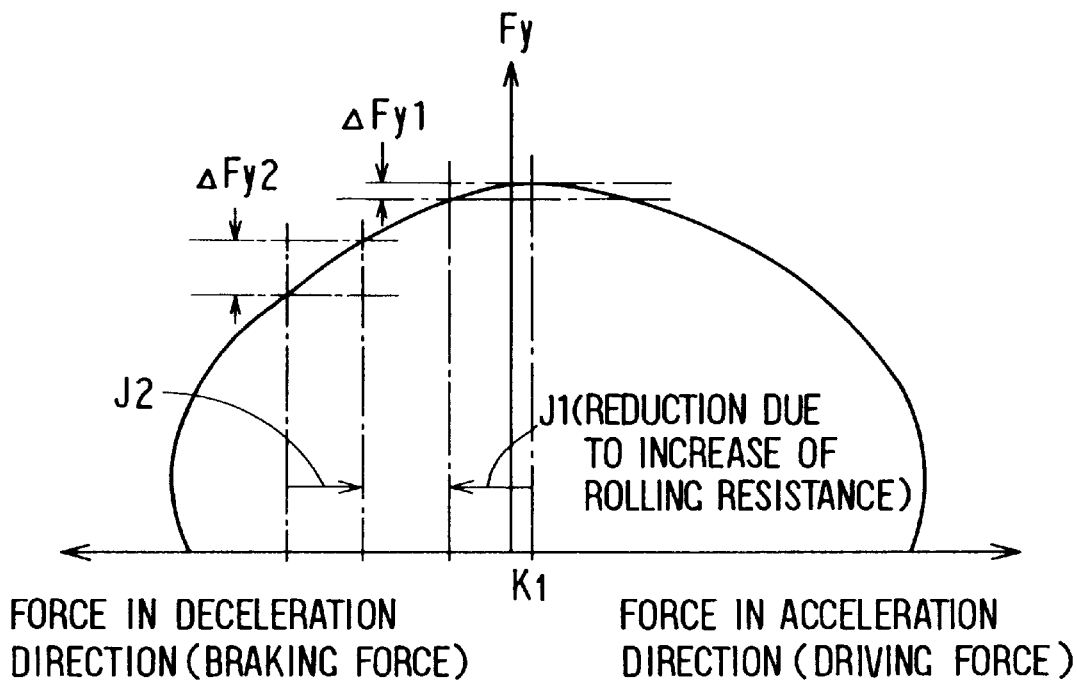
FIG. 39 is an explanatory diagram for explaining a relation between force to be applied to the wheels in a direction of acceleration/deceleration and the lateral resistant force Fy.

Then, it is possible to prevent the phenomenon in which the drive force of the drive wheels 22RL and 22RR is overcome by the rolling resistance Fx, as indicated by arrow J1 in FIG. 39, to reduce the lateral resistant force Fy of the drive wheels 22RL and 22RR, because the drive force to be transmitted to the drive wheels 22RL and 22RR is increased. As a result, the motion of the vehicle in the turning state can be stabilized.

Accordingly, if the lateral acceleration G becomes lower than the first low level reference value GL1, the operations of Steps S1510 and S1480 to S1500 of the turning state output correcting routine are executed so that the target throttle opening θT is gradually decreased to the fundamental throttle opening θB and then the ordinary throttle valve control is restored.

Figure 37:
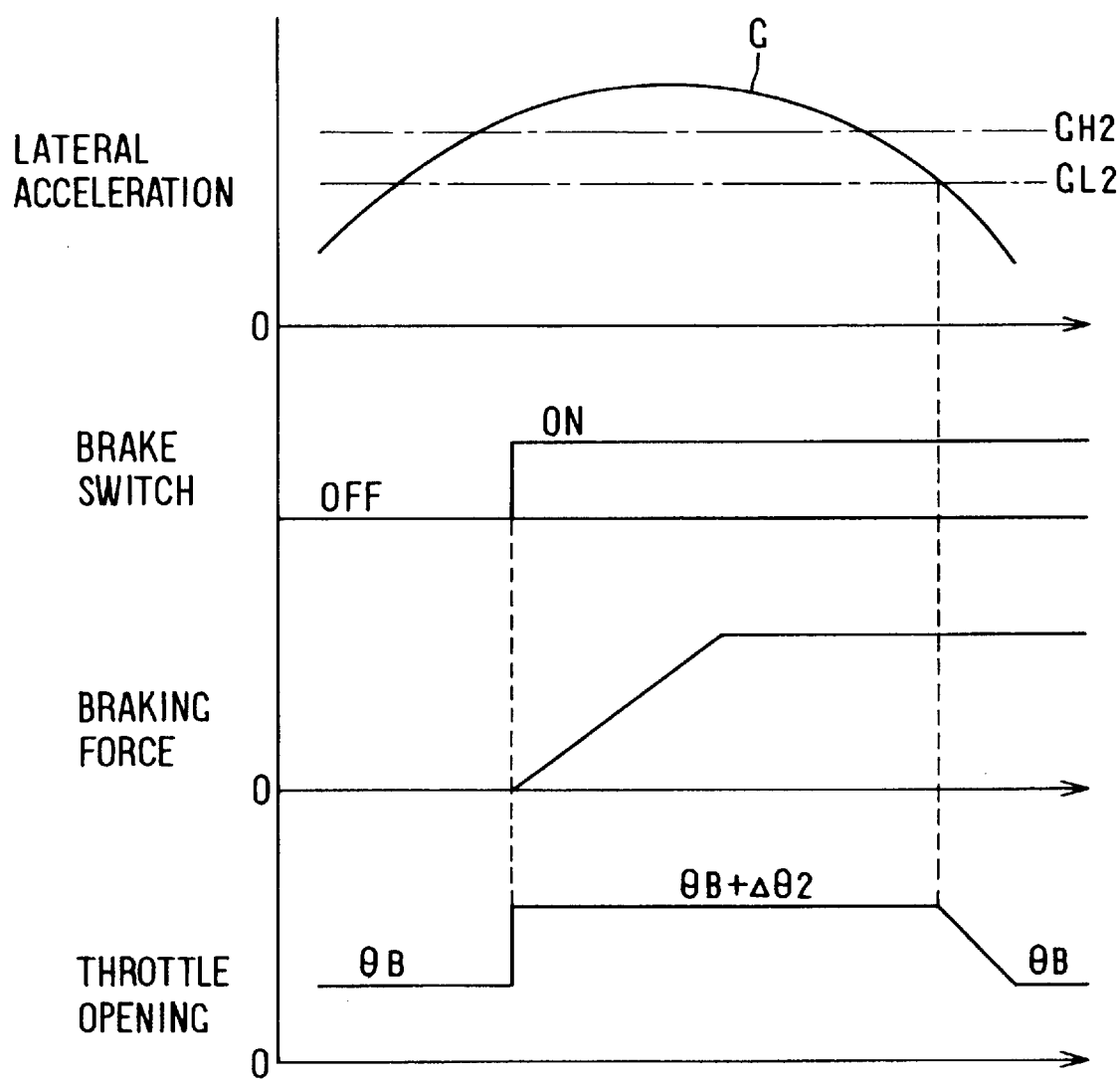
FIG. 37 is a time chart for explaining the output correcting operation at the turning and braking states.

When, on the other hand, the braking operation is done by the driver (that is, the brake switch 46 is turned ON) with the lateral acceleration G of the vehicle body exceeding the second high level reference value GH2, as illustrated in FIG. 37, the operations of Steps S1670 to S1690 of the turning braking output correcting routine are executed so that the sum of the fundamental throttle opening θB and the turning braking opening correction Δθ2 is set as the target throttle opening θT of the throttle valve 12. As a result, the output of the engine 2 is increased by the turning braking output increase ΔTE2 (i.e., the second predetermined value E2).

In this case, too, the drive force to be transmitted to the drive wheels 22RL and 22RR is increased so that the force to be applied to the drive wheels 22RL and 22RR in the deceleration direction is decreased, as indicated by arrow J2 of FIG. 39. As a result, the lateral resistant force Fy of the drive wheels 22RL and 22RR is accordingly (as indicated by ΔFy2 of FIG. 39) increased so that the motion of the vehicle in the turning and braking state can be stabilized.

When the lateral acceleration G becomes lower than the second low level decision value GL2, the operations of Steps S1700, S1680 and S1690 of the turning braking output correcting routine are executed. As a result, the target throttle opening θT gradually decreases to the fundamental throttle opening θB and then the ordinary throttle valve control is restored.

In the present embodiment, as detailed hereinbefore, in the turning state without any braking operation, when the lateral acceleration G of the vehicle body is higher than the first high level reference value GH1 whereas the fundamental throttle opening θB is lower than the reference value θref so that the drive force of the drive wheels 22RL and 22RR is overcome by the rolling resistance Fx to reduce the lateral resistant force Fy, or in the turning and braking states with the braking operation, when the lateral acceleration G is higher than the second high level reference value GH2, the output of the engine 2 is raised to increase the drive forces to be transmitted to the drive wheels 22RL and 22RR.

As a result, the lateral resistant force Fy of the drive wheels 22RL and 22RR at all turning states including the turning and braking states and the turning state without any braking can be held at a high level to stabilize the motion of the vehicle reliably. Without using the solenoid valve disposed in the brake fluid passage, as disclosed in Japanese Patent Application laid-Open No. 1-178060, the aforementioned effects can be attained to improve the reliability of the system drastically.

In the present embodiment, moreover, the output increase ΔTE of the engine 2 in the turning and braking states (that is, the turning braking output increase ΔTE2: the second predetermined value E2) is made higher than the output increase ΔTE of the engine 2 in the turning state without any braking (that is, the turning state output increase ΔTE1: the first predetermined value E1). This is because the force to be applied to the drive wheels 22RL and 22RR in the deceleration direction is higher in the turning and braking states than in the ordinary turning state in which no braking force is applied to the drive wheels 22RL and 22RR, so that the lateral resistant force Fy of the wheels accordingly drop seriously.

As a result, the motion at the vehicle turning time can be properly stabilized.

In the present embodiment, in the engine output increase map to be used for the turning state output correction and the turning braking output correction, the output increase ΔTE takes the constant values E1 and E2 irrespective of the value of the lateral acceleration G. As indicated by single- and double-dotted lines in FIG. 33A, however, the engine output increase map may be exemplified so that the output increase ΔTE is set to the higher value for the higher lateral acceleration G of the body. According to this map, therefore, the drive forces to be transmitted to the drive wheels 22RL and 22RR can be properly increased according to the rolling resistance Fx of the wheels, which takes the higher value for the steeper turning state of the vehicle, so that the motion of the vehicle in the turning state can be more reliably stabilized.

In the present embodiment, moreover, the construction may be modified such that the braking forces being applied to the drive wheels 22RL and 22RR are detected on the basis of the brake fluid pressure of the brake system or the depression force of the brake pedal in order that the output increase ΔTE (i.e., the turning braking output increase ΔTE2) of the engine 2 is set to the higher value at Step S1670 of the turning braking output correcting routine, for the higher braking forces detected. With this construction, moreover, the vehicular motion in the turning and braking states can be more reliably stabilized.

In this case, at Step S1670 of the turning braking output correcting routine, the turning braking output increase ΔTE2, as calculated by using the engine output increase map of FIG. 33A, for example, may be multiplied by a coefficient proportional to the braking forces, or the map for determining the turning braking output increase ΔTE2 directly according to the braking forces may be separately prepared in the ROM.

Although the turning state of the vehicle is detected in the foregoing embodiment in terms of the lateral acceleration G, it may be detected on the basis of the rotational speeds of the left and right driven wheels (i.e., the left and right front wheels) 22FL and 22FR to be detected by the driven wheel speed sensors 32FL and 32FR, or the steering angle of the (not-shown) steering wheel of the vehicle.

Moreover, not both but only one of the turning state output correcting routine (FIG. 34) and the turning braking output correcting routine (FIG. 35) in the foregoing embodiment may be adopted. When only the turning state output correcting routine is executed, the operations at and after Step S1420 may be executed without the decision of Step S1410 (that is, irrespective of whether or not the vehicle is being braked).

In the aforementioned embodiment, moreover, the first low level reference value GL1 and the first high level reference value GH1, and the second low level reference value FL2 and the second high level reference value GH2 for determining the degree of the turning state of the vehicle may be equal to each other or different from each other.

Moreover, the aforementioned embodiment has been exemplified in the front-engine/rear-drive (FR) vehicle, but the present invention can be applied to a front-engine/front-drive (FF) vehicle or a four-wheel drive car equipped with all wheels as the drive wheels.

What is claimed is:

1. A vehicular motion controlling system comprising:
    a drive wheel control device for adjusting a braking force provided to drive wheels by an engine brake when the wheel speeds of said drive wheels are reduced by said engine brake; and
    a driving wheel control device which operates concurrently with said drive wheel control device for reducing the wheel speeds of driven wheels by a brake actuator.

2. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein said drive wheel control device reduces the braking force due to said engine brake by increasing an engine output torque.

3. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein said drive wheel control device and said driven wheel control device adjust distribution of brake force provided to said drive wheel and said driven wheel in response to slip states of several wheels and/or a road surface state.

4. A vehicular motion controlling system according to claim 3, wherein said drive wheel control device and said driven wheel control device start their operations when a predetermined slip is caused in the drive wheels by said engine brake.

5. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein braking force corresponding to said engine brake is distributed between braking forces of said drive wheels and braking force of said driven wheels so that the vehicle can stably travel.

6. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein braking force corresponding to said engine brake is distributed between braking forces of said drive wheels and braking force of said driven wheels so that deceleration caused by said engine brake can be obtained.

7. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein said engine brake is operated when a driver releases an accelerator pedal.

8. A vehicular motion controlling system comprising:
    a drive wheel control device for adjusting a braking force provided to drive wheels by an engine brake when the wheel speeds of said drive wheels are reduced by said engine brake; and
    a driven wheel control device for reducing the wheel speeds of driven wheels by a brake actuator; wherein said engine brake is operated when an automatic control device automatically adjusts braking force and/or drive force of the vehicle.

9. A vehicular motion controlling system utilized for a vehicle including at least rear side wheels serving as drive wheels, comprising:
    engine brake detecting means for detecting that engine brake is applied to said drive wheels in response to a reduction in drive force provided from an engine to said drive wheel; and
    braking force controlling means for applying braking force to front side wheels by a brake actuator in response to load movement in a vehicle caused by said engine brake when said engine brake is applied to said drive wheels.

10. A vehicular motion controlling system utilized for a vehicle having rear side wheels serving as drive wheels and front side wheels serving as driven wheels, comprising:
    engine brake detecting means for detecting that engine brake is applied to said drive wheels in response to a reduction in drive force provided from an engine to said drive wheels; and
    braking force controlling means for applying braking force to said driven wheels by a brake actuator so that said braking force applied to said driven wheels is equal to or more than braking force applied to said drive wheels due to said engine brake when said engine brake is applied to said drive wheels.

11. A vehicular motion controlling system utilized for a vehicle having rear side wheels serving as drive wheels and front side wheels serving as driven wheels, comprising:
    engine brake detecting means for detecting that an engine brake is applied to said drive wheels in response to a reduction in drive force provided from an engine to said drive wheels; and braking force controlling means for applying braking force to said driven wheels by a brake actuator so that said braking force applied to said driven wheels is equal to or more than braking force applied to said drive wheels when said engine brake is applied to said drive wheels.

12. A vehicular motion controlling system utilized for a vehicle including at least rear side wheels serving as drive wheels, comprising:

wheel braking force generating means mounted on each of the wheels of the vehicle for generating braking force according to a given brake fluid pressure in each wheel;

brake fluid pressure generating means for generating brake fluid pressure to be fed to said wheel braking force generating means;

driving force generating a means for generating driving force for driving at least rear side wheels;

detection means for detecting a state in which an engine brake is effective; and control means for activating said brake fluid pressure generating means to apply brake fluid pressure to said wheel braking force generating means mounted on front side wheels so that braking force is generated in said front side wheels, when said state in which said engine brake is effective is detected by said detection means.

13. A vehicular motion controlling system according to claim 12, wherein said control means causes said brake fluid pressure generating means to generate brake fluid pressure according to a load movement generated in the vehicle due to said engine brake, and applies said brake fluid pressure to said wheel braking force generating means of said front side wheels, when said state in which said engine brake is effective is detected by said detection means.

14. A vehicular motion controlling system according to claim 13, wherein said control means determines said load movement based on a wheel speed difference between a wheel speed of said front side wheels and a wheel speed of said rear side wheels and controls brake fluid pressure to be applied to said wheel braking force generating means of said front side wheels in accordance with said wheel speed difference.

15. A vehicular motion controlling system according to claim 14, wherein said control means inhibits an increase in brake fluid pressure to be applied to said wheel braking force generating means of said front side wheels when said wheel speed of said front side wheels is lower by a predetermined value or more than said wheel speed of said rear side wheels.

16. A vehicular motion controlling system comprising:

an engine for generating a driving force to be transmitted to drive wheels of a vehicle;

driving force adjusting means for adjusting said driving force generated by said engine;

adjusting state detecting means for detecting an operating state of said drive force adjusting means;

condition determining means for determining whether or not condition for effecting an engine brake is satisfied, on the basis of said operating state detected by said adjusting state detecting means; and driving force controlling means for driving said driving force adjusting means to increase said driving force when it is determined by said condition determining means that said condition for effecting said engine brake is satisfied.

17. A vehicular motion controlling system according to claim 16, wherein said driving force adjusting means is either a throttle valve or an accelerator pedal.

18. A vehicular motion controlling system according to claim 17, wherein said adjusting state detecting means detects said operating state of said driving force adjusting means based on at least one of a throttle valve opening degree, a changing rate of said throttle valve opening degree, an accelerator pedal opening degree and a changing rate of said accelerator pedal opening degree.

19. A vehicular motion controlling system according to claim 17, wherein said adjusting state detecting means detects said operating state of said driving force adjusting means indirectly based on at least one of an intake air pressure, a changing rate of said intake air pressure, an intake air flow, a changing rate of said intake air flow, and a state of an idle switch which detects that said throttle valve is returned to a fully-closed position.

20. A vehicular motion controlling system according to claims 16, wherein said driving force controlling means increases a throttle valve opening degree to increase an engine output torque.

21. A vehicular motion controlling system according to claim 20, wherein said driving force controlling means opens said throttle valve by a predetermined amount when said throttle valve is fully closed.

22. A vehicular motion controlling system according to claim 20, wherein, when said driving force controlling means increases said throttle valve opening degree, an initial value of said throttle valve opening degree is set according to said operating state of said driving force adjusting means.

23. A vehicular motion controlling system according to claim 20, wherein said driving force controlling means increases said throttle valve opening degree after an elapse of a predetermined time period from when said throttle valve opening degree reaches to an opening degree at which said engine output torque becomes zero.

24. A vehicular motion controlling system according to claim 16, wherein said driving force controlling means increases fuel amount fed to said engine to increase engine output torque.

25. A vehicular motion controlling system according to claim 16, wherein said driving force controlling means increases said driving force according to a state of a road surface state on which the vehicle travels.

26. A vehicular motion controlling system comprising:

braking force generating means for generating wheel braking force to each of front-left, front-right, rear-left and rear-right wheels of a vehicle in response to a given brake fluid pressure;

a brake fluid pressure generating source for generating brake fluid pressure to be supplied to said braking force generating means;

a driving force generating source for applying a driving force to drive wheels which are either said front-left and front-right wheels or said rear-left and rear-right wheels;

driving force increasing means for increasing said driving force to be applied to said drive wheels by said driving force generating means, in accordance with a turning state of the vehicle; and control means for comparing a real turning state of the vehicle and a target turning state obtained from a steering operation by a driver, and applying said brake fluid pressure from said brake fluid pressure generating source to said braking force generating means corresponding to one of left and right driven wheels so that said real turning state approaches said target turning state.

27. A vehicular motion controlling system according to claim 26, wherein said control means executes at least one of under-steer control to apply said brake fluid pressure to said braking force generating means of an inner driven wheel of a turning circle when said vehicle is in an under-steer state, and over-steer control to apply said brake fluid pressure to said braking force generating means of an outer driven wheel of said turning circle when said vehicle is in an over-steer state.

28. A vehicular motion con trolling system according to claim 26, wherein said control means applies said brake fluid pressure from said brake fluid pressure generating source to said braking force generating means corresponding to one of said drive wheels and one of said driven wheels so that said real turning state is brought close to said target turning state by a braking force generated at one of said drive wheels, in addition to a braking force generated at one of said driven wheels.

29. A vehicular motion controlling system according to claim 28, wherein said control means applies said brake fluid pressure to said braking force generating means of an inner drive wheel of a turning circle when said vehicle is in an under-steer state, and applies said brake flu id pressure to said braking force generating means of an outer drive wheel of said turning circle when said vehicle is in an over-steer state.

30. A vehicular motion controlling system according to claim 26, wherein said control means determines said brake fluid pressure to be applied to said braking force generating means so that a braking force caused by said brake fluid pressure offsets said driving force increased by said driving force increasing means.

31. A vehicular motion controlling system according to claim 30, wherein said control means calculates a required yawing moment necessary for controlling said rear turning state of said vehicle to said target turning state, and determines a magnitude of increase in said driving force by said driving force increasing means and said brake liquid pressure to be applied to said braking force generating means on the basis of said requested yawing moment.

32. A vehicular motion controlling system comprising:
  turning state detecting means for detecting a turning state of a vehicle; and
  driving force increasing means for increasing driving force to be transmitted from a power system of a vehicle to drive wheels thereof with a predetermined value, when said turning state detected by said turning state detecting means exceeds a predetermined degree.

33. A vehicular motion controlling system according to claim 32, further comprising:
  brake detecting means for detecting whether or not a braking force is applied to said drive wheels,
  wherein said driving force increasing means increases said driving force to be transmitted from said power system to said drive wheels with said predetermined value, when said turning state detected by said turning state detecting means exceeds a predetermined degree and said brake detecting means detects that said braking force is applied to said drive wheels.

34. A vehicular motion controlling system according to claim 32, further comprising:
  driving force determining means for determining whether or not said driving force transmitted from said power system to said drive wheels is no more than a predetermined value,
  wherein said driving force increasing means increases said driving force with a predetermined value, when said turning state detected by said turning state detecting means exceeds said predetermined degree and it is determined by said driving force determining means that said driving force is no more than said predetermined value.

35. A vehicular motion controlling system according to claim 32, further comprising:
  brake detecting means for detecting whether or not a braking force is applied to said drive wheels; and
  driving force determining means for determining whether or not said driving force transmitted from said power system to said drive wheels is no more than a predetermined value,
  wherein said driving force increasing means increases said driving force to be transmitted from said power system to said drive wheels with a first predetermined value when said turning state detected by said turning state detecting means exceeds said predetermined degree, it is detected by said brake detecting means that said braking force is not applied to said drive wheels, and it is determined by said driving force determining means that said driving force is no more than said predetermined value, and increases said driving force to be transmitted from said power system to said drive wheels with a second predetermined value larger than said first predetermined value, when said turning state detected by said turning state detecting means exceeds said predetermined degree, it is detected by said brake detecting means that said braking force is applied to said drive wheels.

36. A vehicular motion controlling system according to claim 33, wherein said brake detecting means detects whether or not said braking force is applied to said drive wheels, by detecting that a brake pedal of said vehicle is depressed.

37. A vehicular motion controlling system according to claim 33, wherein said driving force increasing means increases said driving force to be transmitted to said drive wheels, the more for the higher braking force, when said turning state detected by said turning state detecting means exceeds said predetermined degree and it is detected by said brake detecting means that said braking force is applied to said drive wheels.

38. A vehicular motion controlling system according to claim 32, wherein said driving force increasing means increases said driving force to be transmitted to said drive wheels, the more for steeper turning state of said vehicle which is detected by said turning state detecting means.

39. A vehicular motion controlling system according to claim 32, wherein said driving force increasing means increases said driving force to be transmitted to said drive wheels by increasing an output torque of an engine mounted on said vehicle.

40. A vehicular motion controlling system according to claim 32, wherein said turning state detecting means detects said turning state of said vehicle on the basis of at least one information of a lateral acceleration of said vehicle, right and left wheel speeds of said vehicle and a steering angle of said vehicle.

41. A vehicular motion control method for a vehicle having an engine, drive wheels coupled with the engine, driven wheels and a braking device, said method comprising the steps of:

detecting a reduction in a rotation speed of said drive wheels;

increasing an output torque of said engine in response to the detection of speed reduction thereby to reduce engine braking force applied to the drive wheels; and increasing braking force applied from the braking device to the driven wheels in response to the detection of speed reduction.

42. A vehicular motion control method according to claim 41, further comprising the step of:

detecting an engine braking operation which reduces the engine output torque, wherein the speed reduction detecting step calculates a slip state of the drive wheels after the detection of engine braking operation, and detects the speed reduction when the calculated slip state reaches a predetermined reference state.

43. A vehicular motion control method according to claim 42, wherein the slip state is calculated as a function of a difference between a rotation speed of said driven wheels and the rotation speed of said drive wheels.

44. A vehicular motion control method according to claim 41, wherein the torque increasing step increases opening of a throttle valve of said engine irrespective of accelerator position.

45. A vehicular motion control system comprising:

wheel cylinders provided for vehicle wheels, respectively;

a hydraulic unit for supplying hydraulic pressure to each wheel cylinder;

a drive shaft for applying a drive force to each wheel shaft;

a drive source coupled to said drive shaft and capable of generating a negative driving force thereby to apply a braking force to each wheels; and control means for operating the hydraulic unit and the drive source concurrently thereby to control a total braking force, which is a sum of a braking force applied from the hydraulic unit and the braking force applied from the drive source, to a demanded braking force.

* * * * *